(12) United States Patent  
Parzych

(10) Patent No.: US 12,320,441 B1  
(45) Date of Patent: Jun. 3, 2025

(54) CENTERING ELECTRONIC ROTARY VALVE

(71) Applicant: SCHIVO MEDICAL LIMITED, Waterford (IE)

(72) Inventor: Krzysztof Parzych, Burlington, CT (US)

(73) Assignee: SCHIVO MEDICAL LIMITED, Waterford (IE)

( * ) Notice: Subject to any disclaimer, the term of this patent is extended or adjusted under 35 U.S.C. 154(b) by 175 days.

(21) Appl. No.: 17/391,784

(22) Filed: Aug. 2, 2021

Related U.S. Application Data

(60) Provisional application No. 63/195,383, filed on Jun. 1, 2021, provisional application No. 63/146,966, filed on Feb. 8, 2021.

(51) Int. Cl.
*F16K 31/04* (2006.01)
*F16K 37/00* (2006.01)
(Continued)

(52) U.S. Cl.
CPC ........ *F16K 31/043* (2013.01); *F16K 37/0041* (2013.01); *F16K 3/22* (2013.01); *F16K 11/0743* (2013.01); *G01N 30/20* (2013.01)

(58) Field of Classification Search
CPC .. F16K 31/041; F16K 31/043; F16K 37/0025; F16K 11/0743; F16K 11/076; F16K 3/26; F16K 3/262; F16K 3/22–267; F16K 37/0041; F16K 27/045; F16K 3/08; F16K 25/005; F16K 37/0033; F16K 13/02; F16K 5/16; F16K 11/083; F16K 31/055; F16K 99/0028; F16K 99/0013; F16K 99/0011; F16K 99/0084; G01N 2030/201; G01N 2030/202; G01N 2030/204; G01N 30/26; G01N 30/20; Y10T 137/86823; Y10T 137/86863; Y10T 137/86638; Y10T 137/86501; Y10T 137/86445; Y10T 137/8225; Y10T 137/8242; Y10T 137/86533; B01L 3/502738;
(Continued)

(56) References Cited

U.S. PATENT DOCUMENTS 1,172,101 A * 2/1916 Armstrong ............ F16K 11/083  
                                  137/625.16  
1,605,259 A * 11/1926 Mersch ................... F23K 5/147  
                                  239/125  
(Continued)

*Primary Examiner* — Craig J Price  
(74) *Attorney, Agent, or Firm* — BCF LLP

(57) ABSTRACT

A Centering Electronic Rotary Valve (CERV) includes an adapter structure having an arcuate shaped adapter top interface portion and an arcuate shaped adapter bottom interface cavity, wherein the adapter structure defines an adapter input channel and at least one adapter output channel. The CERV includes a stator structure having an arcuate shaped stator top interface portion and an arcuate shaped stator bottom interface cavity, wherein the stator structure defines a stator input channel and at least one stator output channel, wherein the stator input channel is aligned with the adapter input channel and the stator output channel is aligned with the adapter output channel. The CERV includes a rotor rotatably associated with the stator and having a rotor channel that communicates the stator input channel with the stator output channel.

16 Claims, 61 Drawing Sheets

(51) Int. Cl.
*F16K 3/22* (2006.01)
*F16K 11/074* (2006.01)
*G01N 30/20* (2006.01)

(58) Field of Classification Search
CPC .......... B01L 3/502715; B01L 2200/10; B01L 2200/028; B01L 2400/0644; B01L 2400/0633; B01L 2400/0622
USPC ......... 137/269, 554, 625.46, 625.41, 624.81, 137/625.11, 625.21, 625.47; 33/1 PT; 73/61.56, 863.72, 863.73, 864.84; 251/205, 208
See application file for complete search history.

(56) References Cited

U.S. PATENT DOCUMENTS

| | | | | |
|---|---|---|---|---|
| 2,448,649 A * | 9/1948 | Wheelon | F15B 13/06 | 137/625.2 |
| 3,034,528 A * | 5/1962 | Wharff, Jr. | F16K 11/083 | 137/246.22 |
| 3,297,053 A * | 1/1967 | McKinney | F16K 11/0743 | 251/86 |
| 3,384,118 A * | 5/1968 | Heintz | F02M 41/02 | 137/625.21 |
| 4,068,528 A * | 1/1978 | Gundelfinger | G01N 30/20 | 73/864.84 |
| 4,156,437 A * | 5/1979 | Chivens | F16K 11/0743 | 137/625.41 |
| 4,243,071 A * | 1/1981 | Shackelford | G01N 30/22 | 137/625.46 |
| 4,428,511 A * | 1/1984 | Howell | G01N 35/1097 | 137/625.11 |
| 4,444,066 A * | 4/1984 | Ogle | G01N 30/20 | 73/864.21 |
| 4,476,031 A * | 10/1984 | Ooms | C11D 1/645 | 510/522 |
| 4,476,731 A * | 10/1984 | Charney | G01N 30/20 | 73/864.83 |
| 4,550,742 A * | 11/1985 | Stearns | F16K 3/10 | 251/185 |
| 4,564,043 A * | 1/1986 | Trittler | G05B 19/44 | 91/40 |
| 4,577,515 A * | 3/1986 | Someya | G01N 35/1097 | 73/864.83 |
| 4,705,627 A * | 11/1987 | Miwa | F16K 11/074 | 210/264 |
| 4,926,702 A * | 5/1990 | Stephens | G01N 30/24 | 73/863.73 |
| 5,105,851 A * | 4/1992 | Fogelman | F16K 11/085 | 137/625.46 |
| 5,730,861 A * | 3/1998 | Sterghos | B01D 21/0018 | 210/167.13 |
| 5,803,117 A * | 9/1998 | Olsen | F16K 11/0743 | 137/625.13 |
| 6,012,487 A * | 1/2000 | Hauck | F16K 11/0853 | 137/625.46 |
| 6,012,488 A * | 1/2000 | Nichols | F16K 11/0743 | 137/625.11 |
| 6,155,123 A * | 12/2000 | Bakalyar | G01N 30/20 | 73/864.22 |
| 6,267,143 B1 * | 7/2001 | Schick | F16K 11/0743 | 137/625.46 |
| 6,550,496 B2 * | 4/2003 | Tiemann | F16K 11/074 | 137/625.46 |
| 6,672,336 B2 * | 1/2004 | Nichols | F16K 11/074 | 137/625.46 |
| 6,729,350 B2 * | 5/2004 | Schick | F16K 11/074 | 137/625.46 |
| 6,889,710 B2 * | 5/2005 | Wagner | B01D 53/0462 | 251/185 |
| 6,969,045 B2 * | 11/2005 | Salven | F16K 3/04 | 251/304 |
| 6,997,213 B1 * | 2/2006 | Towler | F16K 11/074 | 210/264 |
| 7,096,886 B2 * | 8/2006 | Hofmann | G01N 30/20 | 137/625.46 |
| 7,131,459 B2 * | 11/2006 | Beswick | F16K 11/0743 | 137/635 |
| 7,195,229 B2 * | 3/2007 | Maeda | G01N 30/24 | 251/281 |
| 7,201,185 B2 * | 4/2007 | Poppe | F16K 31/04 | 137/554 |
| 7,308,908 B2 * | 12/2007 | Keene | F16K 41/043 | 137/554 |
| 7,503,203 B2 * | 3/2009 | Gamache | F16K 11/074 | 137/51 |
| 7,931,043 B2 * | 4/2011 | Gamache | F16K 11/20 | 137/15.04 |
| 8,033,295 B2 * | 10/2011 | Meagher | F16K 11/0856 | 137/625.46 |
| 8,186,381 B2 * | 5/2012 | Wilen | F16K 11/074 | 137/625.11 |
| 8,236,175 B2 * | 8/2012 | Maeda | G01N 30/20 | 210/656 |
| 8,261,773 B2 * | 9/2012 | Tower | F16K 37/0058 | 137/554 |
| 8,272,401 B2 * | 9/2012 | McLean | F16K 11/0743 | 137/625.11 |
| 8,322,374 B2 * | 12/2012 | Tomita | F16K 11/0743 | 137/625.46 |
| 8,469,057 B2 * | 6/2013 | Gamache | F16K 11/20 | 137/625.48 |
| 8,567,441 B2 * | 10/2013 | Maeda | G01N 30/20 | 137/240 |
| 8,627,851 B2 * | 1/2014 | Tower | B23P 15/001 | 137/625.46 |
| 8,656,955 B2 * | 2/2014 | Price | F16K 11/074 | 137/625.46 |
| 8,746,745 B2 * | 6/2014 | Colman | A61M 16/0003 | 604/905 |
| 8,794,594 B2 * | 8/2014 | Gamache | G01N 30/20 | 251/77 |
| 8,813,785 B2 * | 8/2014 | Wan | F16K 11/02 | 137/240 |
| 8,905,075 B2 * | 12/2014 | Tower | F16K 3/14 | 251/192 |
| 8,944,102 B1 * | 2/2015 | Wiederin | F16K 11/0743 | 137/625.46 |
| 9,032,819 B2 * | 5/2015 | Nichols | G01N 1/2035 | 73/863.86 |
| 9,063,114 B2 * | 6/2015 | Wiechers | F16K 31/041 | |
| 9,146,182 B1 * | 9/2015 | Wiederin | G01N 30/20 | |
| 9,169,934 B2 * | 10/2015 | Bunner | F16K 3/10 | |
| 9,188,238 B2 * | 11/2015 | Tanaka | G01N 30/20 | |
| 9,194,504 B2 * | 11/2015 | Cormier | F16K 11/0655 | |
| 9,194,505 B2 * | 11/2015 | Tanaka | F16K 11/0743 | |
| 9,200,715 B2 * | 12/2015 | Tanaka | F16K 11/0853 | |
| 9,234,608 B2 * | 1/2016 | Stearns | F16K 11/085 | |
| 9,273,785 B2 * | 3/2016 | Tanaka | F16K 11/0743 | |
| 9,285,043 B2 * | 3/2016 | Tanaka | G01N 30/20 | |
| 9,297,790 B2 * | 3/2016 | Wiechers | F16K 31/041 | |
| 9,388,930 B2 * | 7/2016 | Servin | F16L 47/00 | |
| 9,400,265 B2 * | 7/2016 | Wiechers | G01N 30/26 | |
| 9,421,545 B2 * | 8/2016 | Servin | G01N 30/20 | |
| 9,435,440 B2 * | 9/2016 | Gamache | F16K 5/161 | |
| 9,541,207 B1 * | 1/2017 | Saetveit | F16K 11/0853 | |
| 9,618,128 B2 * | 4/2017 | Dourdeville | G01N 30/20 | |
| 9,671,376 B2 * | 6/2017 | Yasunaga | F16K 27/045 | |
| 9,726,301 B2 * | 8/2017 | Gärtner | B01L 3/502738 | |
| 9,739,383 B2 * | 8/2017 | Nichols | G01N 30/20 | |
| 9,752,691 B1 * | 9/2017 | Saetveit | H01J 49/0495 | |
| 9,845,894 B2 * | 12/2017 | Olovsson | F16K 11/0743 | |
| 9,939,415 B2 * | 4/2018 | Hochgraeber | F16K 11/0743 | |
| 9,964,527 B2 * | 5/2018 | Wachinger | G01N 30/20 | |
| 10,045,897 B2 * | 8/2018 | Streeter | F16K 31/041 | |
| 10,113,995 B2 * | 10/2018 | Hartmann | F16K 99/0028 | |
| 10,124,335 B2 * | 11/2018 | Liang | F16K 99/0028 | |
| 10,309,545 B2 * | 6/2019 | Liang | F16K 11/074 | |
| 10,364,900 B2 * | 7/2019 | Hara | F16K 11/0743 | |

(56) References Cited

U.S. PATENT DOCUMENTS

| | | | |
|---|---|---|---|
| 10,364,902 B2* | 7/2019 | Moeller | F16K 11/0743 |
| 10,371,273 B1* | 8/2019 | Saetveit | F16K 11/0743 |
| 10,473,631 B2* | 11/2019 | Wachinger | G01N 30/20 |
| 10,533,679 B2* | 1/2020 | Goll | F16K 31/0675 |
| 10,746,708 B2* | 8/2020 | Olovsson | G01N 30/20 |
| 10,941,877 B2* | 3/2021 | Wada | G01N 30/20 |
| 11,054,054 B2* | 7/2021 | Liu | F16K 11/0743 |
| 11,371,625 B2* | 6/2022 | Ren | F16K 31/047 |
| 11,378,193 B2* | 7/2022 | Gerhardt | F16K 27/062 |
| 11,389,843 B2* | 7/2022 | Saier | A47L 15/449 |
| 11,448,623 B2* | 9/2022 | Simard-Lecours | F16K 11/22 |
| 11,598,431 B2* | 3/2023 | Keller | F16K 11/0743 |
| 11,733,999 B2* | 8/2023 | Battaglia | G06F 8/71 |
| | | | 717/170 |
| 11,781,660 B2* | 10/2023 | Maeda | F16K 25/005 |
| | | | 137/625.15 |
| 11,788,647 B2* | 10/2023 | Berndt | F16K 99/0013 |
| | | | 137/625 |
| 11,788,994 B2* | 10/2023 | Gamache | F16K 11/22 |
| | | | 137/15.04 |
| 11,885,774 B2* | 1/2024 | Gamache | B01D 15/10 |
| 11,913,684 B2* | 2/2024 | Makihara | F16K 3/314 |
| 2012/0119127 A1* | 5/2012 | Tower | F16K 3/08 |
| | | | 251/304 |
| 2014/0261811 A1* | 9/2014 | Tanaka | F16K 11/0743 |
| | | | 137/625.11 |
| 2015/0090345 A1* | 4/2015 | Olovsson | F16K 11/0716 |
| | | | 137/15.06 |
| 2015/0129071 A1* | 5/2015 | Farina | F16K 11/0743 |
| | | | 251/366 |
| 2016/0025690 A1* | 1/2016 | Yasunaga | G01N 30/28 |
| | | | 137/625.41 |
| 2022/0403943 A1* | 12/2022 | Donetz | F16K 11/0743 |
| 2024/0175512 A1* | 5/2024 | Bluemner | F16K 31/055 |

* cited by examiner

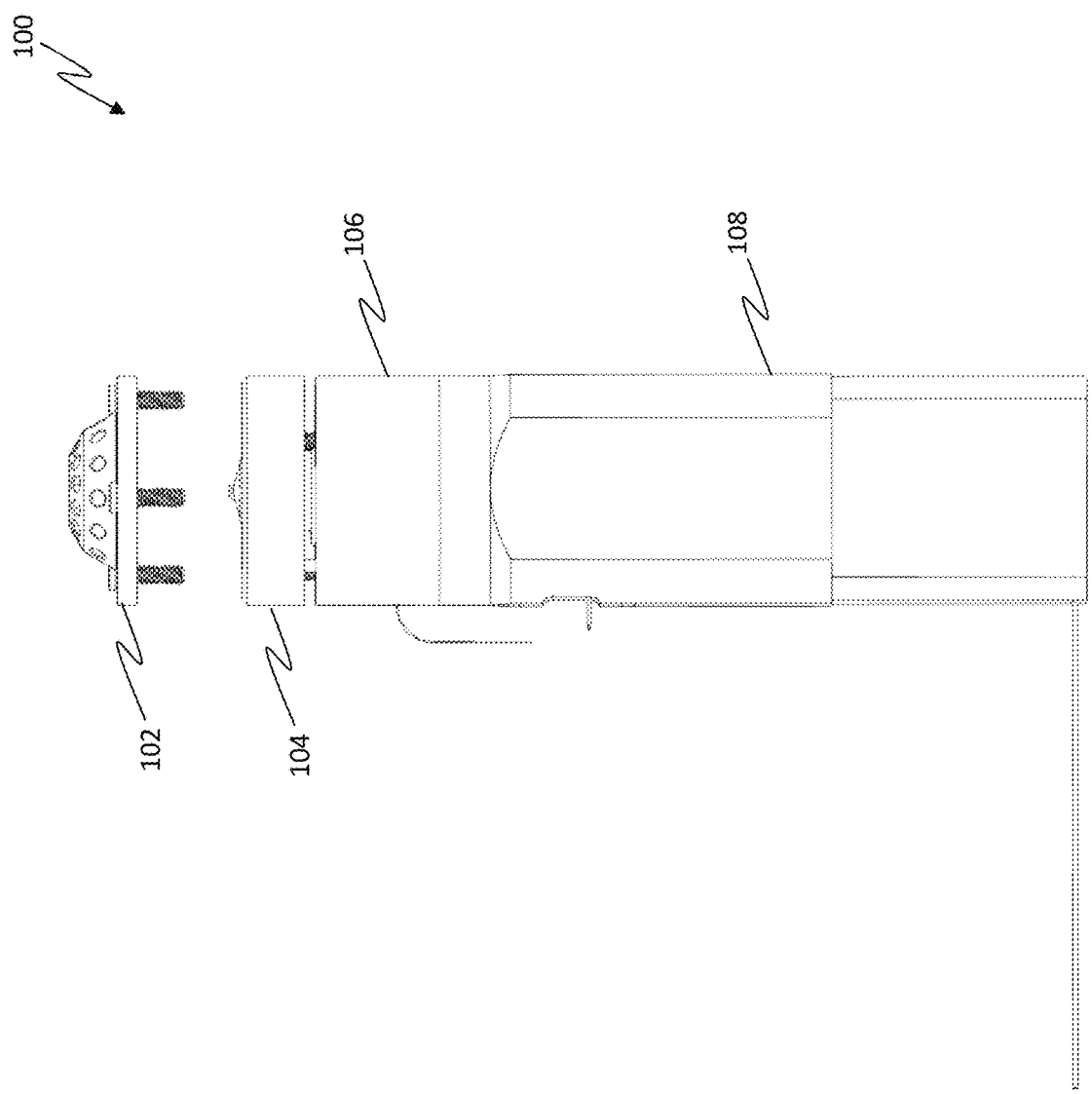

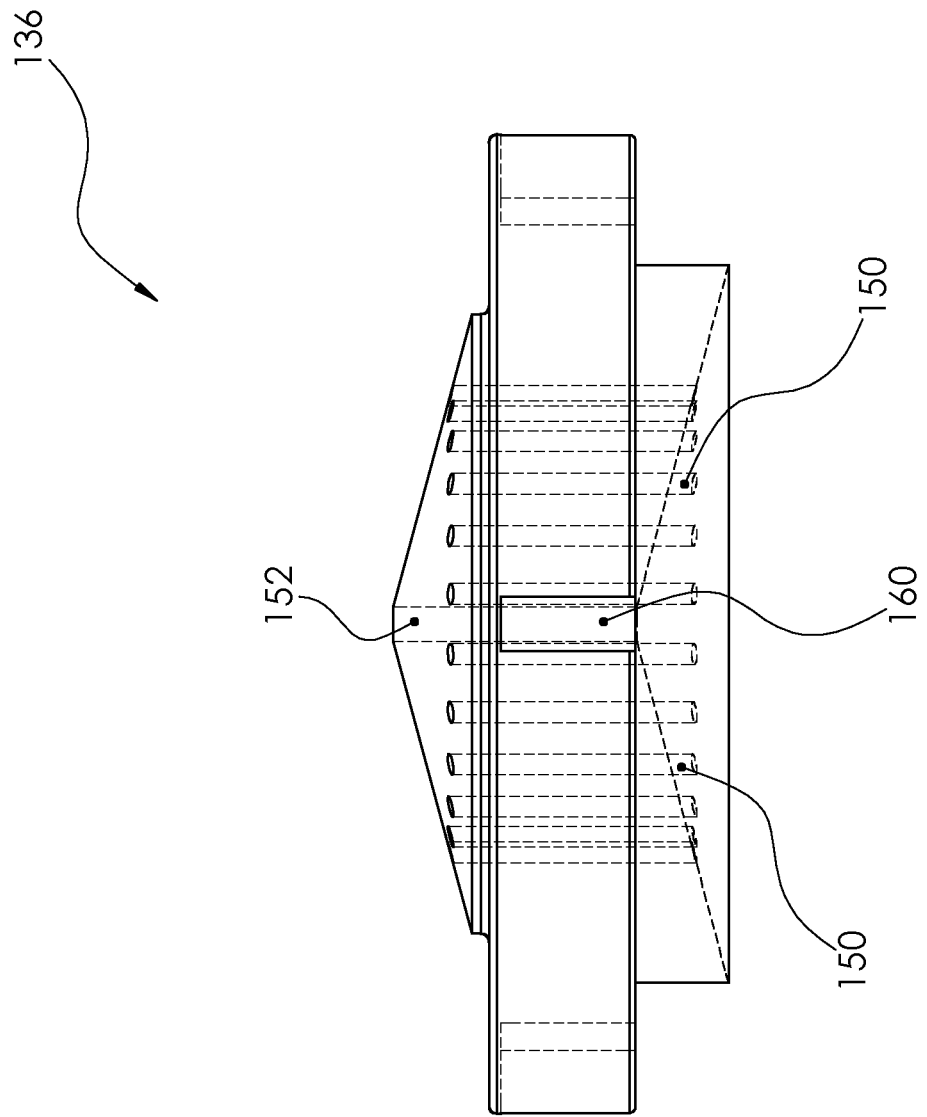

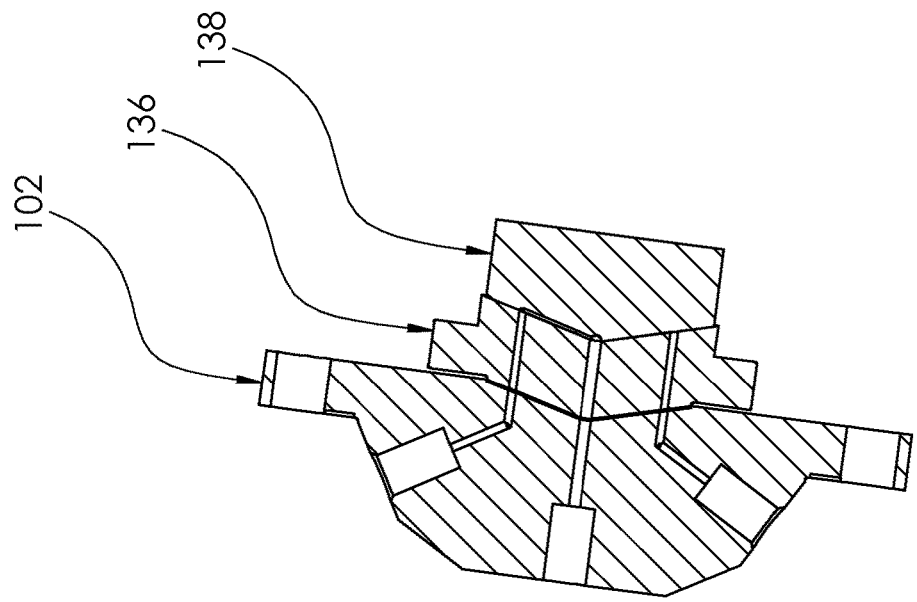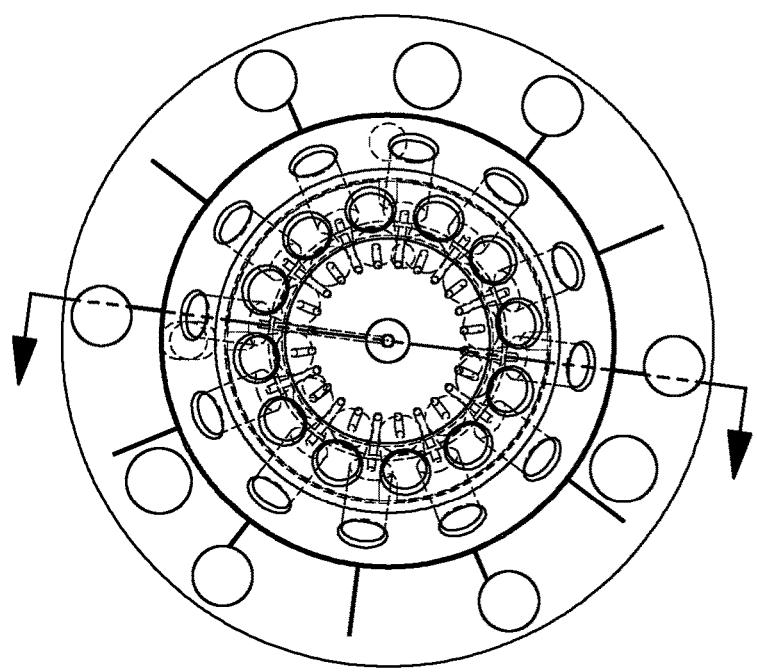
FIG. 5D

CENTERING ELECTRONIC ROTARY VALVE

RELATED APPLICATIONS

This application is related to and claims the benefit from U.S. Provisional Patent Application Ser. No. 63/146,966, filed Feb. 8, 2021, and U.S. Provisional Patent Application Ser. No. 63/195,383, filed Jun. 1, 2021, the contents of both of which are incorporated by reference herein in their entireties.

FIELD OF THE INVENTION

The present invention relates generally to fluid handling devices and more particularly to a Centering Electronic Rotary Valve (CERV) for handling fluids.

BACKGROUND OF THE INVENTION

In general, rotary valves are well known and are a type of valve that regulates and/or directs a flow of fluid or gas through attached pipes or conduits via a transverse plug (or structure) that includes one or more structure passages through the transverse plug structure. This is accomplished via rotation of the transverse plug to align the one or more structure passages within the transverse plug with the attached pipes or conduits. These types of valves are used for many different types of applications, such as brass instruments, stream and exhaust ports, liquid chromatography systems, etc. An Electronic Rotary Valve (ERV) is a well-known and complex fluid-handling device that is used for many applications in a wide range of analytical clinical and diagnostic systems. For example, ERVs can be used in High Performance Liquid Chromatography (HPLC) applications, Genomic applications, In Vitro Diagnostic applications and many other applications. Typically, ERVs are controlled via software and hardware and may function as fully automated fluidic devices which allow for selectable multi-positional porting for the transfer of fluids in both high- and low-pressure applications. As such, ERVs are designed to handle elevated pressure flows and a wide range of reagents and chemistries. Moreover, ERVs typically incorporate nano- and micro-fluidic flow paths to provide for high precision and dimensional stability and as such, the fluid volumes are precise, and the flows are repeatable and undisturbed. Thus, it is essential that the ports of the ERVs are aligned up precisely.

Unfortunately, however problems and inefficiencies with current ERV technology exist. One such problem involves the mating of the ERV with a manifold that disperses fluids under pressure. Due to current designs of the ERV-manifold interface, the interface is subject to lateral stresses during the mating process which can cause many issues with the performance, control and operational life of the ERV. As such the current ERV designs are inefficient, overly complicated, harder to control and more expensive to operate and maintain.

SUMMARY OF THE INVENTION

A Centering Electronic Rotary Valve (CERV) is provided and includes an adapter structure having an adapter top and an adapter bottom, wherein the adapter top includes an arcuate shaped adapter top interface portion and the adapter bottom defines an arcuate shaped adapter bottom interface cavity, wherein the adapter structure defines, an adapter input channel top opening communicated with an adapter input channel bottom opening via an adapter input channel, and at least one adapter output channel top opening communicated with at least one adapter output channel bottom opening via at least one adapter output channel. The CERV further includes a stator structure having a stator top and a stator bottom, wherein the stator top includes an arcuate shaped stator top interface portion and wherein the stator bottom defines an arcuate shaped stator bottom interface cavity, wherein the stator structure defines, a stator input channel top opening communicated with a stator input channel bottom opening via a stator input channel, and at least one stator output channel top opening communicated with at least one stator output channel bottom opening via at least one stator output channel, wherein the stator top interface portion is securely and sealingly associated with the adapter bottom interface cavity such that the adapter input channel bottom opening is adjacent to and aligned with the stator input channel top opening, and such that the at least one adapter output channel bottom opening is adjacent to and aligned with the at least one stator output channel top opening. The CERV also includes a rotor structure having a rotor top and a rotor bottom, wherein the rotor top is arcuate in shape and defines a rotor fluid channel input opening communicated with a rotor fluid channel output opening via a rotor fluid directional channel, wherein the rotor top is movably and sealingly associated with the stator bottom interface cavity, wherein the rotor fluid channel input opening is adjacent to and aligned with the stator input channel bottom opening, and the rotor fluid channel output opening is adjacent to and aligned with the at least one stator output channel bottom opening. The CERV also includes a motor, wherein the motor is associated with the rotor via a rotor shaft and a drive system associated with the motor, wherein the drive system is configured to sense the position of the rotor shaft and operate the motor to cause the rotor shaft to rotate about an axis M and to locate the rotor at a defined discreet position.

A Centering Electronic Rotary Valve (CERV) is provided and includes an adapter structure having an adapter top, an adapter bottom and a plurality of adapter output channels, wherein the adapter top includes an arcuate shaped adapter top interface portion and the adapter bottom defines an arcuate shaped adapter bottom interface cavity, wherein the adapter structure defines, an adapter input channel top opening communicated with an adapter input channel bottom opening via an adapter input channel, and a plurality of adapter output channel top openings communicated with a plurality of adapter output channel bottom openings via the plurality of adapter output channels. The CERV further includes a stator structure having a stator top, a stator bottom and a plurality of stator output channels, wherein the stator top includes an arcuate shaped stator top interface portion and wherein the stator bottom defines an arcuate shaped stator bottom interface cavity, wherein the stator structure defines, a stator input channel top opening communicated with a stator input channel bottom opening via a stator input channel, and a plurality of stator output channel top openings communicated with a plurality of stator output channel bottom openings via the plurality of stator output channels, wherein the stator top interface portion is securely and sealingly associated with the adapter bottom interface cavity such that the adapter input channel bottom opening is adjacent to and aligned with the stator input channel top opening, and such that the plurality of adapter output channel bottom openings is adjacent to and aligned with the plurality of stator output channel top openings. A rotor structure is also provided and includes a rotor top and a rotor bottom, wherein the rotor top is arcuate in shape and defines a rotor fluid channel input opening communicated with a rotor fluid channel output opening via a rotor fluid directional channel, wherein the rotor top is movably and sealingly associated with the stator bottom interface cavity, wherein the rotor fluid channel input opening is adjacent to and aligned with the stator input channel bottom opening, and the rotor fluid channel output opening is adjacent to and aligned with one of the plurality of stator output channel bottom openings. Moreover, the CERV also includes a motor, wherein the motor is associated with the rotor via a rotor shaft, and a drive system associated with the motor, wherein the drive system is configured to sense the position of the rotor shaft and operate the motor to cause the rotor shaft to rotate about an axis M and to locate the rotor at a defined discreet position.

A Centering Electronic Rotary Valve (CERV) is provided and includes an adapter structure having an adapter top and an adapter bottom, wherein the adapter top includes an arcuate shaped adapter top interface portion and the adapter bottom defines an arcuate shaped adapter bottom interface cavity, wherein the adapter structure defines, an adapter input channel top opening communicated with an adapter input channel bottom opening via an adapter input channel, and an adapter output channel top opening communicated with an adapter output channel bottom opening via an adapter output channel. A stator structure is provided and includes a stator top and a stator bottom, wherein the stator top includes an arcuate shaped stator top interface portion and wherein the stator bottom defines an arcuate shaped stator bottom interface cavity, wherein the stator structure defines, a stator input channel top opening communicated with a stator input channel bottom opening via a stator input channel, and a stator output channel top opening communicated with a stator output channel bottom opening via a stator output channel, wherein the stator top interface portion is securely and sealingly associated with the adapter bottom interface cavity such that the adapter input channel bottom opening is adjacent to and aligned with the stator input channel top opening, and such that the adapter output channel bottom opening is adjacent to and aligned with the stator output channel top opening. Moreover, the CERV further includes a rotor structure having a rotor top and a rotor bottom, wherein the rotor top is arcuate in shape and defines a rotor fluid channel input opening communicated with a rotor fluid channel output opening via a rotor fluid directional channel, wherein the rotor top is movably and sealingly associated with the stator bottom interface cavity, wherein the rotor fluid channel input opening is adjacent to and aligned with the stator input channel bottom opening, and the rotor fluid channel output opening is adjacent to and aligned with the stator output channel bottom opening, wherein CERV is configured to sense the position of the rotor and rotate the rotor about an axis M and to locate the rotor at a defined discreet position.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures:

FIG. 1A is a side view of a Centering Electronic Rotary Valve (CERV), in accordance with one embodiment of the invention.

FIG. 3E is a transparent side-view of the stator of FIG. 3A.

FIG. 5D is a side sectional view of the adapter, stator and rotor combination of FIG. 5B, in accordance with one embodiment of the invention.

DETAILED DESCRIPTION OF THE INVENTION

Figure 1B:
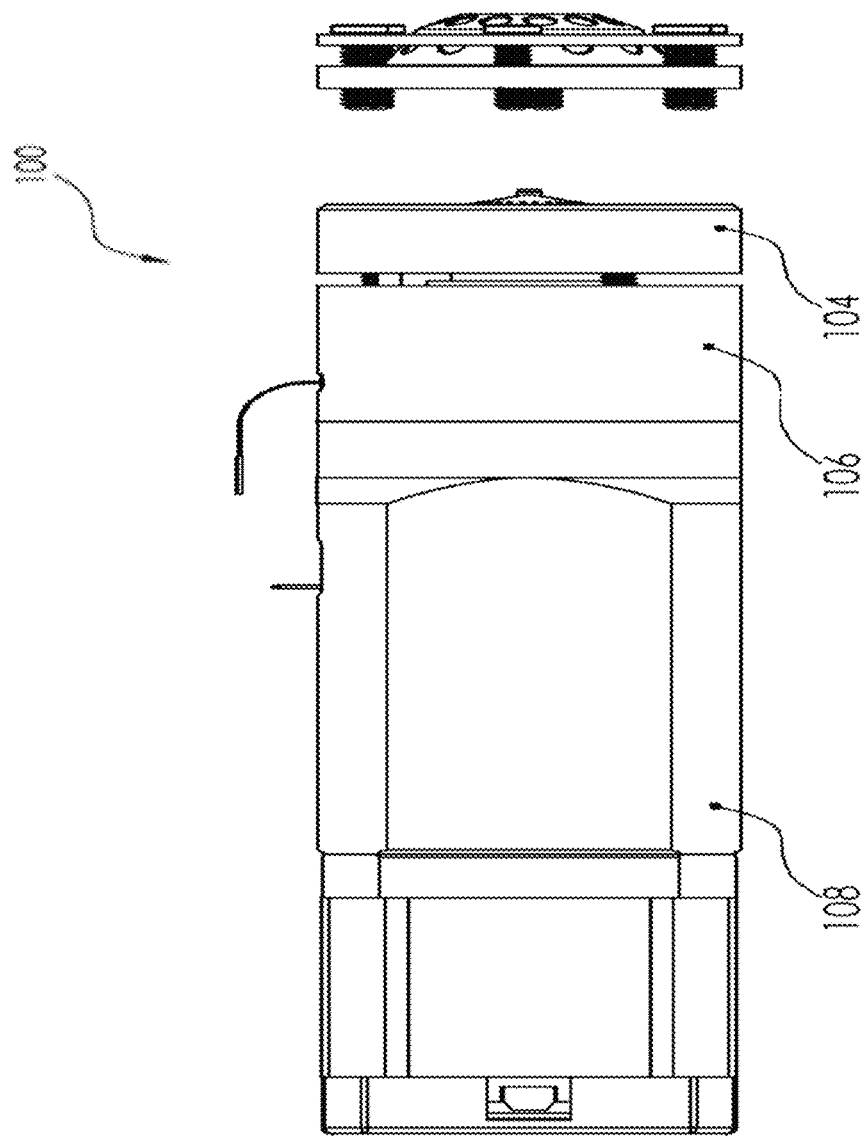
FIG. 1B is a partial side sectional view of the CERV of FIG. 1A, in accordance with one embodiment of the invention.
Figure 1C:
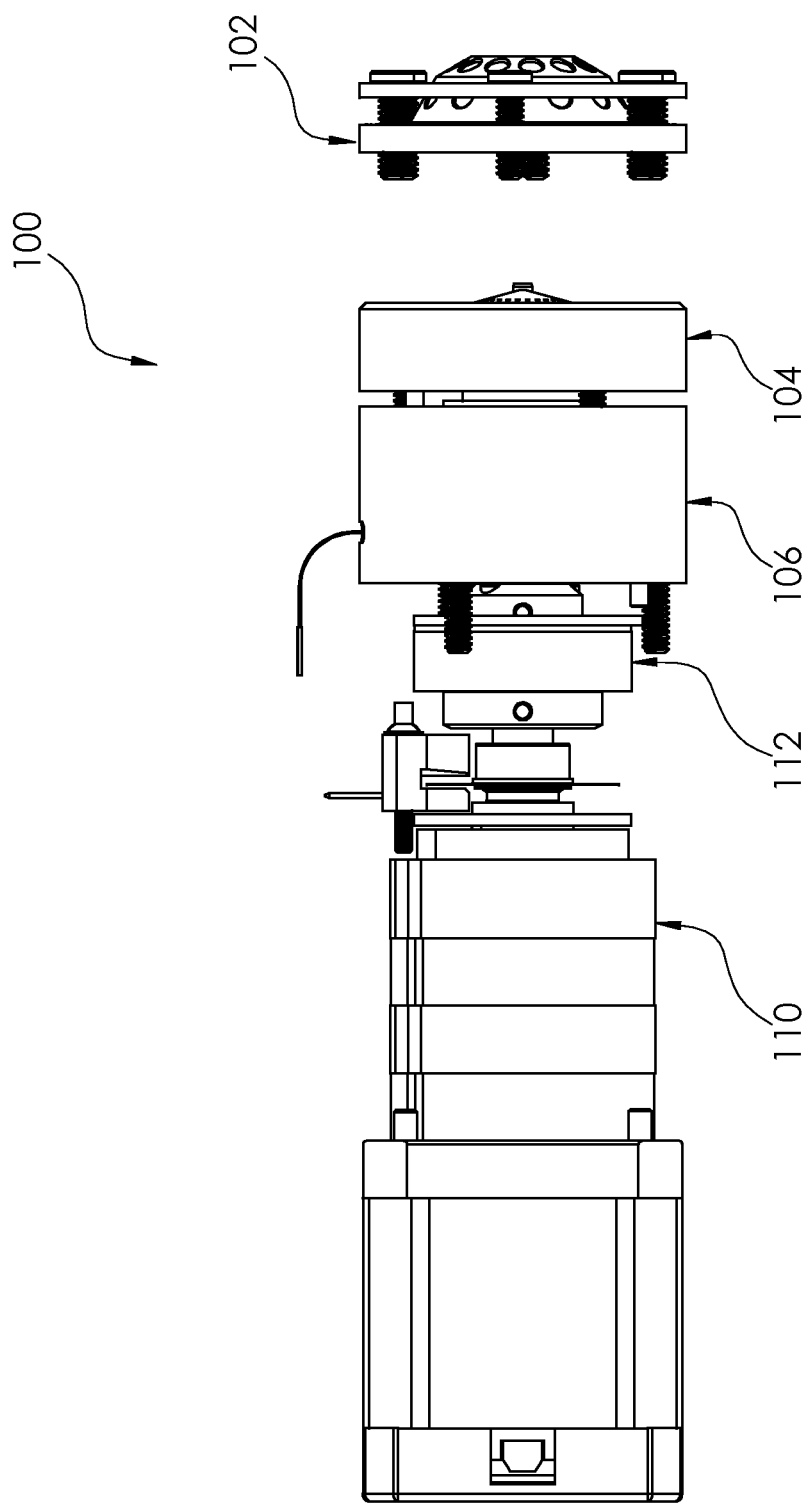
FIG. 1C is a side sectional view of the CERV of FIG. 1A, in accordance with one embodiment of the invention.
Figure 1D:
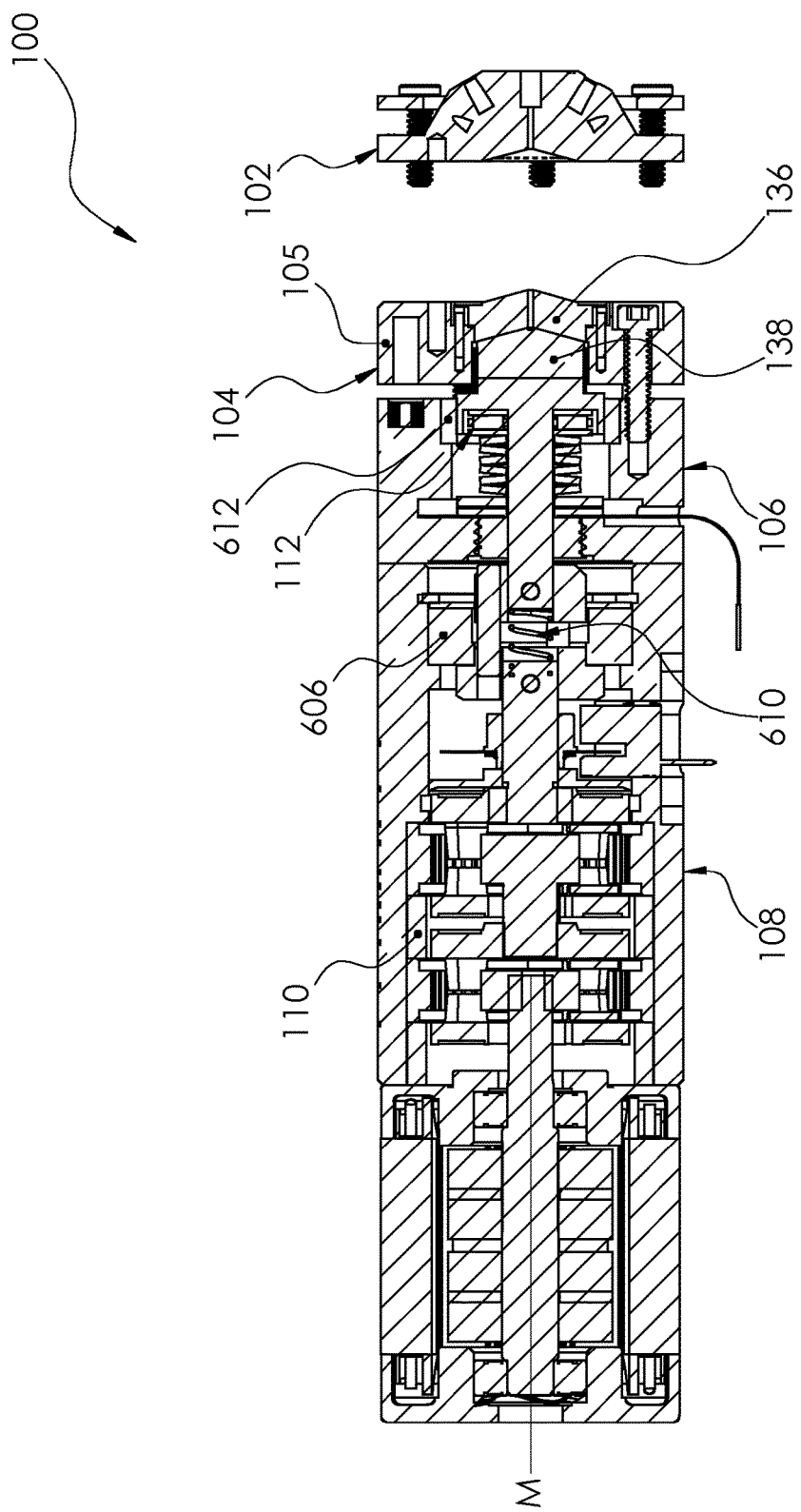
FIG. 1D is a partial side sectional view of the CERV of FIG. 1A, in accordance with one embodiment of the invention.
Figure 2A:
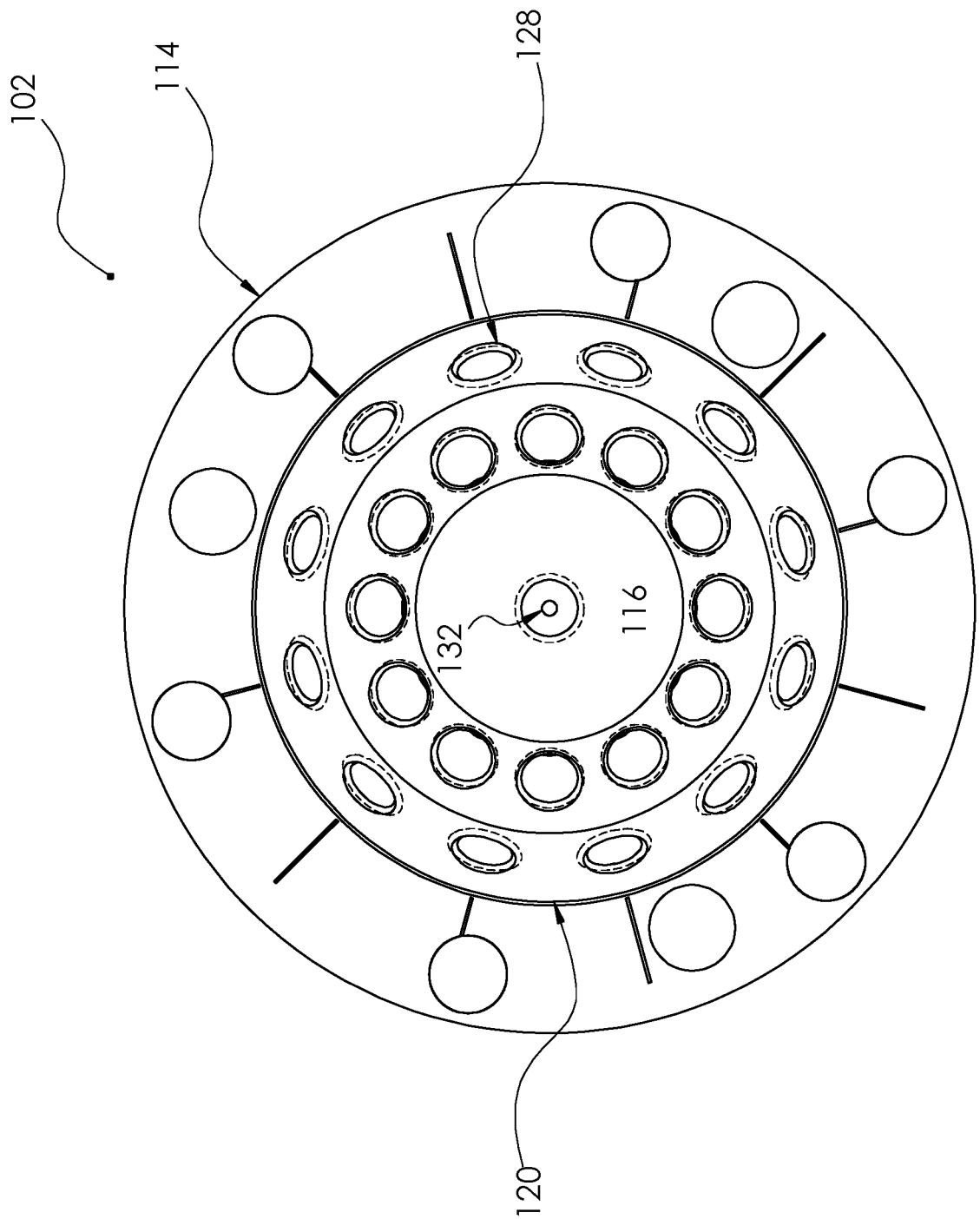
FIG. 2A is a top-down view of an adapter for use with the CERV of FIG. 1A, in accordance with one embodiment of the invention.
Figure 2B:
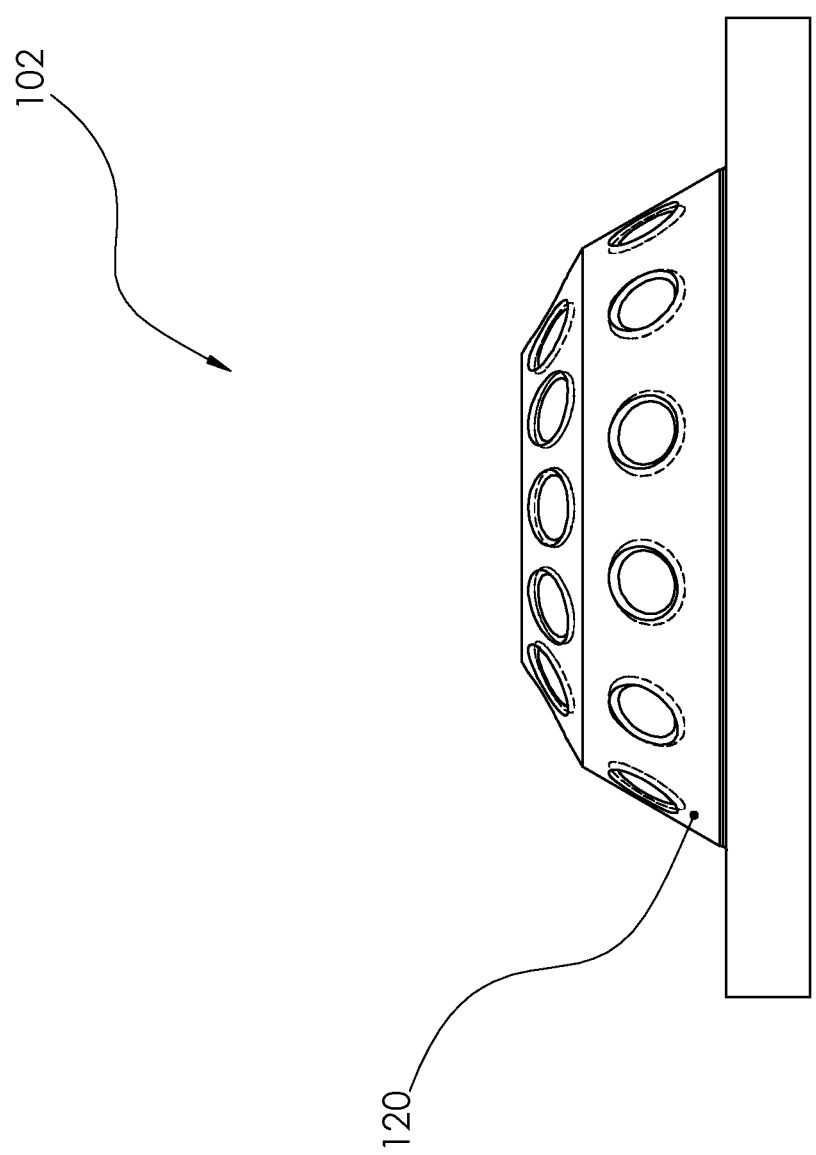
FIG. 2B is a side view of the adapter of FIG. 2A, with mounting screws, in accordance with one embodiment of the invention.
Figure 2C:
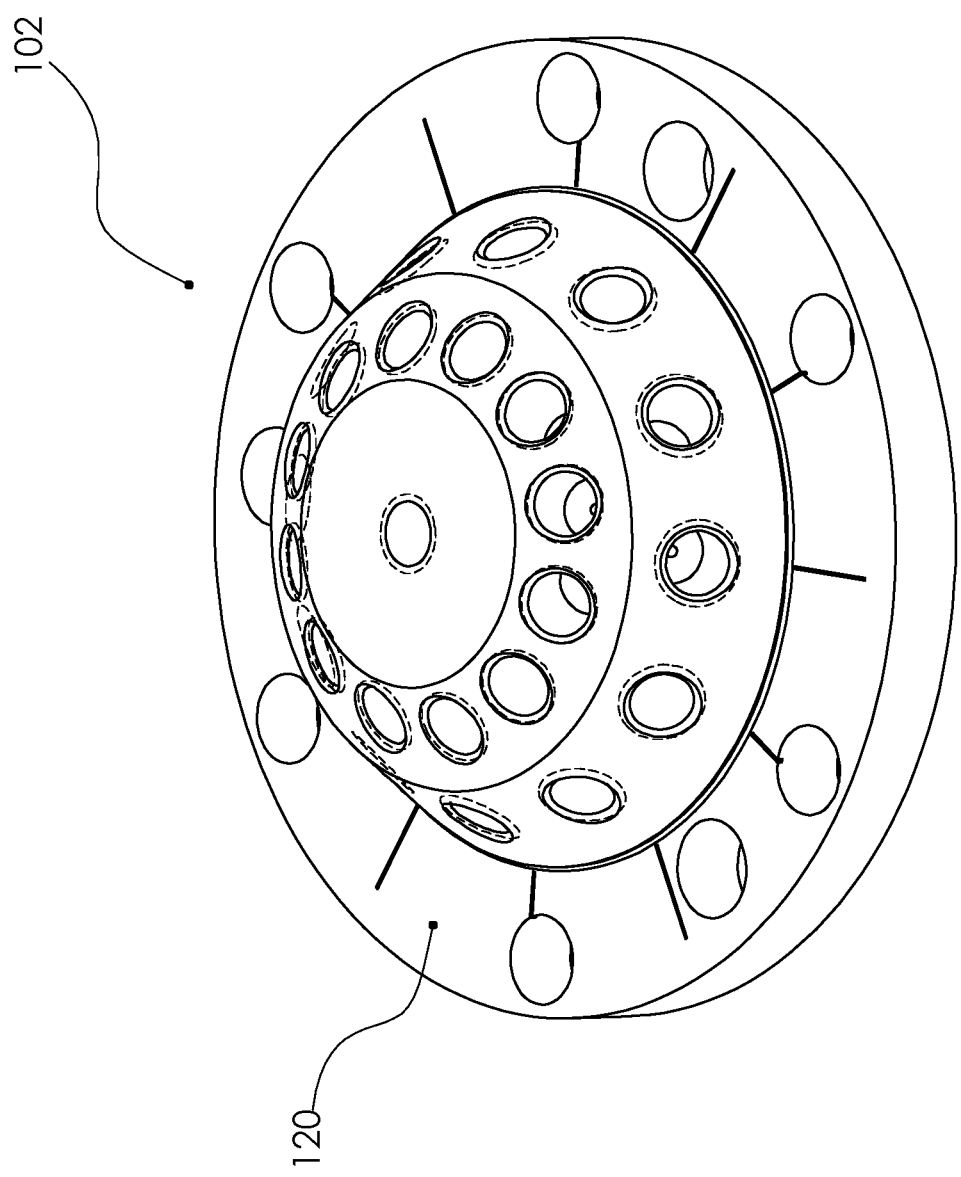
FIG. 2C is a top-down, side perspective view of the adapter of FIG. 2A.
Figure 2D:
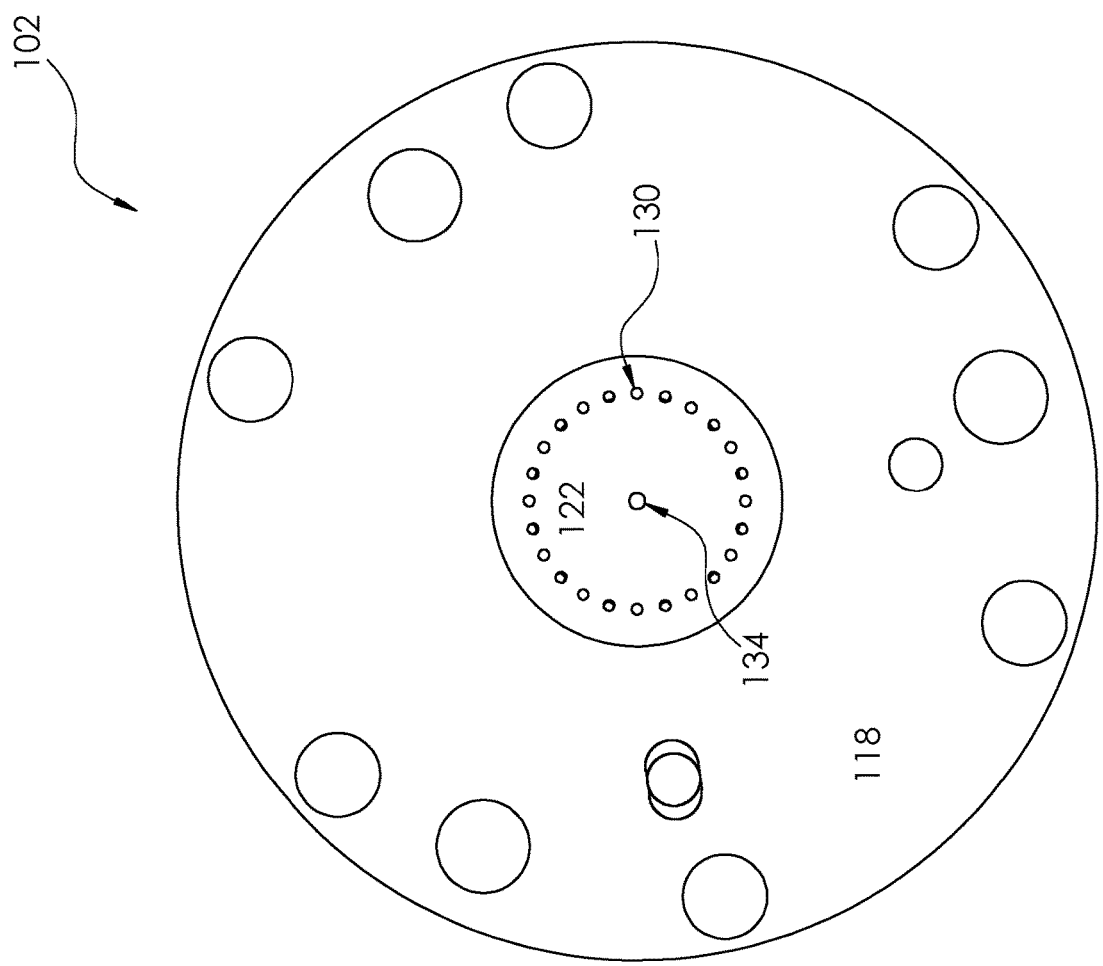
FIG. 2D is a bottom-up view of the adapter of FIG. 2A.
Figure 2E:
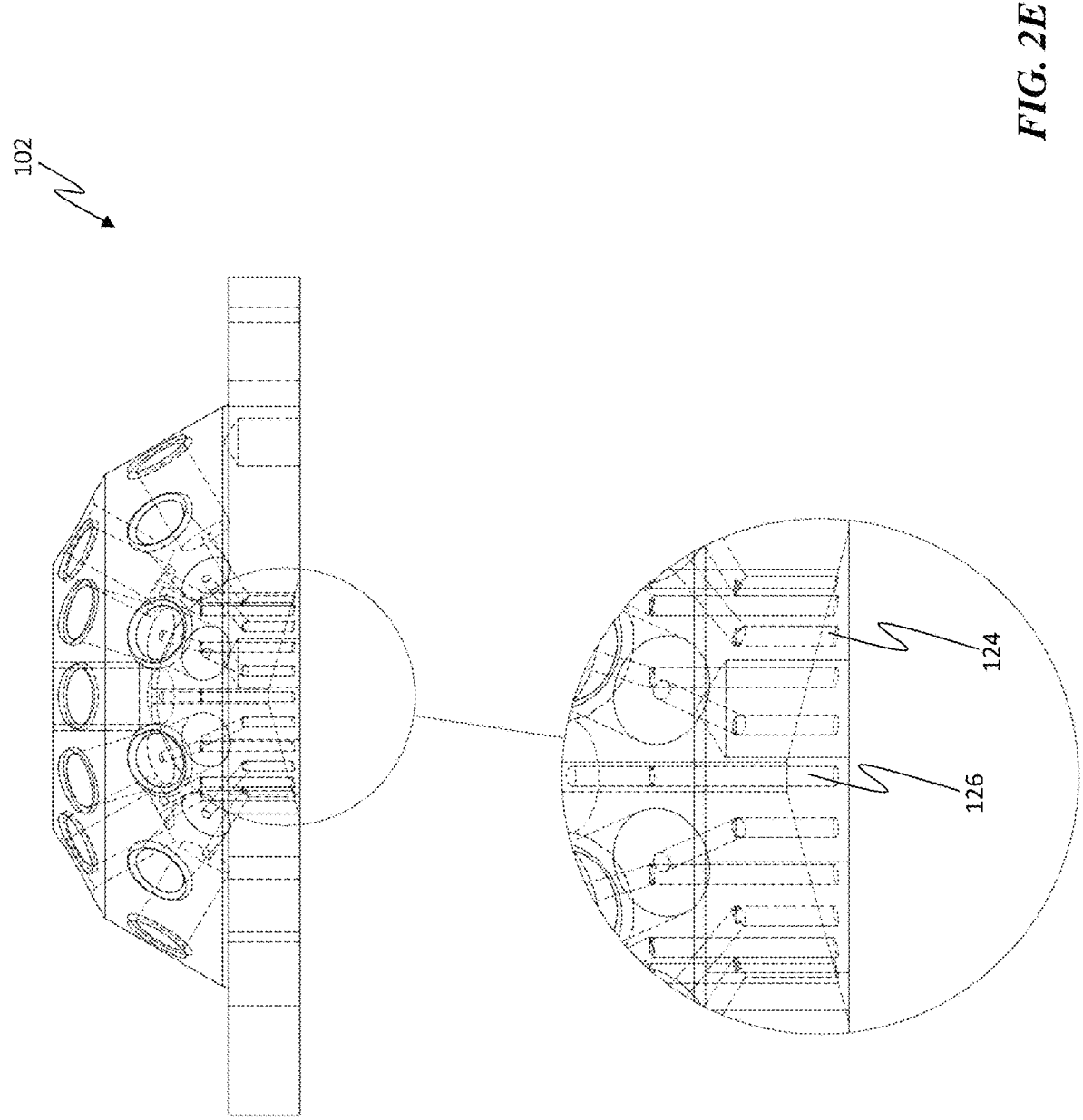
FIG. 2E is a side sectional view of the adapter of FIG. 2A.
Figure 2F:
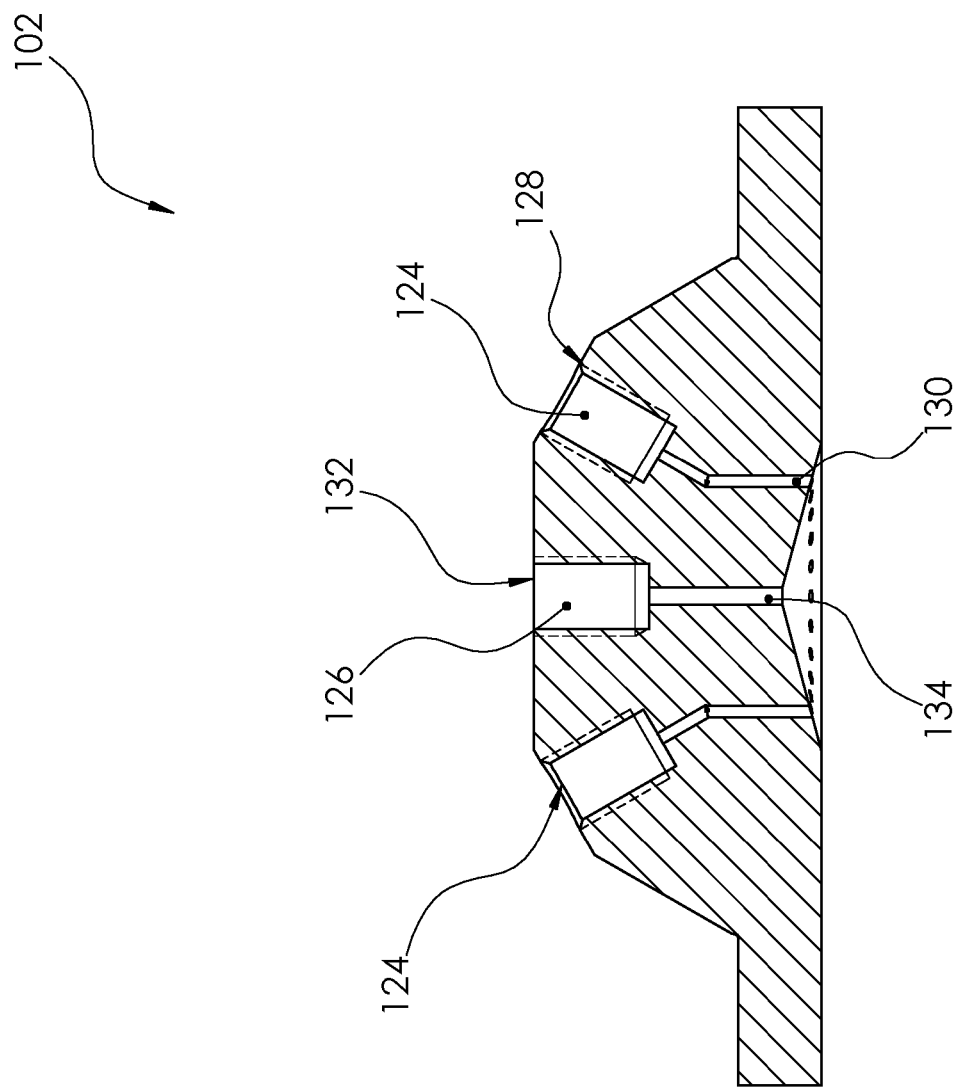
FIG. 2F is a side sectional view of the adapter of FIG. 2A.
Figure 2G:
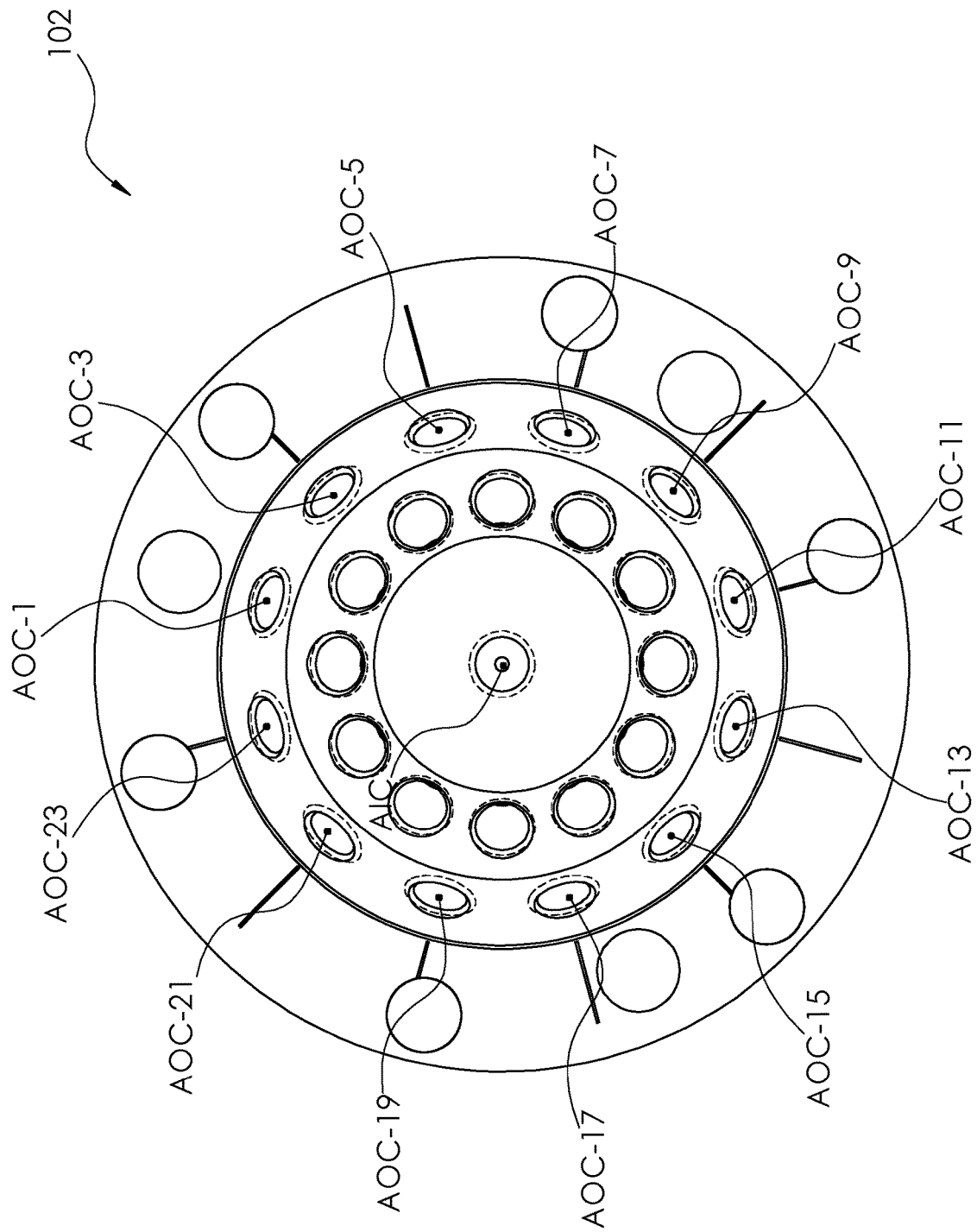
FIG. 2G is a top-down view of the adapter of FIG. 2A.
Figure 2H:
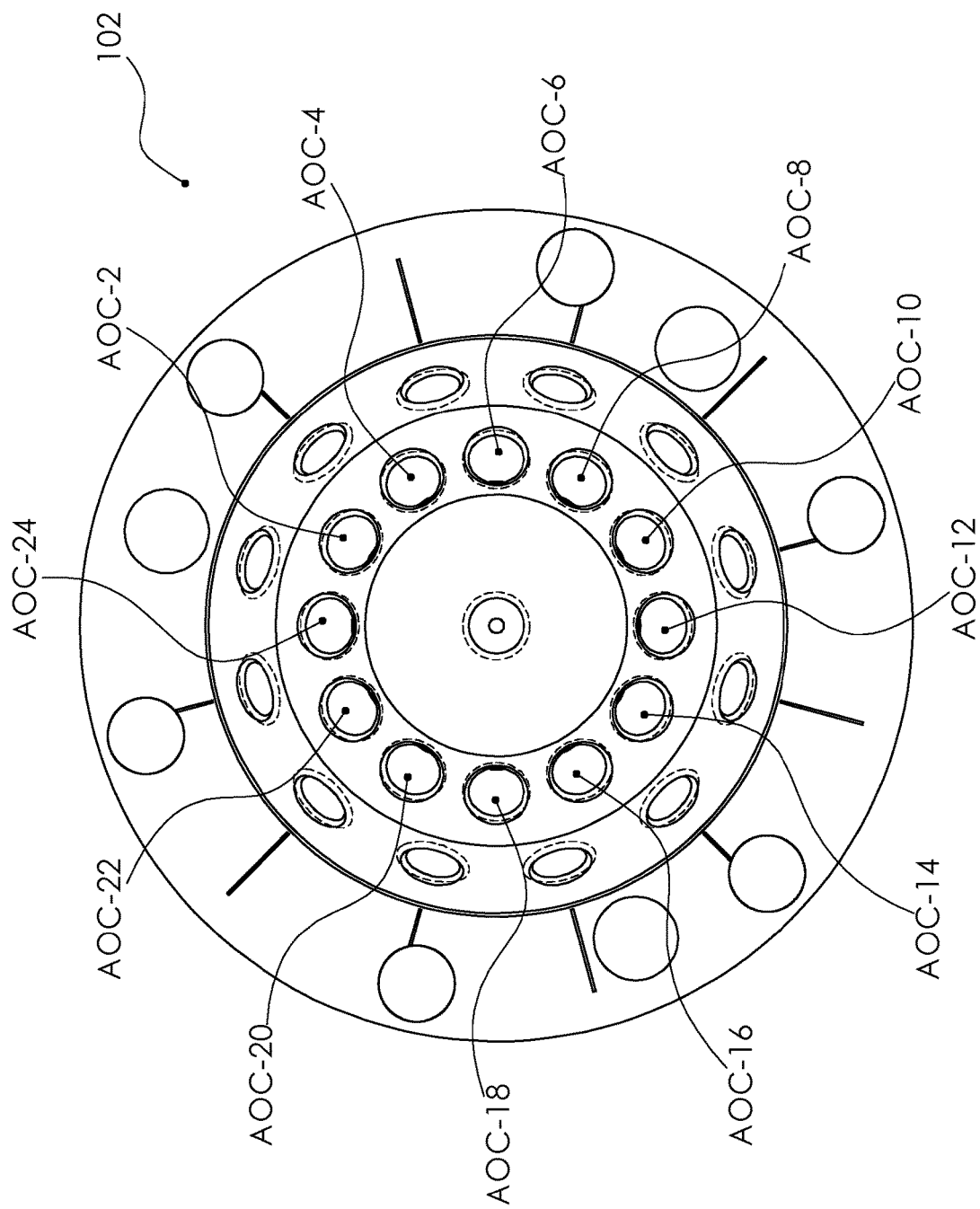
FIG. 2H is a top-down view of the adapter of FIG. 2A.
Figure 2I:
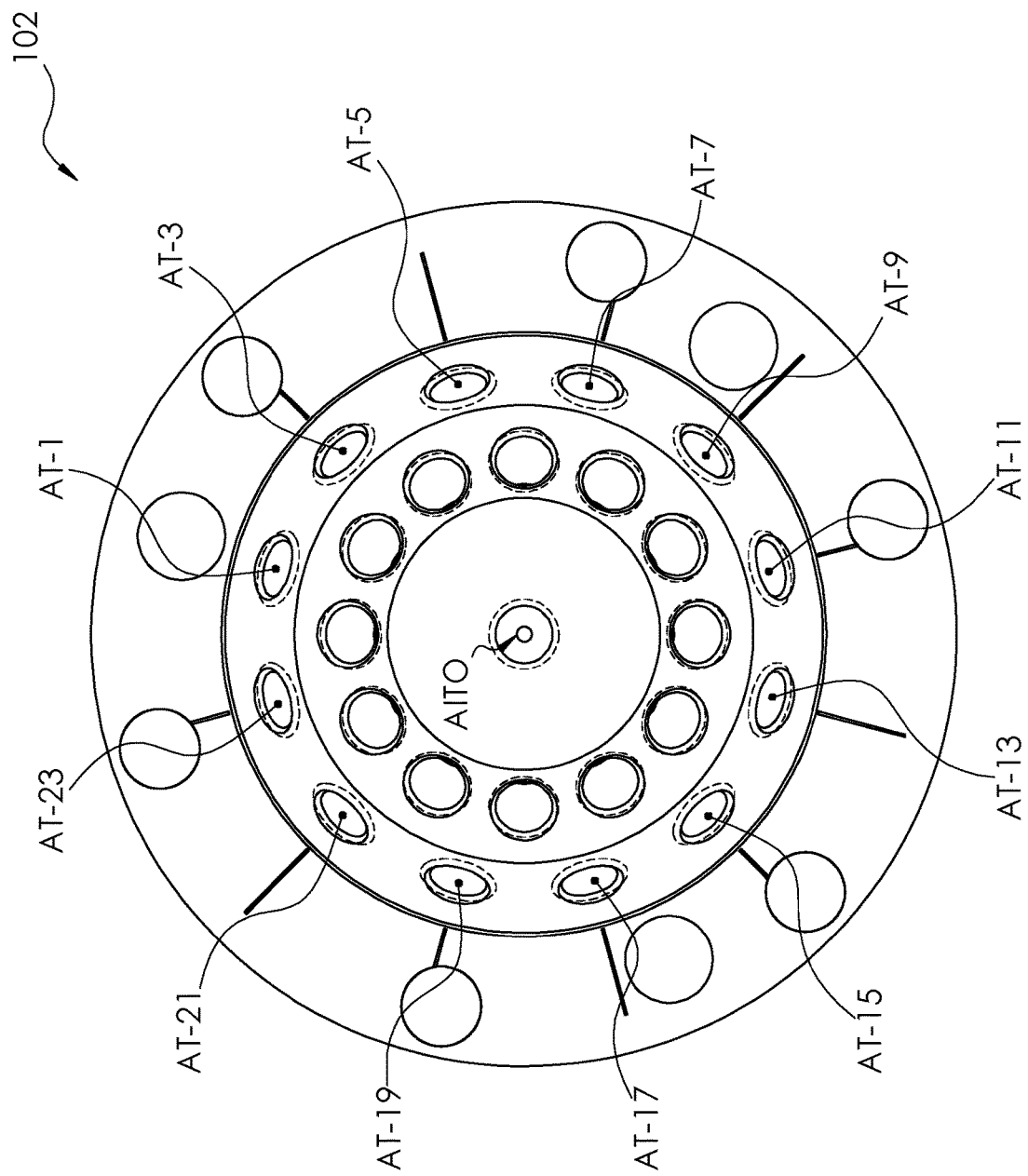
FIG. 2I is a top-down view of the adapter of FIG. 2A.
Figure 2J:
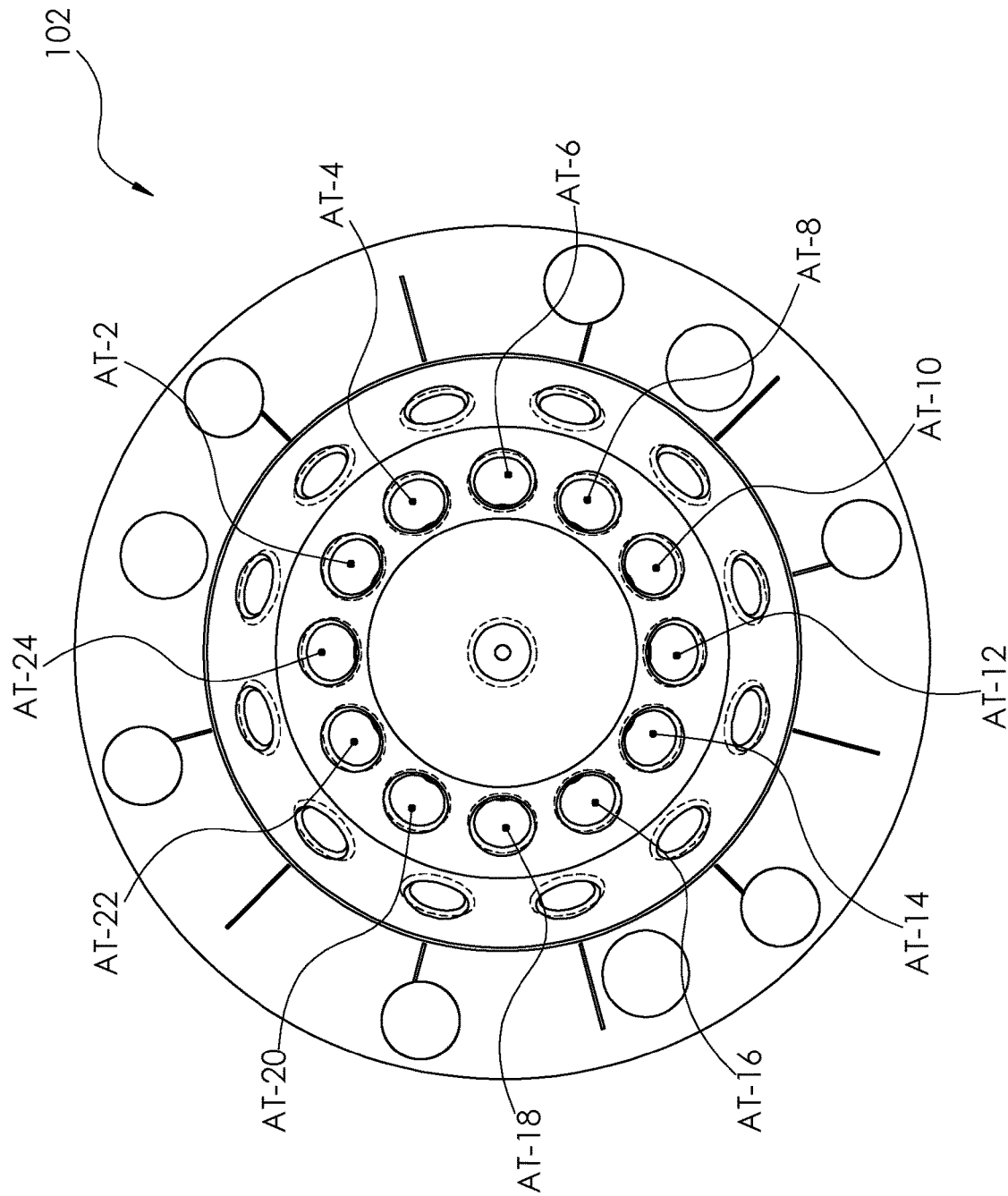
FIG. 2J is a top-down view of the adapter of FIG. 2A.
Figure 2K:
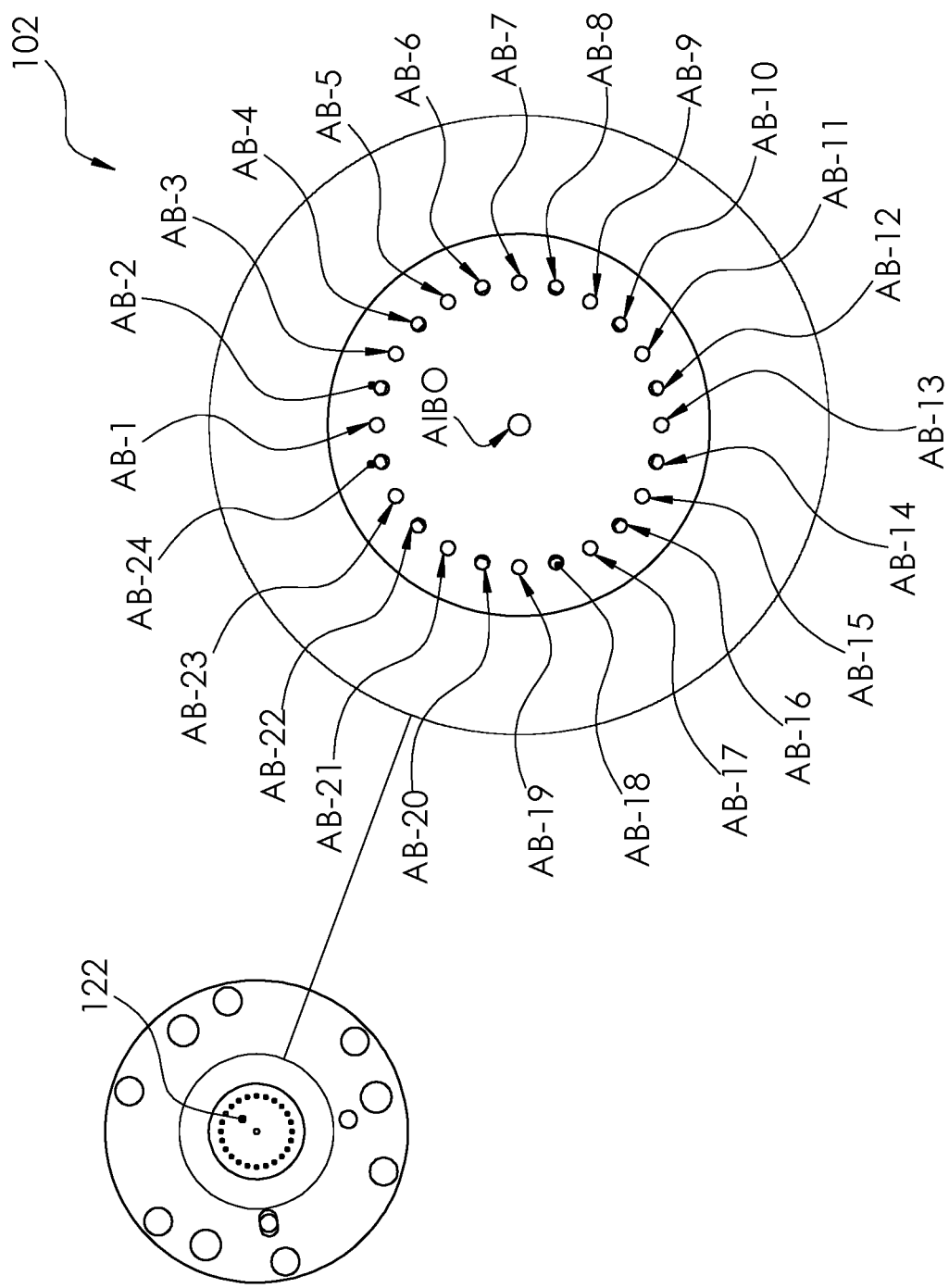
FIG. 2K is a bottom-up view of the adapter of FIG. 2A.

In accordance with the present invention, a unique and novel Centering Electronic Rotary Valve (CERV) 100 is provided. It should be appreciated that, in one or more embodiments of the invention, the CERV 100 utilizes a unique and novel conical design which advantageously improves the precise port line-up between the track and the ports being selected by placing the components on a common center line. One advantage of this unique and novel design is that this design significantly reduces the need for applying a higher vertical pressure between the components (i.e. in the direction of an imaginary plane that extends through the top of the CERV 100 and the bottom of the CERV 100). Accordingly, due to the reduced need for higher vertical pressures, the material wear is significantly reduced. Moreover, the conical design further allows for a reduced (or even eliminated) risk of fluid sample/reagent carryover. It should be appreciated that in one or more embodiments, the lower body of the CERV 100 may contain a thrust bearing which may act to reduce friction, and the upper body may contain a radial bearing to provide accuracy of the 'on center' position of the drive shafts without the need for tapered splines.

Additionally, the components of the invention may be constructed (wholly or partially) via polymer and/or composite materials which may act to reduce material wear and may provide inert stability. Furthermore, the present invention may include one or more Electronic Vertical Force Sensors (EVFS) within the pressure load path to provide for a measurement (constant or periodic, as desired) of the load force being applied. This would advantageously help to ensure that a consistent and known vertical load force is applied during each assembly. As such, the vertical load force may be monitored, constantly and/or periodically, as desired and the invention may inform an operator (or other entity) that compression has changed within the CERV 100. Additionally, an incremental encoder may be utilized (such as an encoder with a high-resolution reading capability) to maintain the accuracy of each motor step. It should be appreciated that in one or more embodiments, the CERV 100 may include a processing device which stores data captured from the EVFS and an encoder reader to monitor the vertical force and the positional verification of track to port alignment.

Referring to FIG. 1A, FIG. 1B, FIG. 1C and FIG. 1D, a unique and novel Centering Electronic Rotary Valve (CERV) 100 is shown in accordance with one embodiment of the invention. The CERV 100 includes an adapter 102, a shear valve housing 104, a mid-body housing 106 and a top-body housing 108, wherein the mid-body housing 106 and the top-body housing 108 house a motor 110 and a drive system 112 for operating the CERV 100. It should be appreciated that the present invention contemplates multiple embodiments. In one or more embodiments, the adapter 102 may be configured to interface with a manifold to receive a fluid from the manifold for introduction into the CERV 100. In other embodiments, the adapter 102 may be configured as a manifold to introduce a fluid into the CERV 100. The adapter 102 will be discussed herein as being configured as an adapter 102 to interface with a manifold.

Adapter

Referring to FIG. 2A, FIG. 2B, FIG. 2C, FIG. 2D, FIG. 2E and FIG. 2F, the adapter 102 is shown and includes an adapter structure 114 having an adapter top 116 and an adapter bottom 118, wherein the adapter top 116 includes an adapter top interface portion 120 which is substantially domed shaped (and/or arcuate in shape) and wherein the adapter bottom 118 includes an adapter bottom interface cavity 122 which is substantially concave and arcuate in shape (and/or pseudo-triangular shaped). It should be appreciated that in other embodiments, the adapter top interface portion 120 and/or the adapter bottom interface cavity 122 may be any shape desired suitable to the desired end purpose. It should be appreciated that the adapter structure 114 defines twenty-four (24) adapter output channels (AOC-1 to AOC-24) 124 and one (1) adapter input channel (AIC) 126, wherein each of the adapter output channels 124 includes an adapter output channel top opening 128 (i.e.

twenty-four (24) adapter output channel top openings (AT1-AT24) 128) and an adapter output channel bottom opening 130 (i.e. twenty-four (24) adapter output channel bottom openings (AB1-AB24) 130) and wherein the adapter input channel 126 includes an adapter input channel top opening (AITO) 132 and an adapter input channel bottom opening (AIBO) 134.

Referring to Table I immediately hereinafter and FIG. 2G, FIG. 2H, FIG. 2I, FIG. 2J and FIG. 2K, the relationship between each of the adapter output channels (AO1-AO24) 124, the one (1) adapter input channel (AI-1) 126, the adapter output channel top openings (AT1-AT24) 128 and the adapter output channel bottom openings (AB1-AB24) are shown.

| Adapter Channel | Associated Adapter Top Opening | Associated Adapter Bottom Opening |
| --- | --- | --- |
| AIC | AITO | AIBO |
| AOC-1 | AT-1 | AB-1 |
| AOC-2 | AT-2 | AB-2 |
| AOC-3 | AT-3 | AB-3 |
| AOC-4 | AT-4 | AB-4 |
| AOC-5 | AT-5 | AB-5 |
| AOC-6 | AT-6 | AB-6 |
| AOC-7 | AT-7 | AB-7 |
| AOC-8 | AT-8 | AB-8 |
| AOC-9 | AT-9 | AB-9 |
| AOC-10 | AT-10 | AB-10 |
| AOC-11 | AT-11 | AB-11 |
| AOC-12 | AT-12 | AB-12 |
| AOC-13 | AT-13 | AB-13 |
| AOC-14 | AT-14 | AB-14 |
| AOC-15 | AT-15 | AB-15 |
| AOC-16 | AT-16 | AB-16 |
| AOC-17 | AT-17 | AB-17 |
| AOC-18 | AT-18 | AB-18 |
| AOC-19 | AT-19 | AB-19 |
| AOC-20 | AT-20 | AB-20 |
| AOC-21 | AT-21 | AB-21 |
| AOC-22 | AT-22 | AB-22 |
| AOC-23 | AT-23 | AB-23 |
| AOC-24 | AT-24 | AB-24 |

Accordingly, a fluid introduced into the adapter input channel top opening (AITO) 132 will flow into and through the adapter input channel (AIC) 126 and out of the adapter input channel bottom opening (AIBO 134). Additionally, a fluid introduced into one of the adapter output channel bottom openings (AB1-AB24) 130 will flow into the respective adapter output channel (AO1-AO24) 124 and out of the respective adapter output channel top opening (AT1-AT24) 128. For example, if a fluid is introduced into the first adapter output channel bottom opening (AB-1) 130, the fluid will flow into and through the first adapter output channel (AO1) 124 and out of the first adapter output channel top opening (AT1) 128. It should be appreciated that the adapter output channel top openings 128 and the adapter input channel top opening 132 are located in the adapter top interface portion 120 and the adapter output channel bottom openings 130 and the adapter input channel bottom opening 134 are located in the adapter bottom interface cavity 122.

Referring to the FIGURES, the shear valve housing 104 is shown and includes a valve housing 105 which encloses a centering stator 136 and a centering rotor 138.

Stator

Referring to FIG. 3A, FIG. 3B, FIG. 3C, FIG. 3D, FIG. 3E, FIG. 3F and FIG. 3G, the centering stator 136 includes a stator structure 140 having a stator top 142 and a stator bottom 144, wherein the stator top 142 includes a stator top interface portion 146 which is substantially conical in shape (and/or substantially triangular in shape) and wherein the stator bottom 144 includes a stator bottom interface cavity 148 which is substantially conically concave in shape (and/or substantially triangular shaped). It should be appreciated that in other embodiments, the stator top interface portion 146 and/or the stator bottom interface cavity 148 may be any shape desired suitable to the desired end purpose. It should be appreciated that the stator structure 140 defines twenty-four (24) stator output channels (SOC-1 to SOC-24) 150 and one (1) stator input channel (SIC) 152, wherein each of the stator output channels (SOC-1 to SOC-24) 150 includes a stator output channel top opening 154 (i.e. twenty-four (24) stator output channel top openings (ST-1 to ST-24) 154) and a stator output channel bottom opening 156 (i.e. twenty-four (24) stator output channel bottom openings (SB-1 to SB-24) 156) and wherein the stator input channel (SIC) 152 includes a stator input channel top opening (SITO) 158 and a stator input channel bottom opening (SIBO) 160. The stator input channel top opening 158 is located at the apex of the conical shaped stator top and communicated with a stator input channel bottom opening via a stator input channel.

Figure 3A:
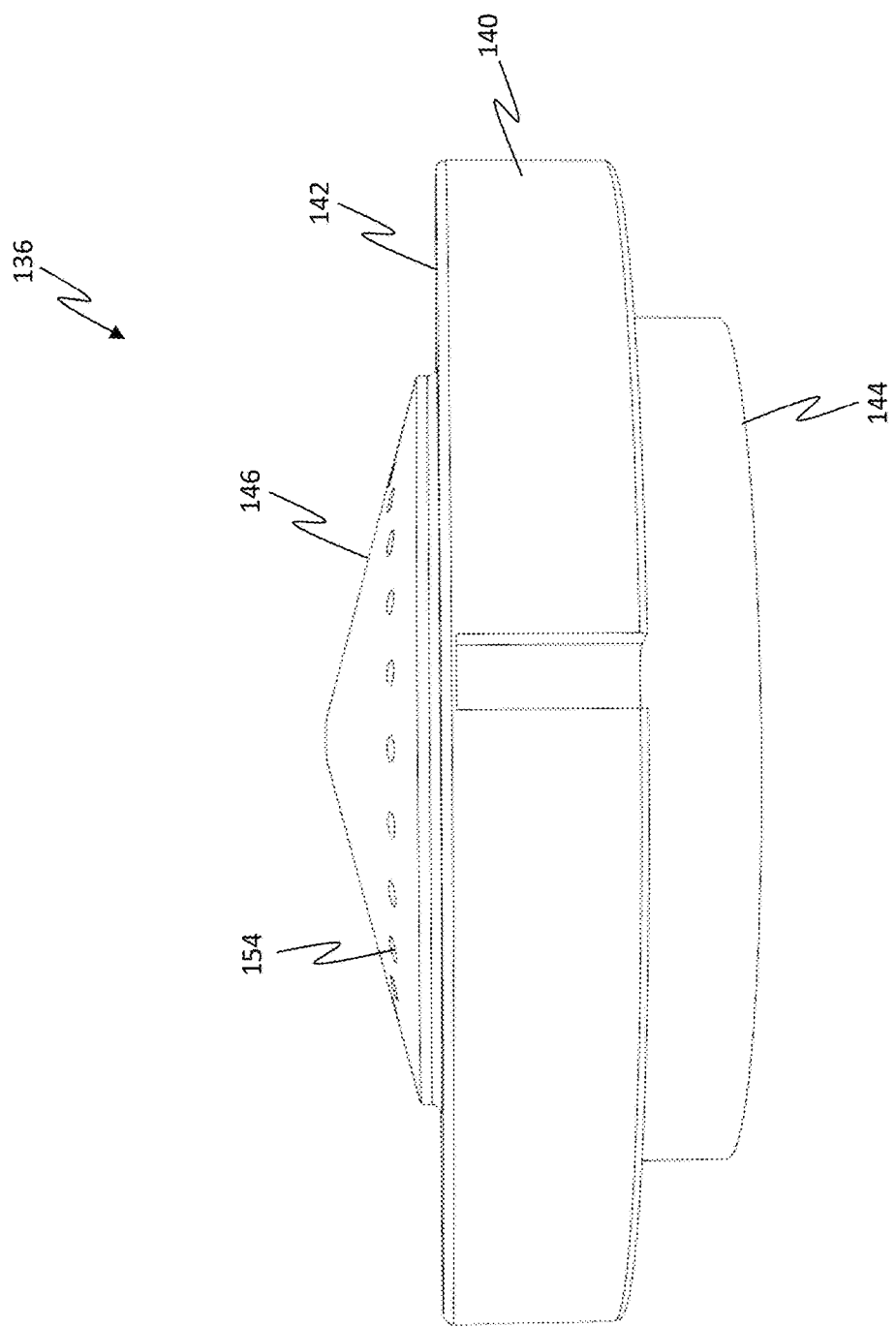
FIG. 3A is a side view of a stator for use with the CERV of FIG. 1A, in accordance with one embodiment of the invention.
Figure 3B:
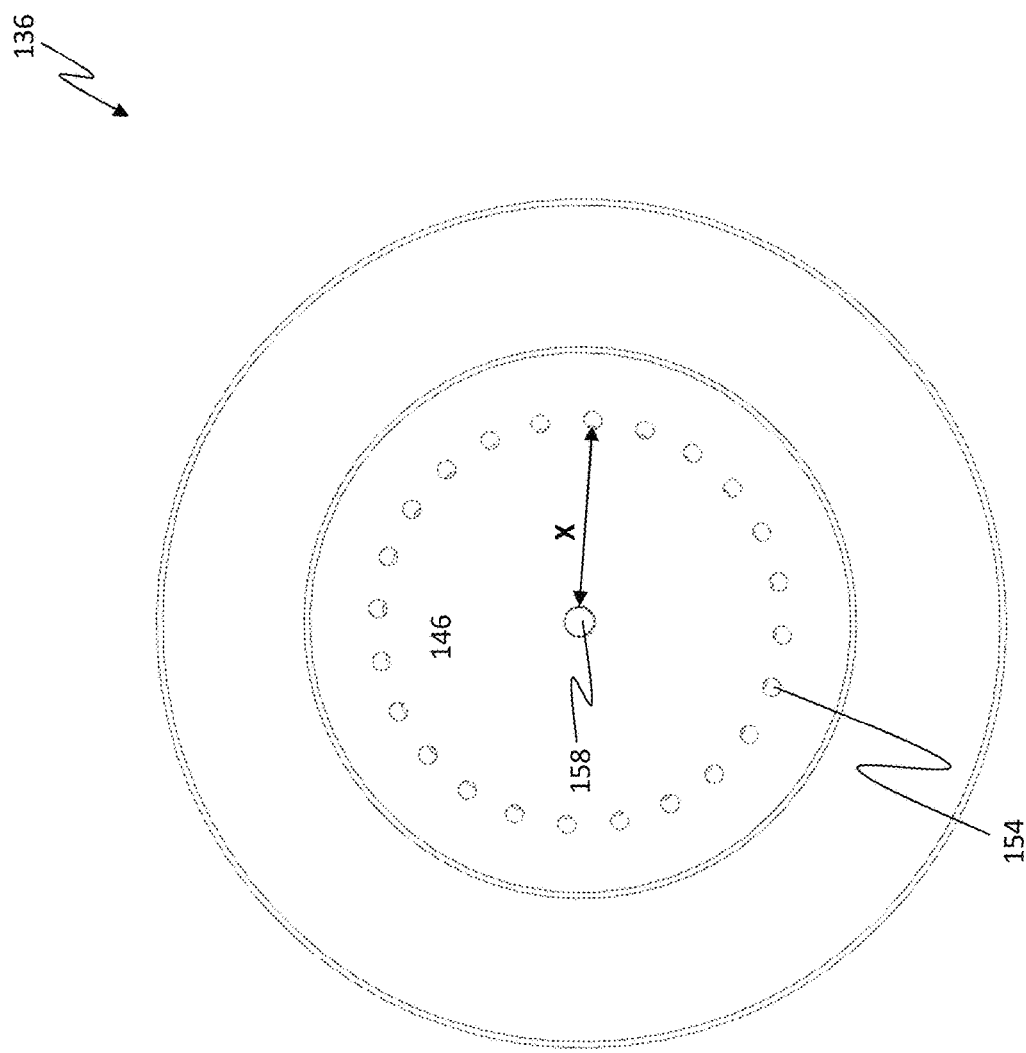
FIG. 3B is a top-down view of the stator of FIG. 3A.
Figure 3C:
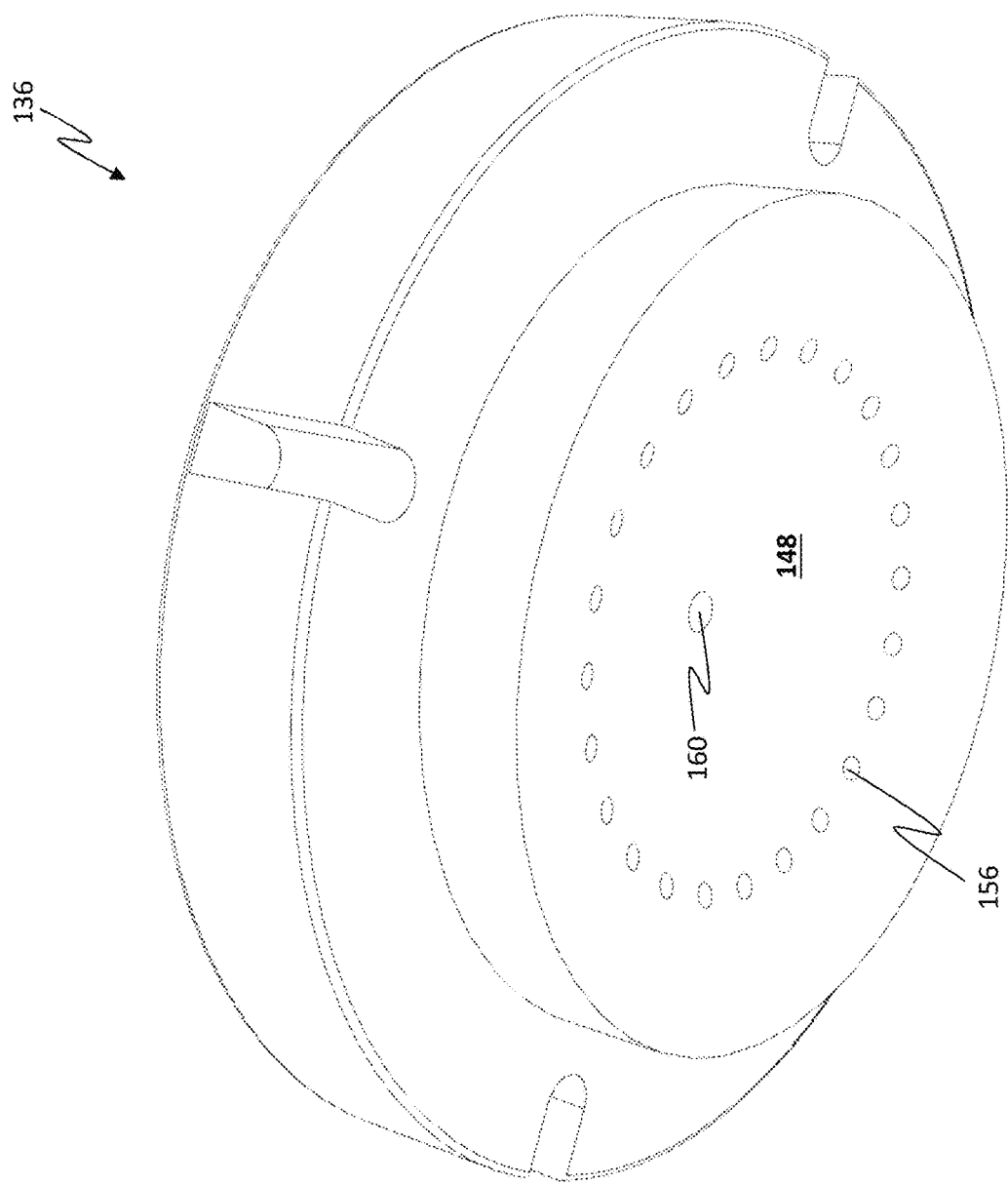
FIG. 3C is a bottom-up, side perspective view of the stator of FIG. 3A.
Figure 3D:
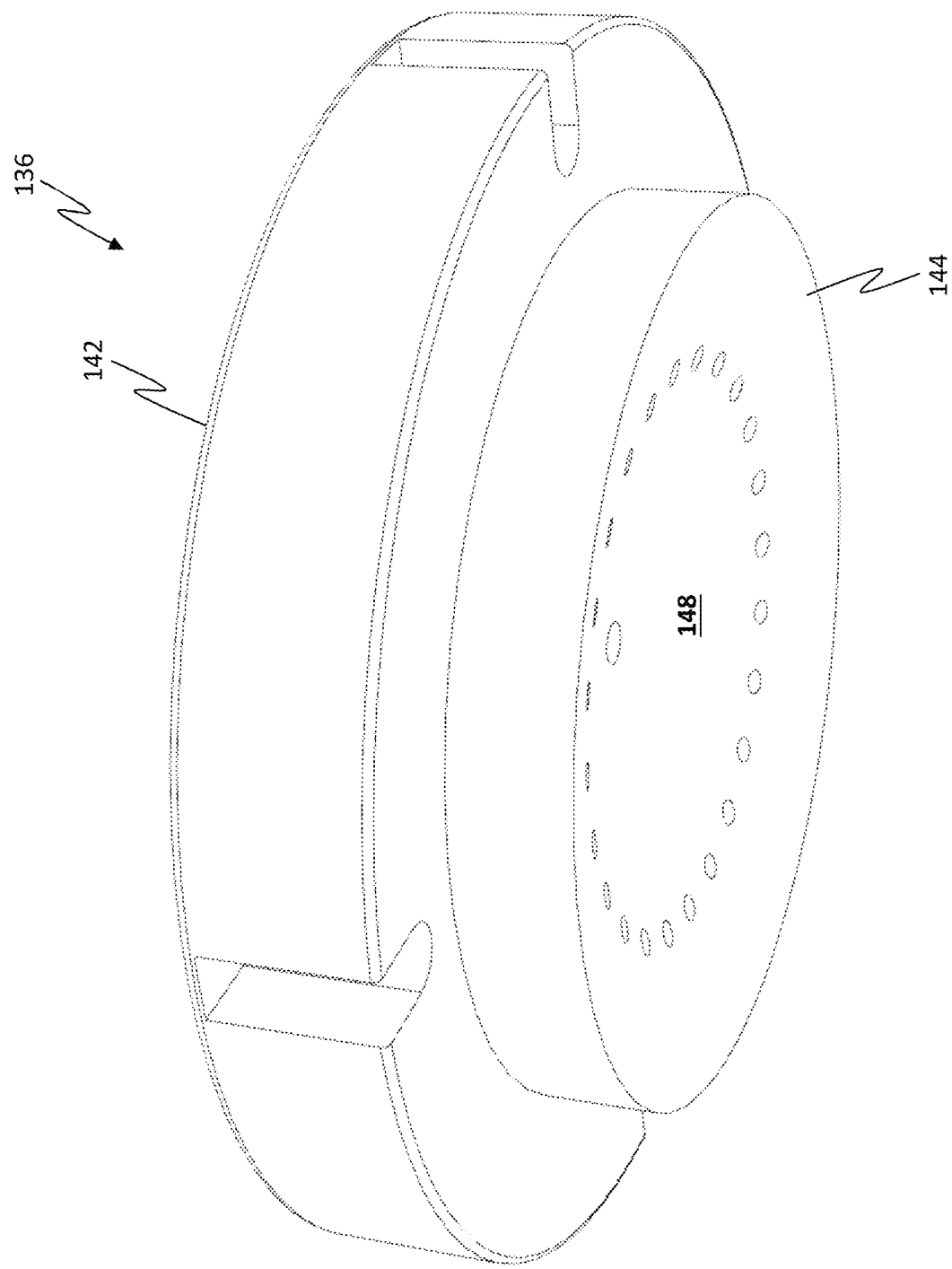
FIG. 3D is a bottom-up, side perspective view of the stator of FIG. 3A.
Figure 3F:
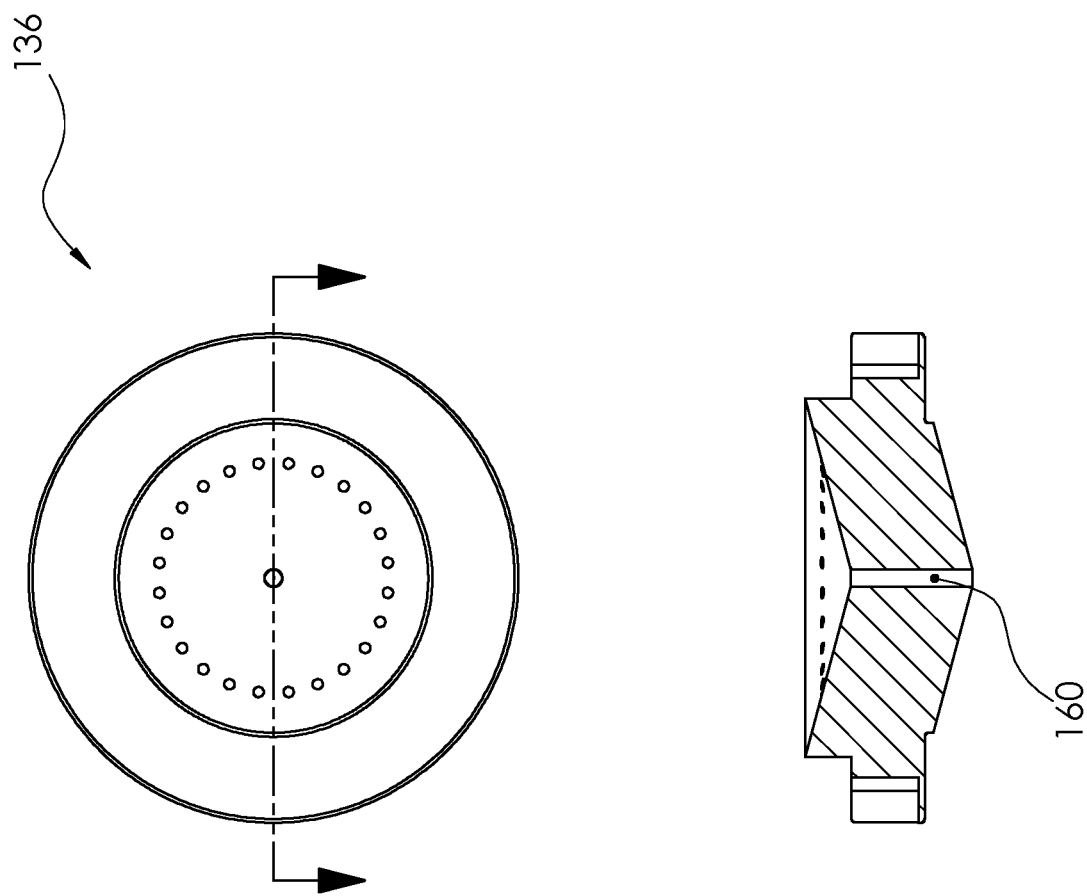
FIG. 3F is a side sectional view of the stator of FIG. 3A.
Figure 3G:
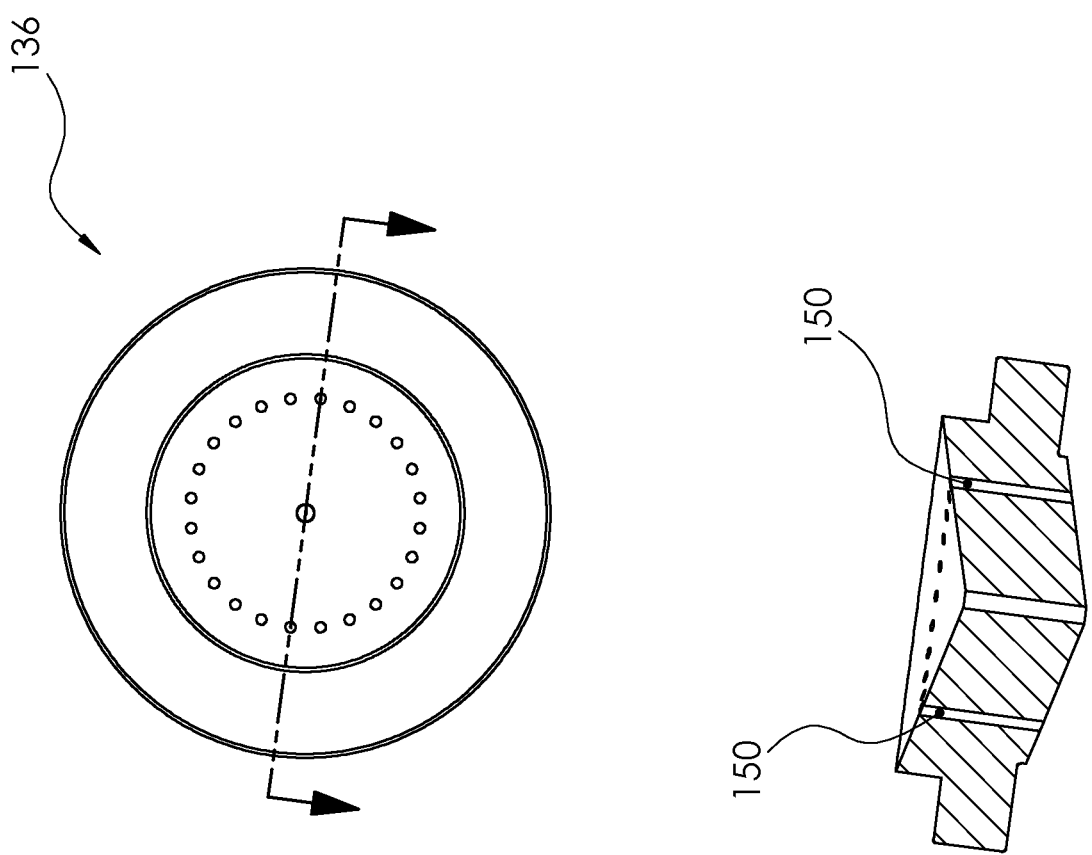
FIG. 3G is a side sectional view of the stator of FIG. 3A.
Figure 3H:
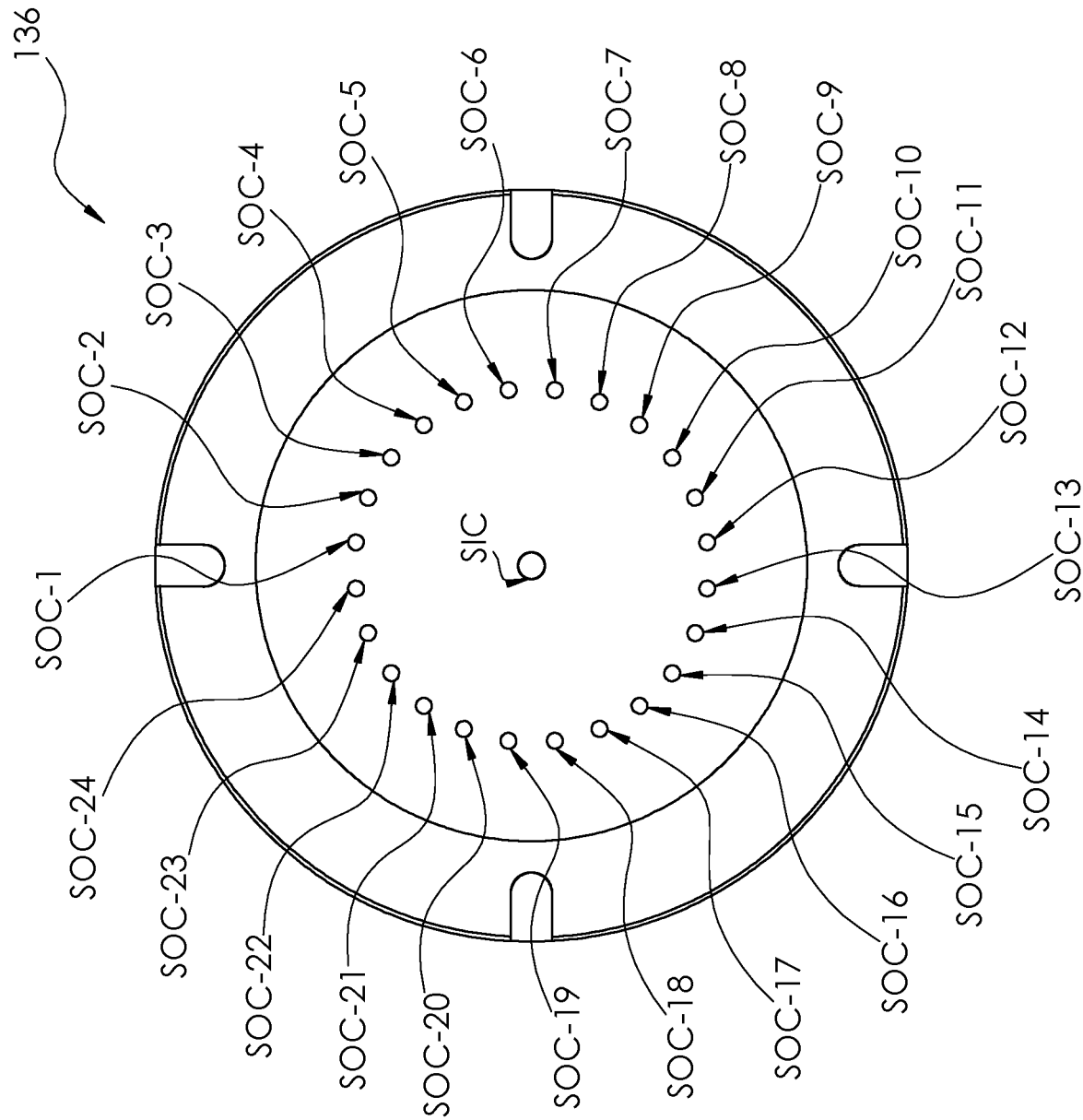
FIG. 3H is a top-down view of the stator of FIG. 3A.
Figure 3I:
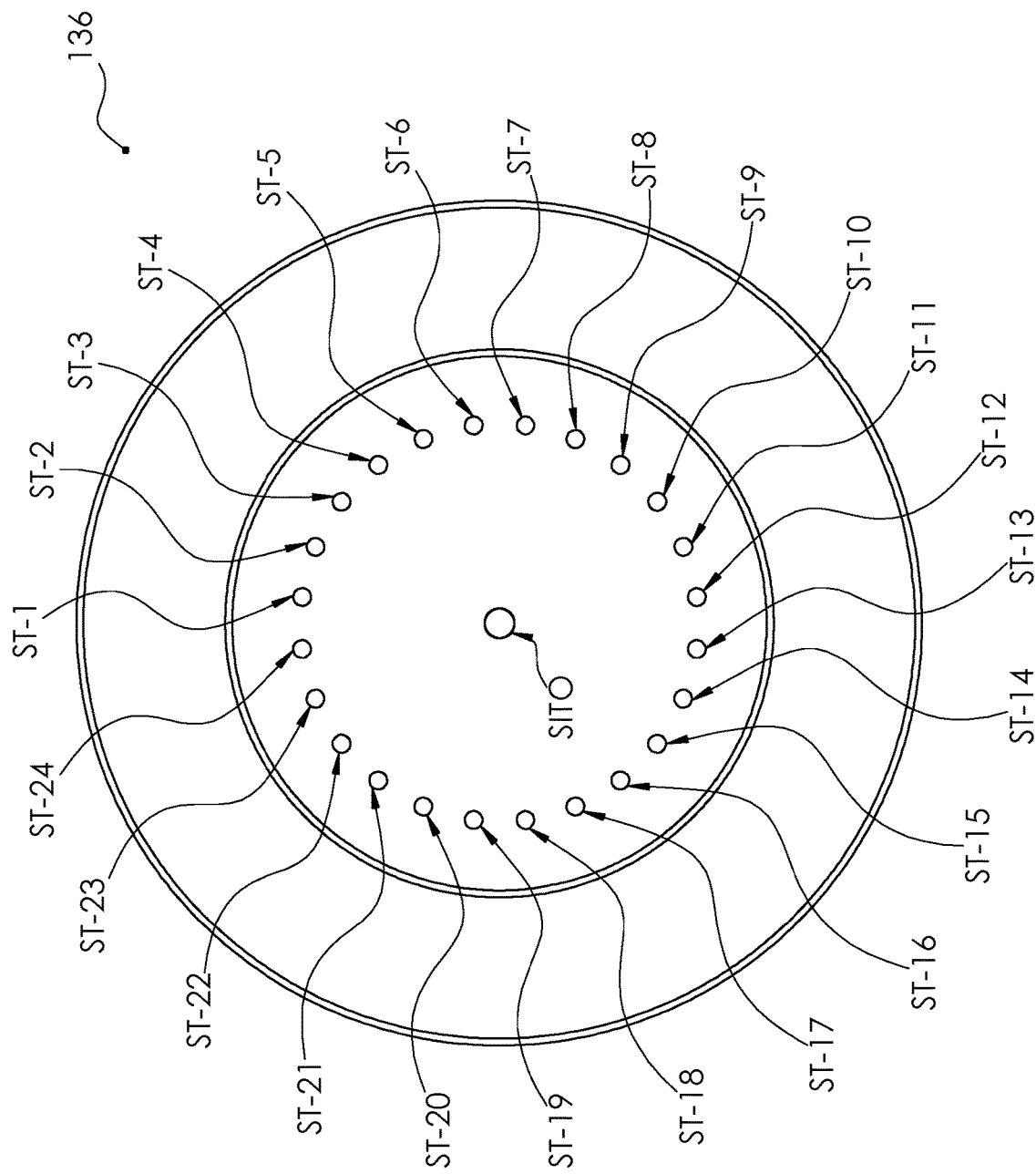
FIG. 3I is a top-down view of the stator of FIG. 3A.
Figure 3J:
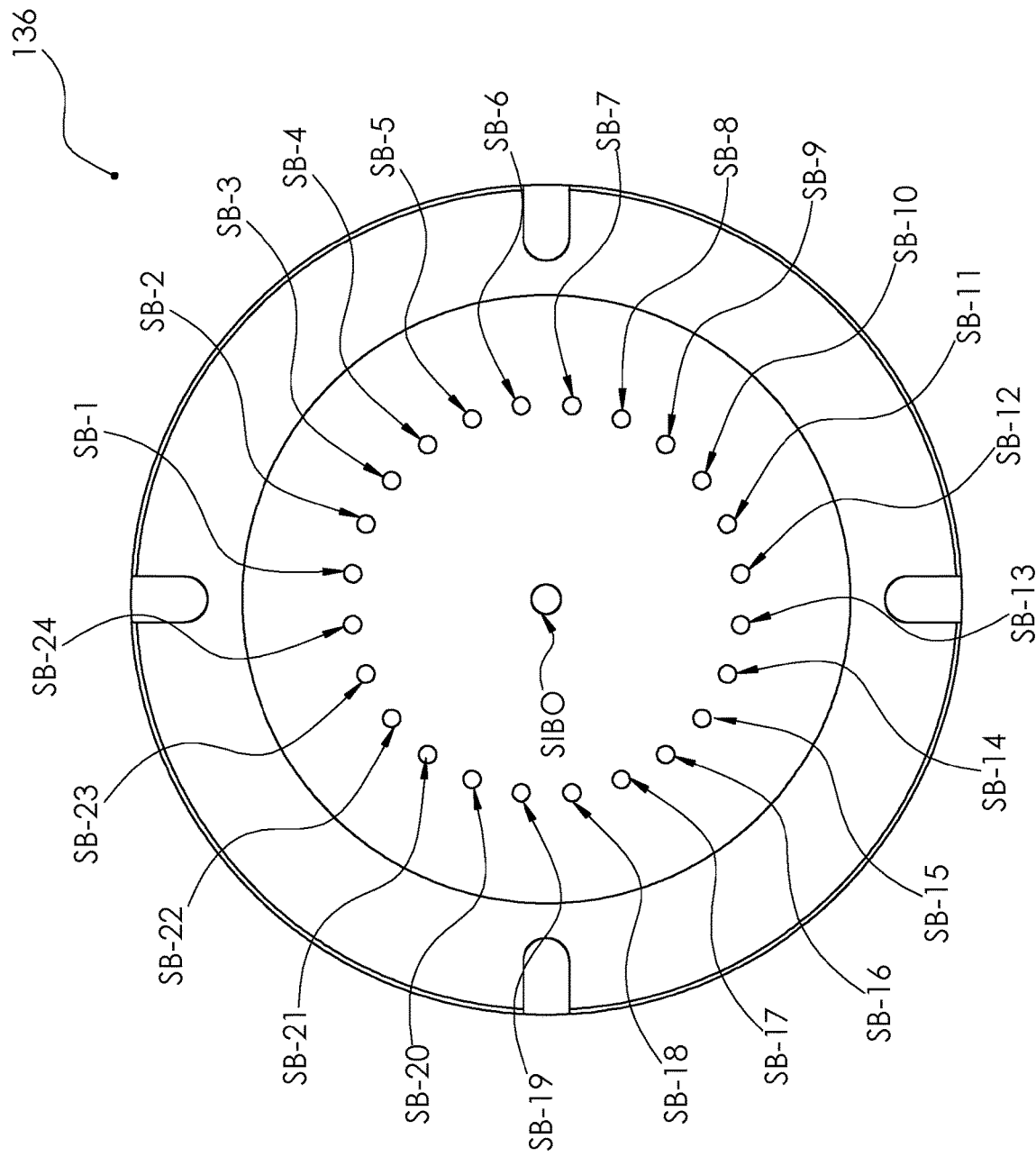
FIG. 3J is a bottom-up view of the stator of FIG. 3A.
Figure 4A:
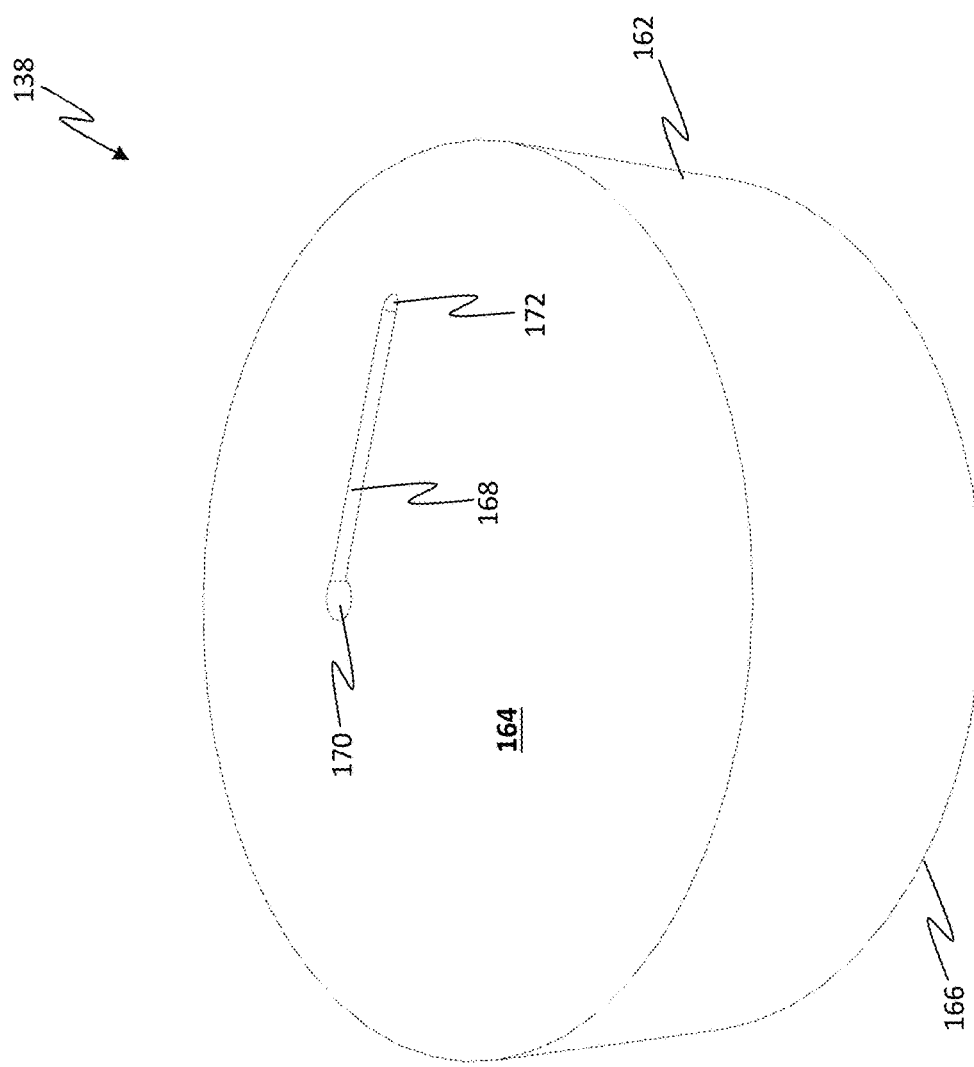
FIG. 4A is a top-down, side perspective view of a rotor for use with the CERV of FIG. 1, in accordance with one embodiment of the invention.
Figure 4B:
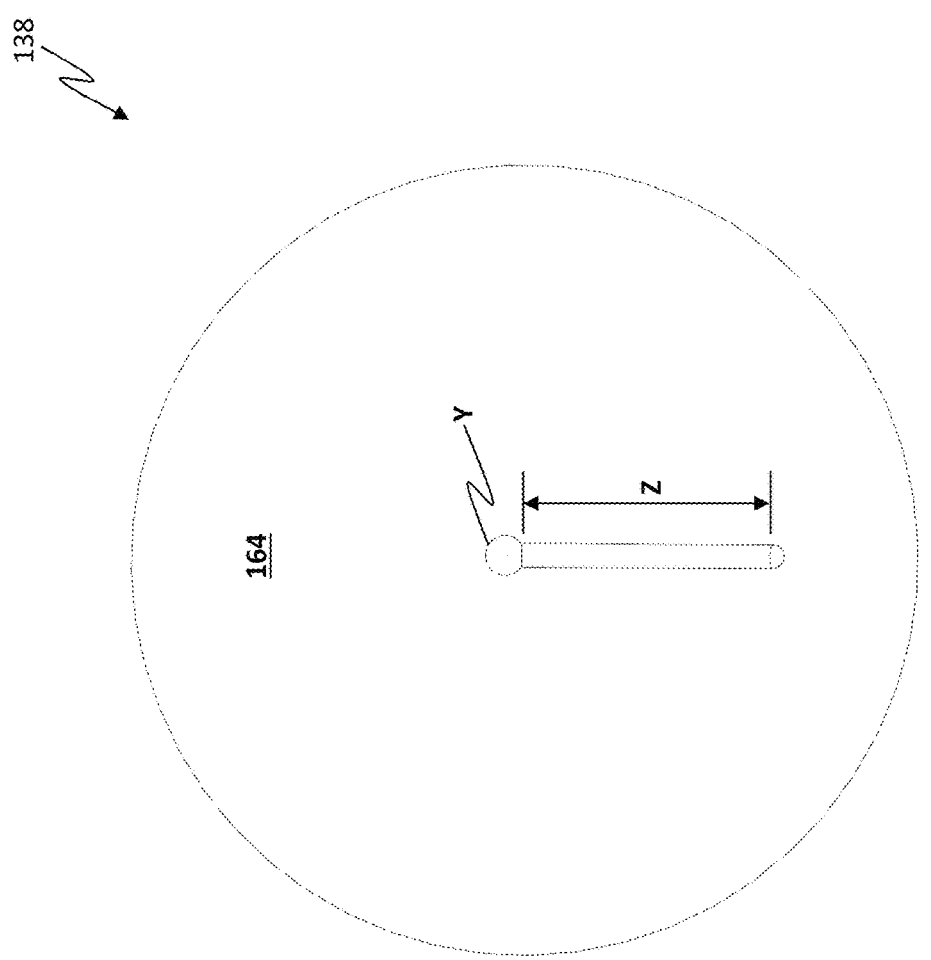
FIG. 4B is a top-down view of the rotor of FIG. 4A.
Figure 4C:
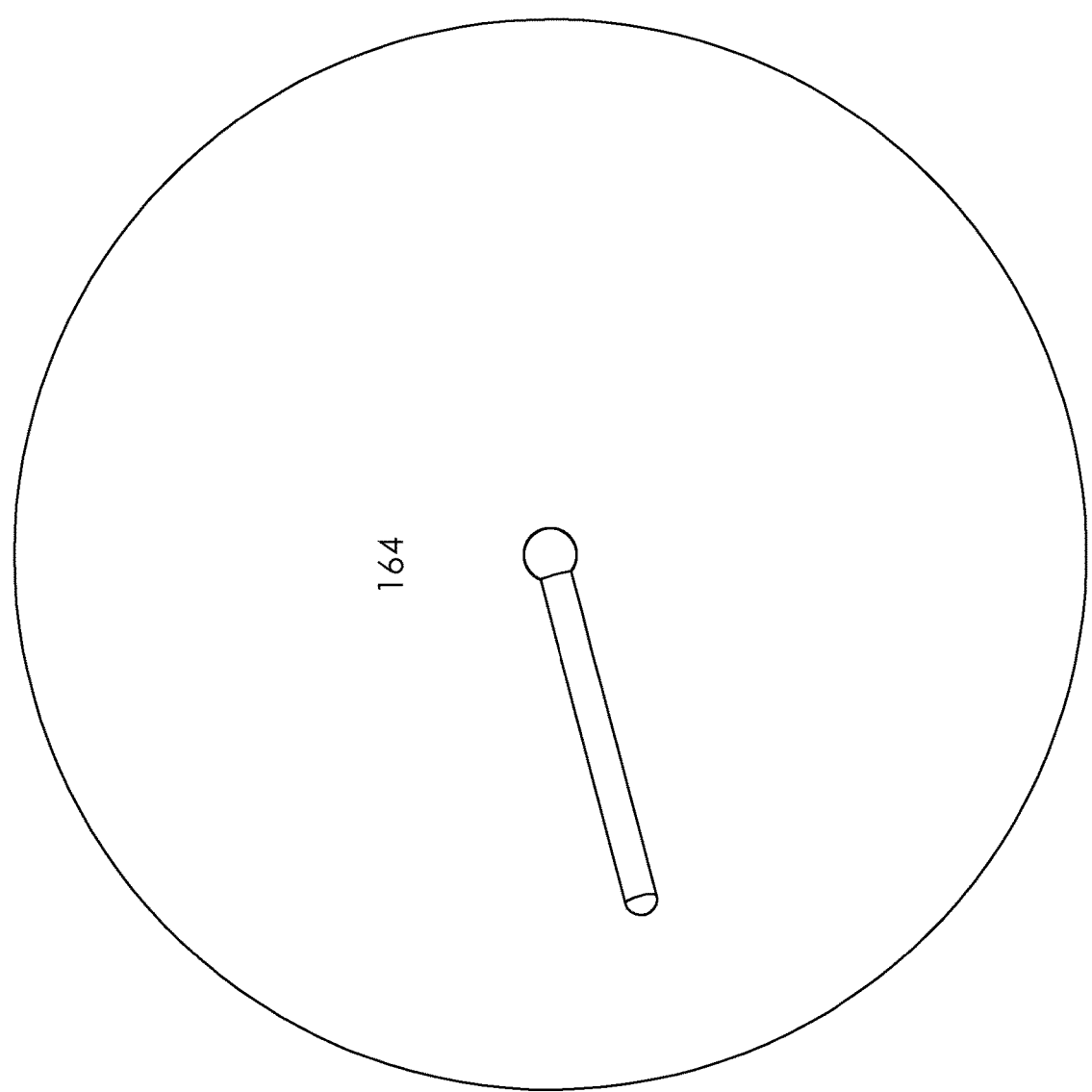
FIG. 4C is a top-down sectional view of the rotor of FIG. 4A.
Figure 4D:
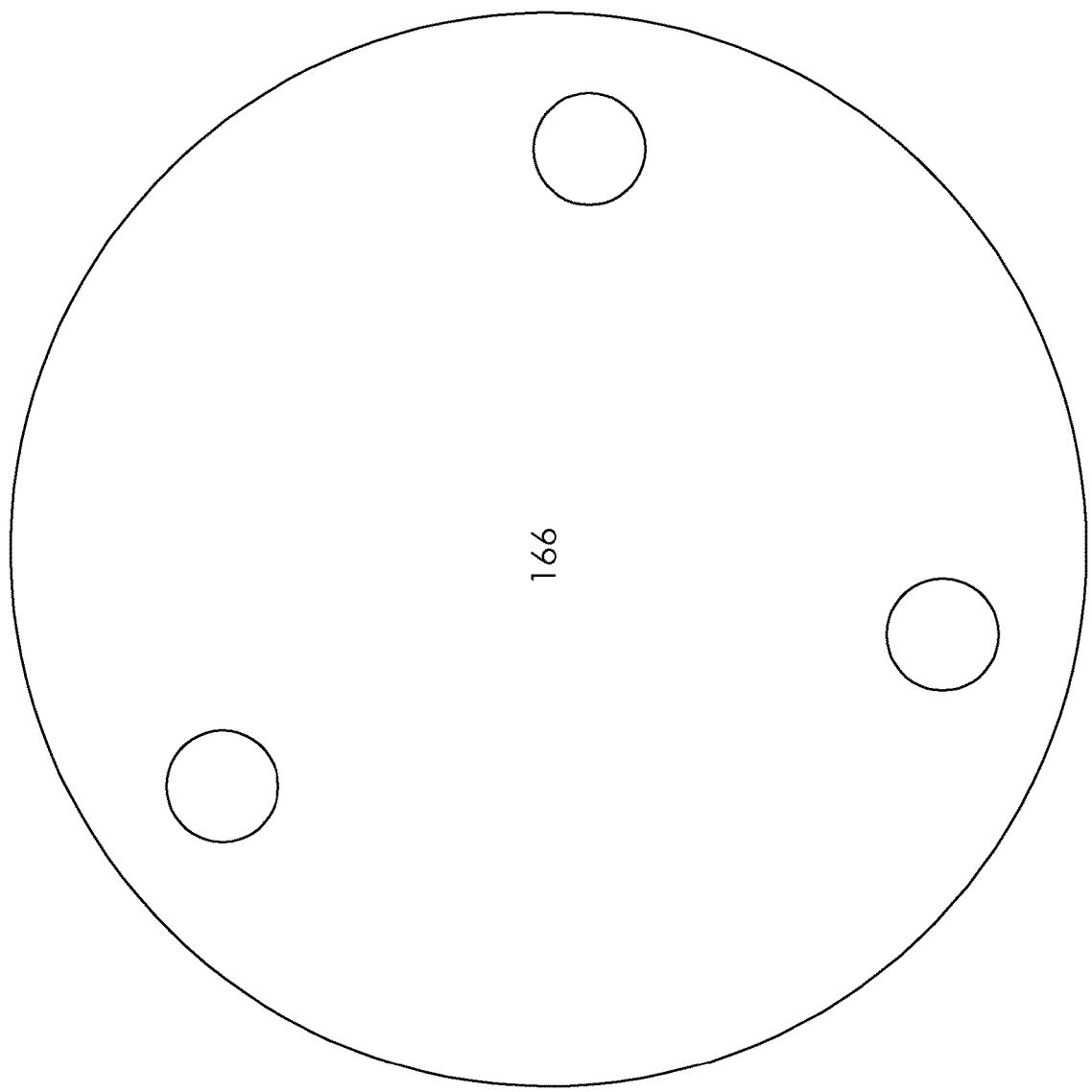
FIG. 4D is a bottom-up view of the rotor of FIG. 4A.
Figure 5A:
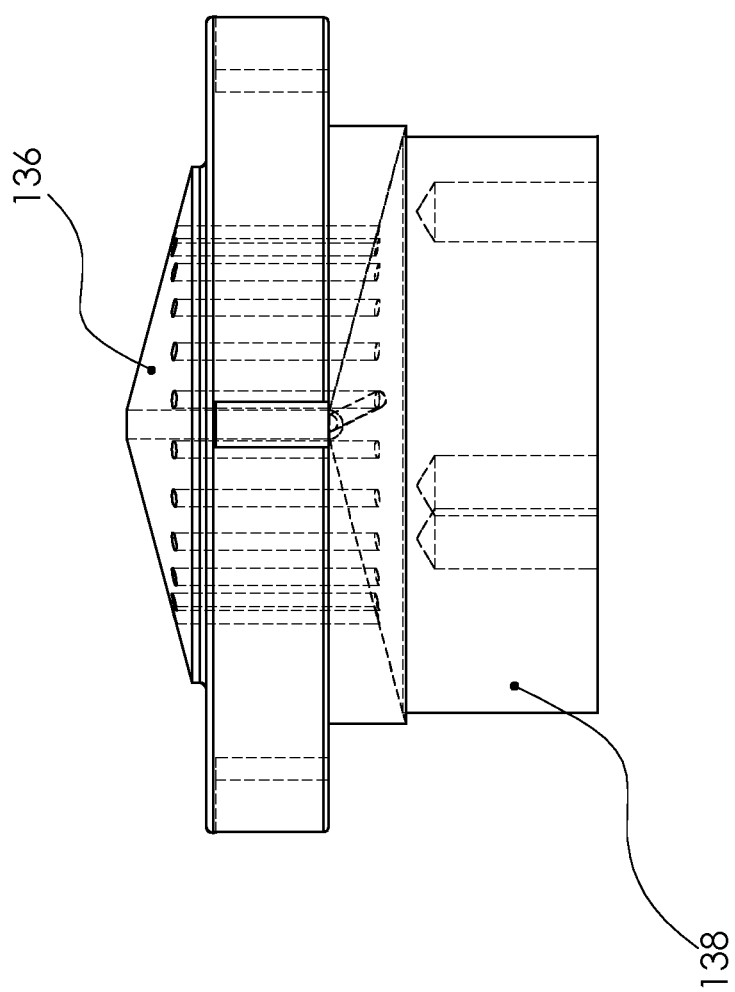
FIG. 5A is a transparent side-view of the rotor of FIG. 4A mated with the stator of FIG. 3A, in accordance with one embodiment of the invention.
Figure 5B:
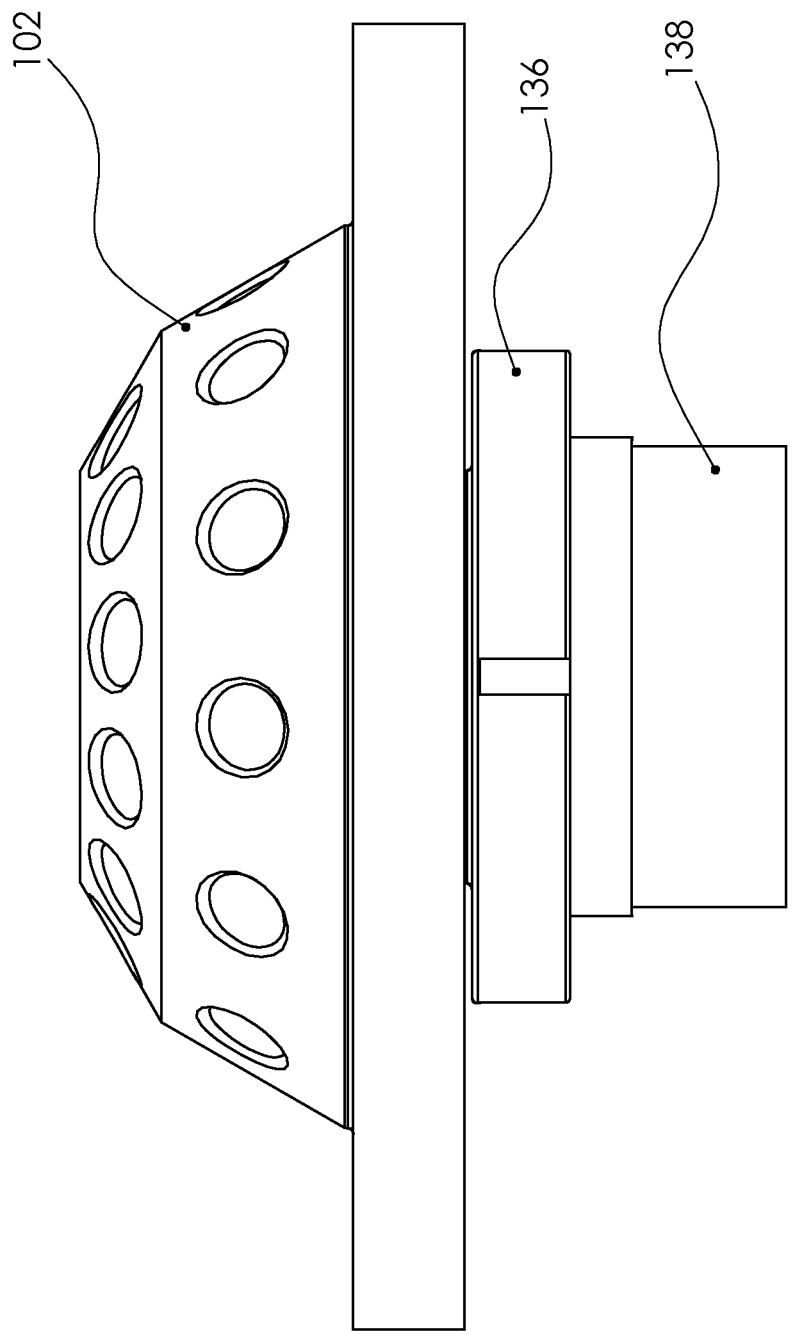
FIG. 5B is a side view of the CERV of FIG. 1 showing the adapter of FIG. 1A, the stator of FIG. 2A and the rotor of FIG. 4A mated together, in accordance with one embodiment of the invention.
Figure 5C:
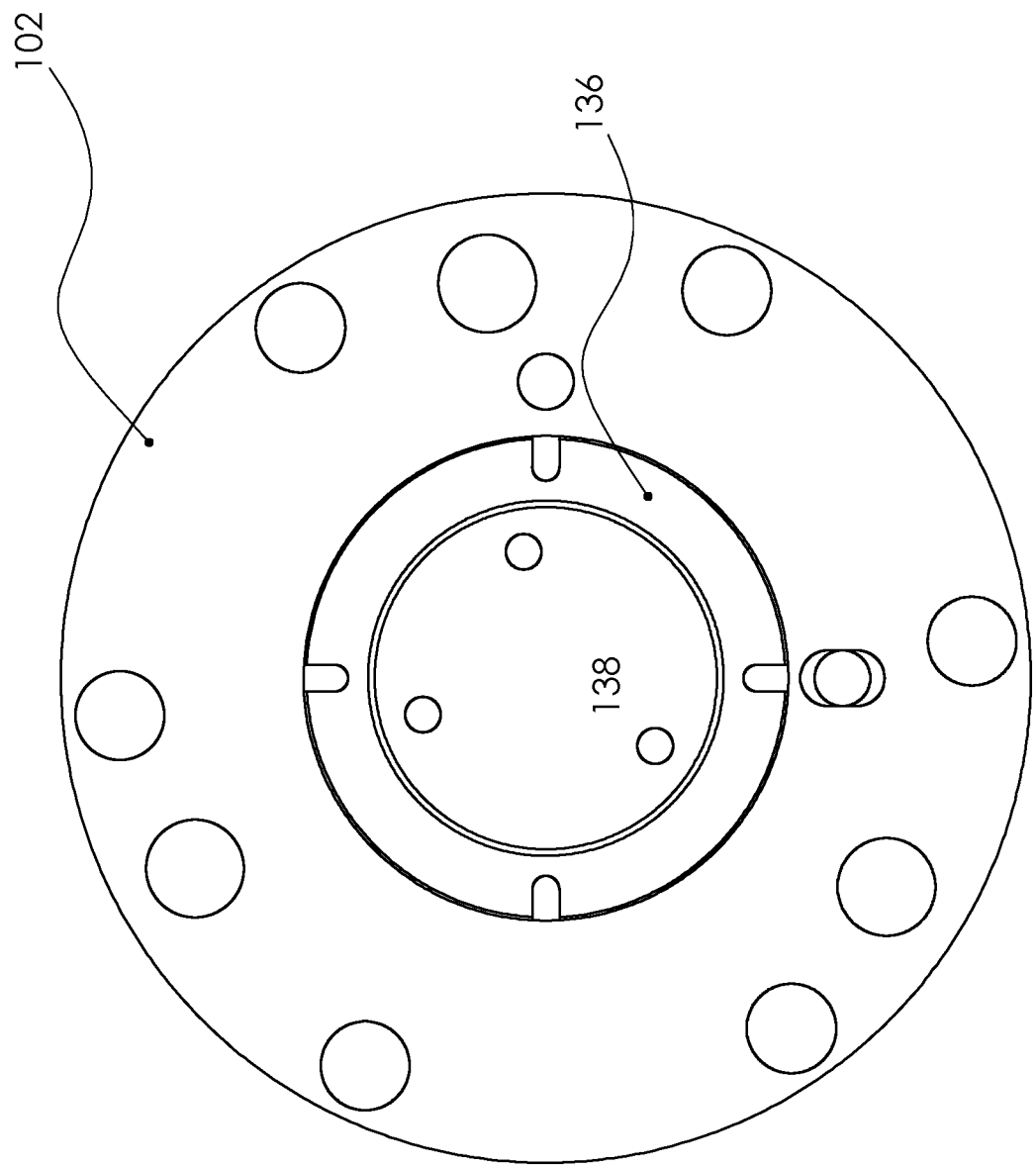
FIG. 5C is a bottom-up view of the adapter, stator and rotor combination of FIG. 5B, in accordance with one embodiment of the invention.
Figure 6:
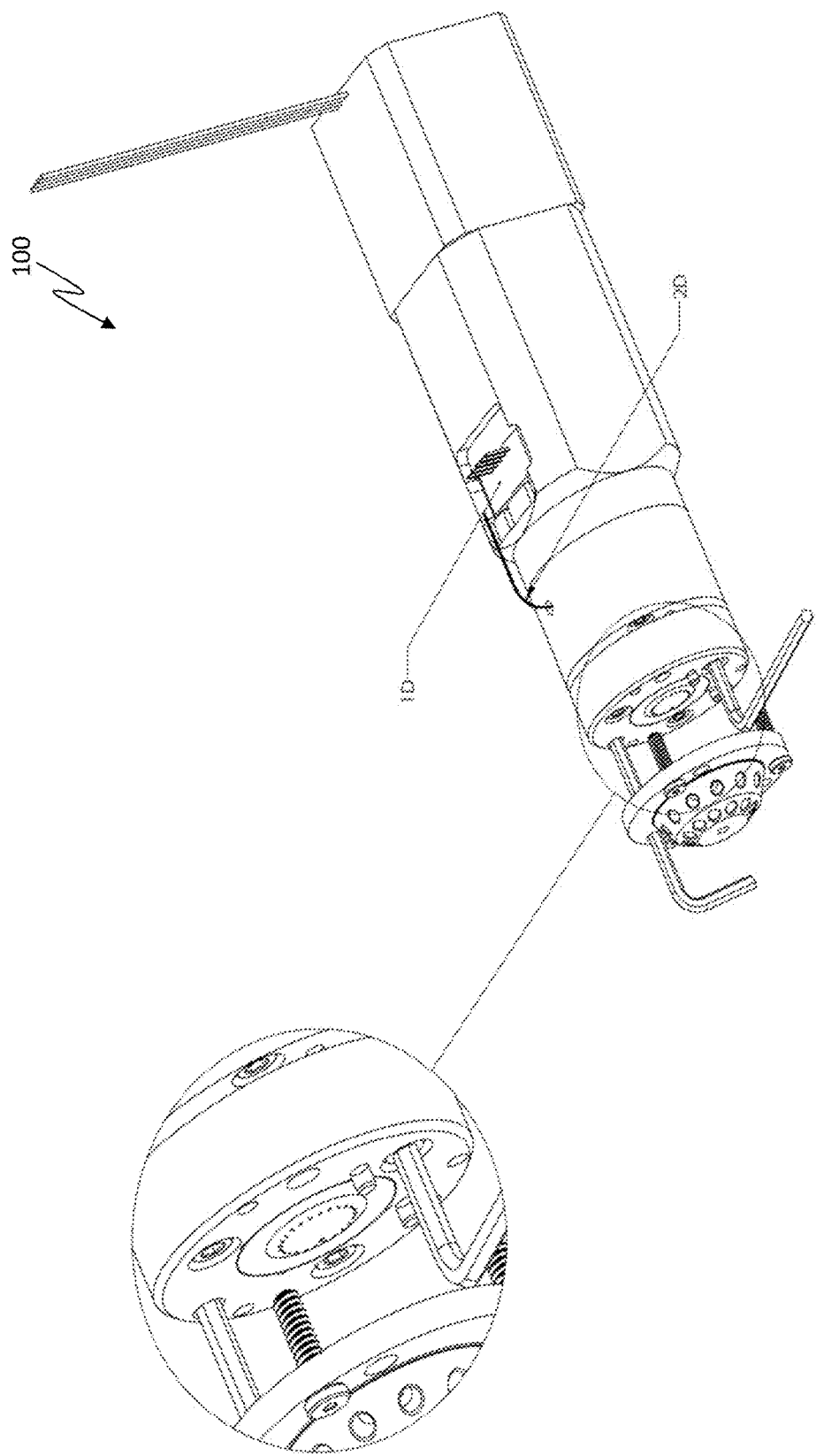
FIG. 6 is a side view of the CERV of FIG. 1A, in accordance with one embodiment of the invention.
Figure 7:
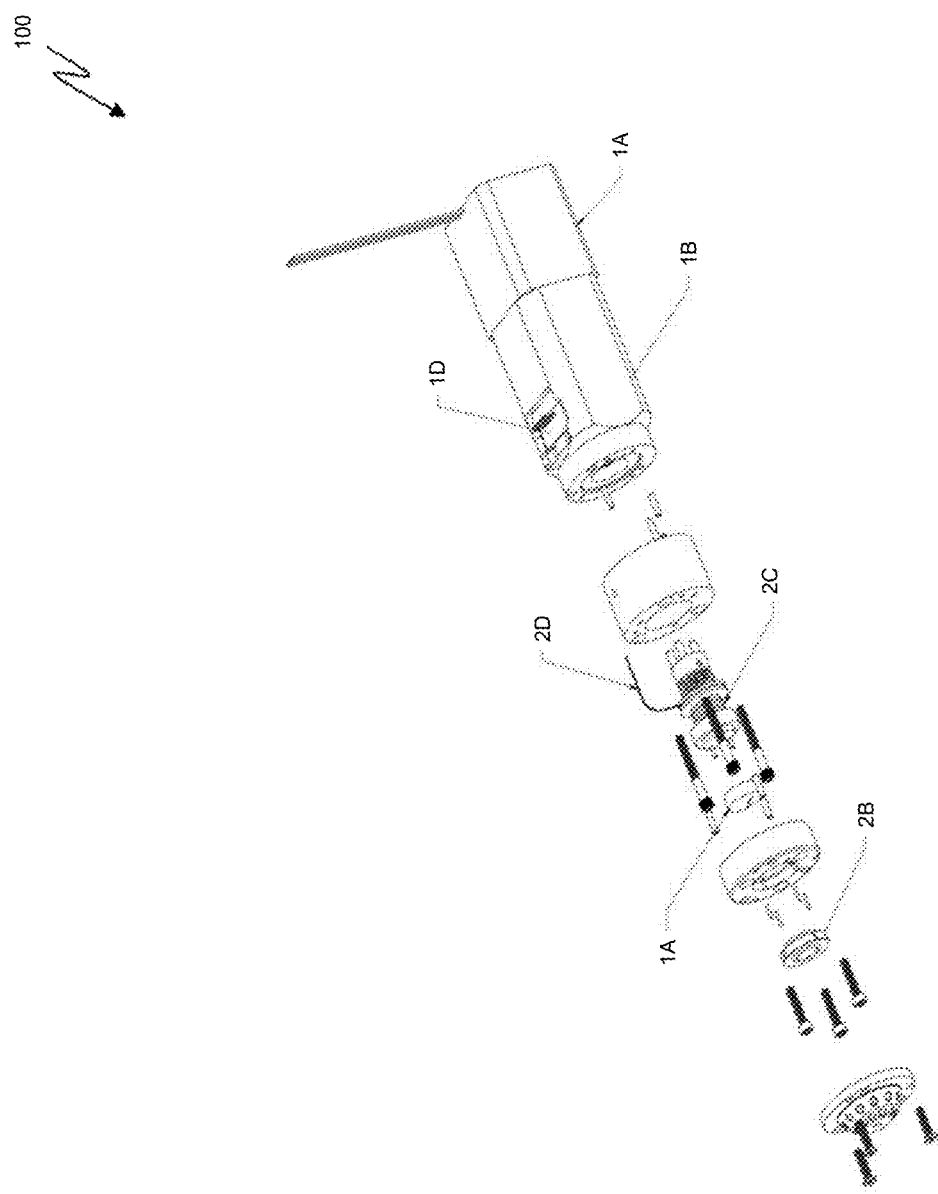
FIG. 7 is an exploded side view of the CERV of FIG. 1A, in accordance with one embodiment of the invention.
Figure 8:
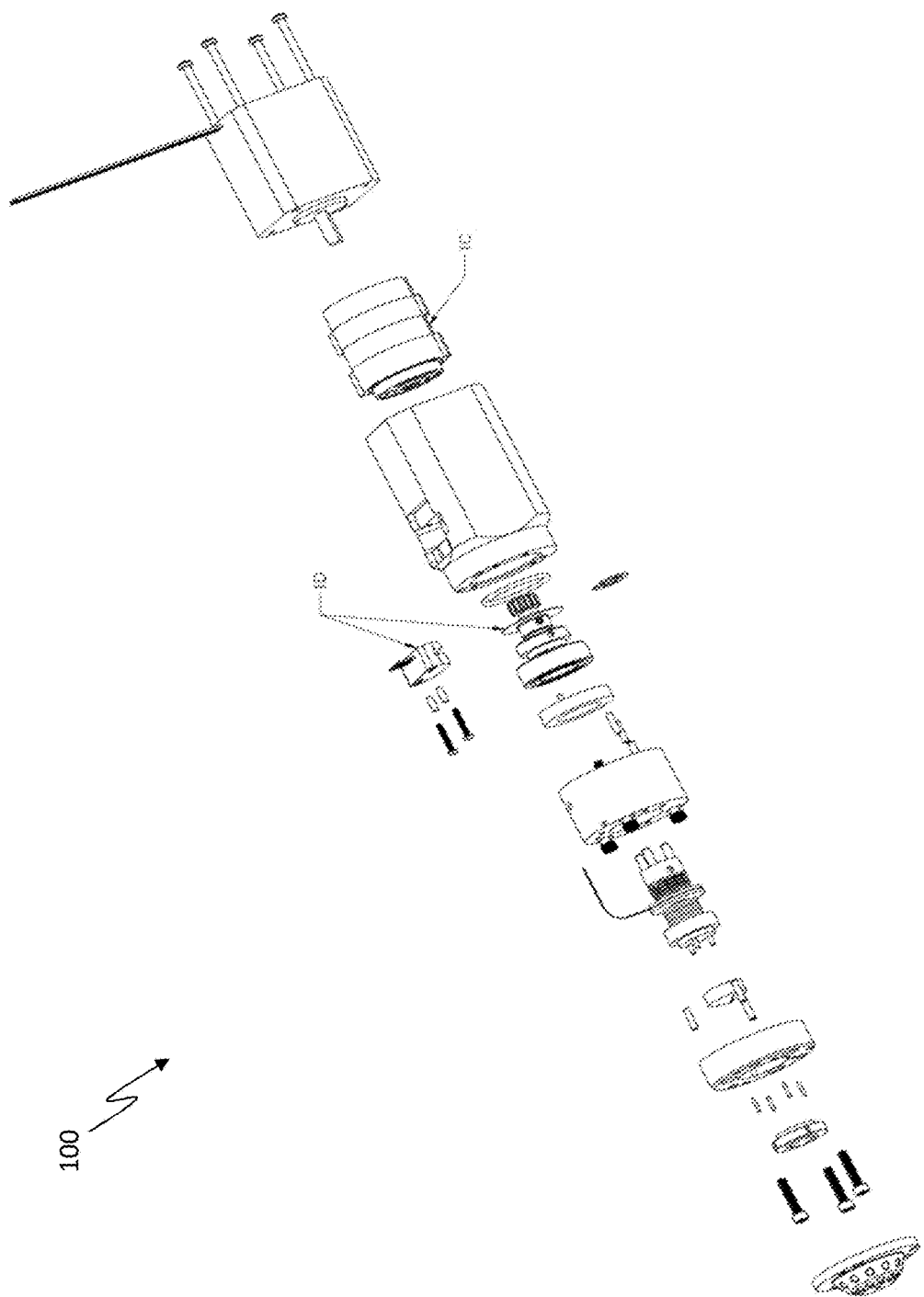
FIG. 8 is an exploded side view of the CERV of FIG. 1A, in accordance with one embodiment of the invention.
Figure 9:
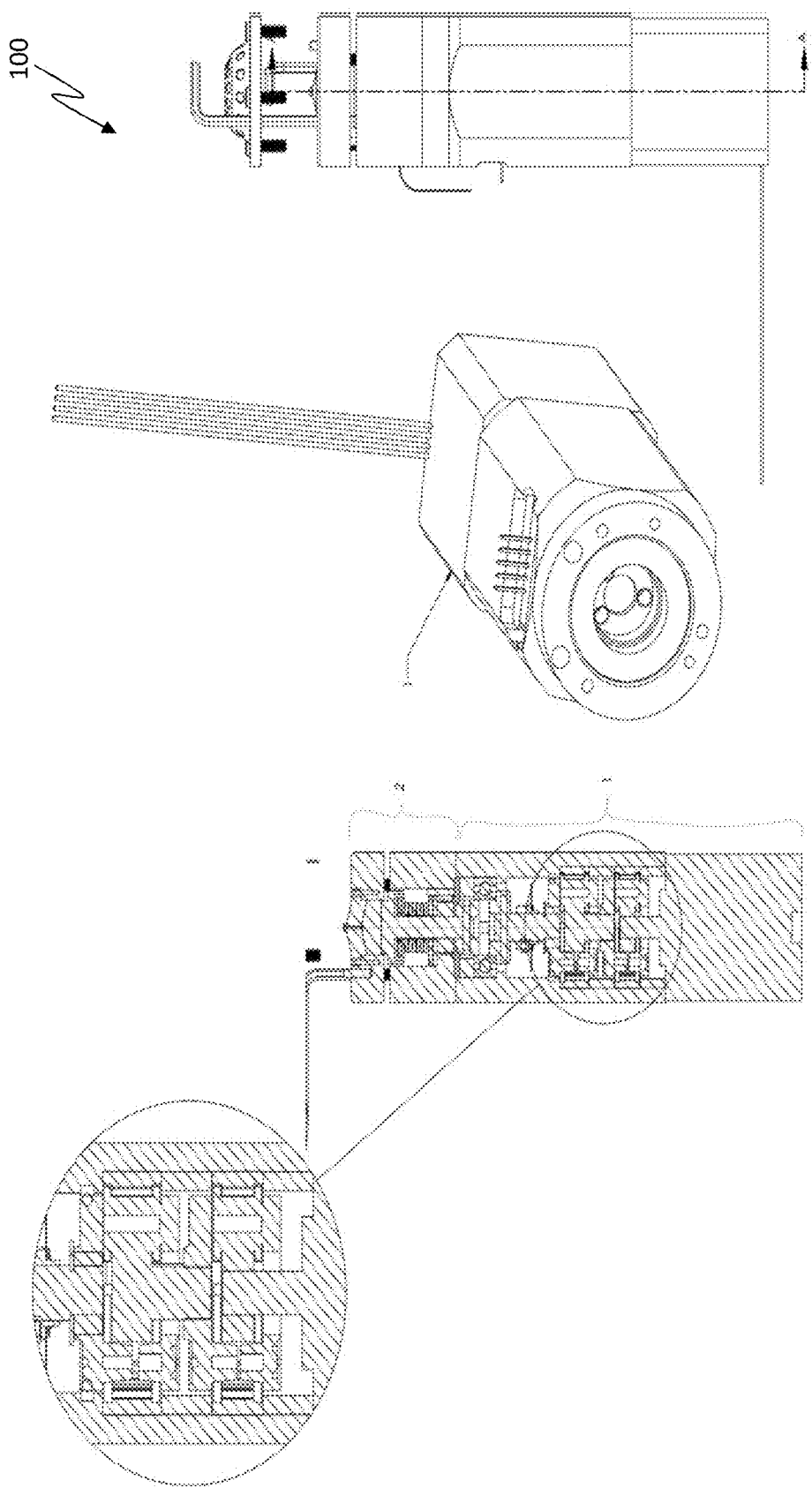
FIG. 9 is a top-down and side sectional view of the CERV of FIG. 1A, in accordance with one embodiment of the invention.
Figure 10:
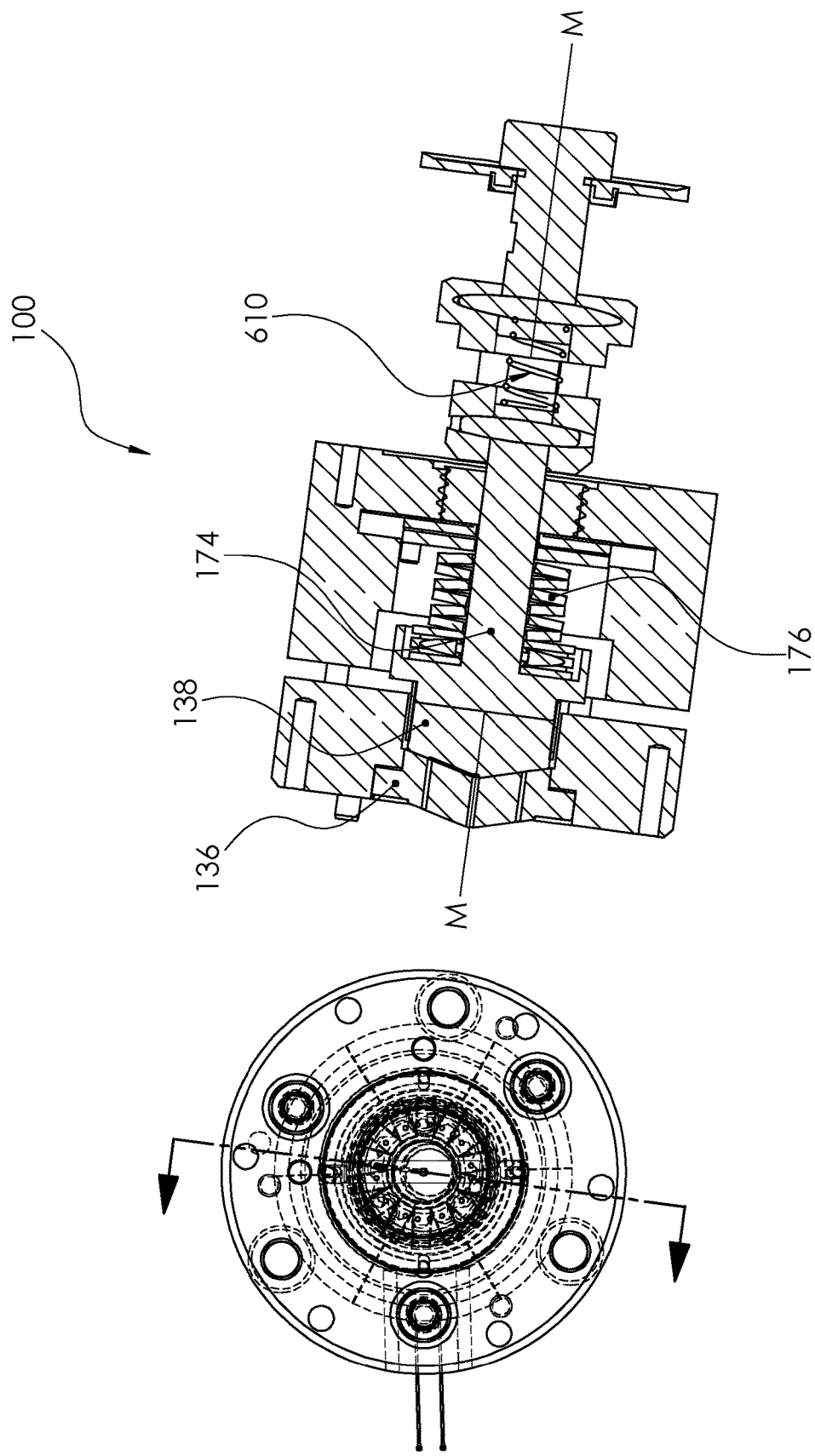
FIG. 10 is a side sectional view of the upper portion of the CERV of FIG. 1A, in accordance with one embodiment of the invention.
Figure 11:
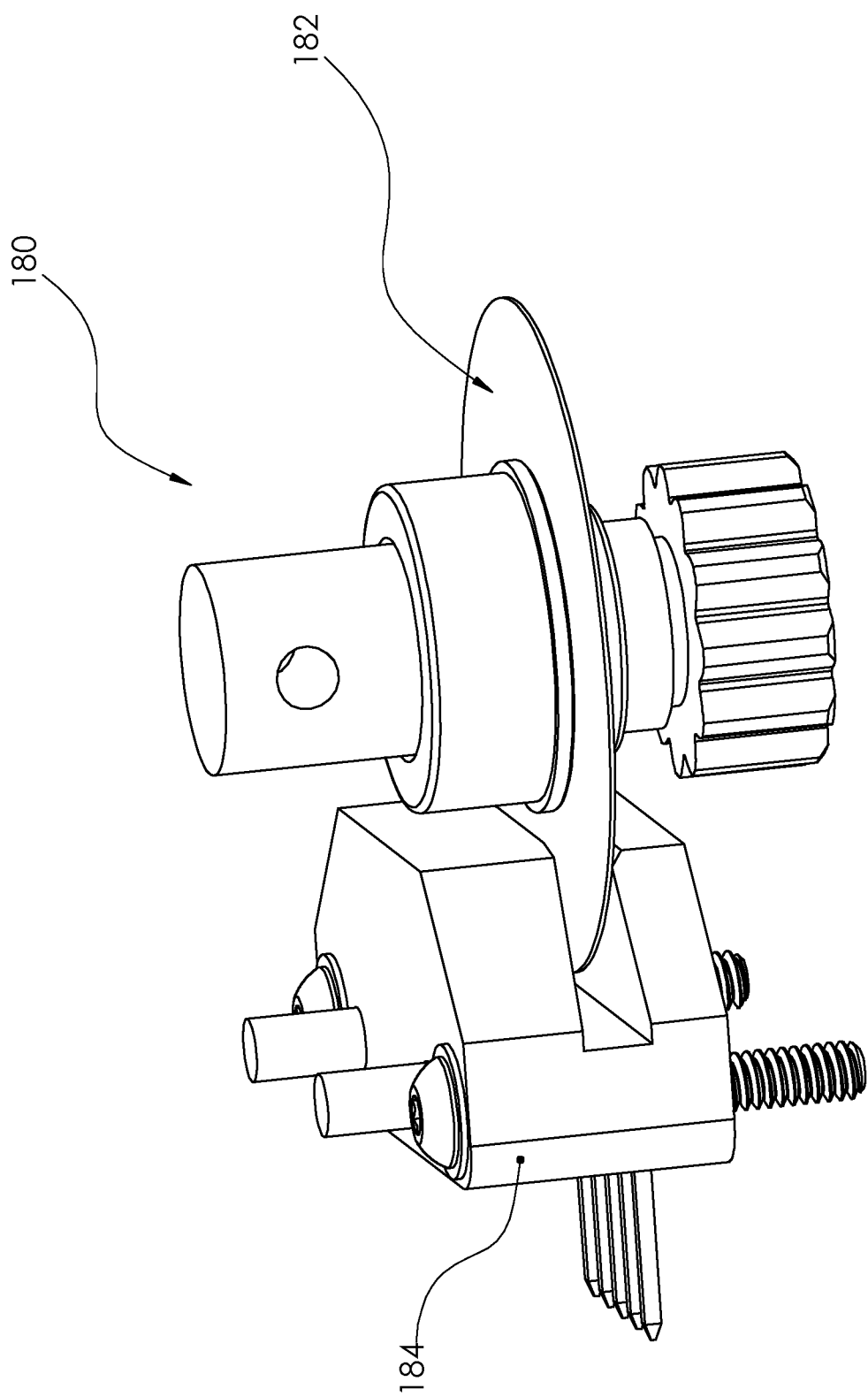
FIG. 11 is a side-view of the positioning article for use with the CERV of FIG. 1A, in accordance with one embodiment of the invention.
Figure 12:
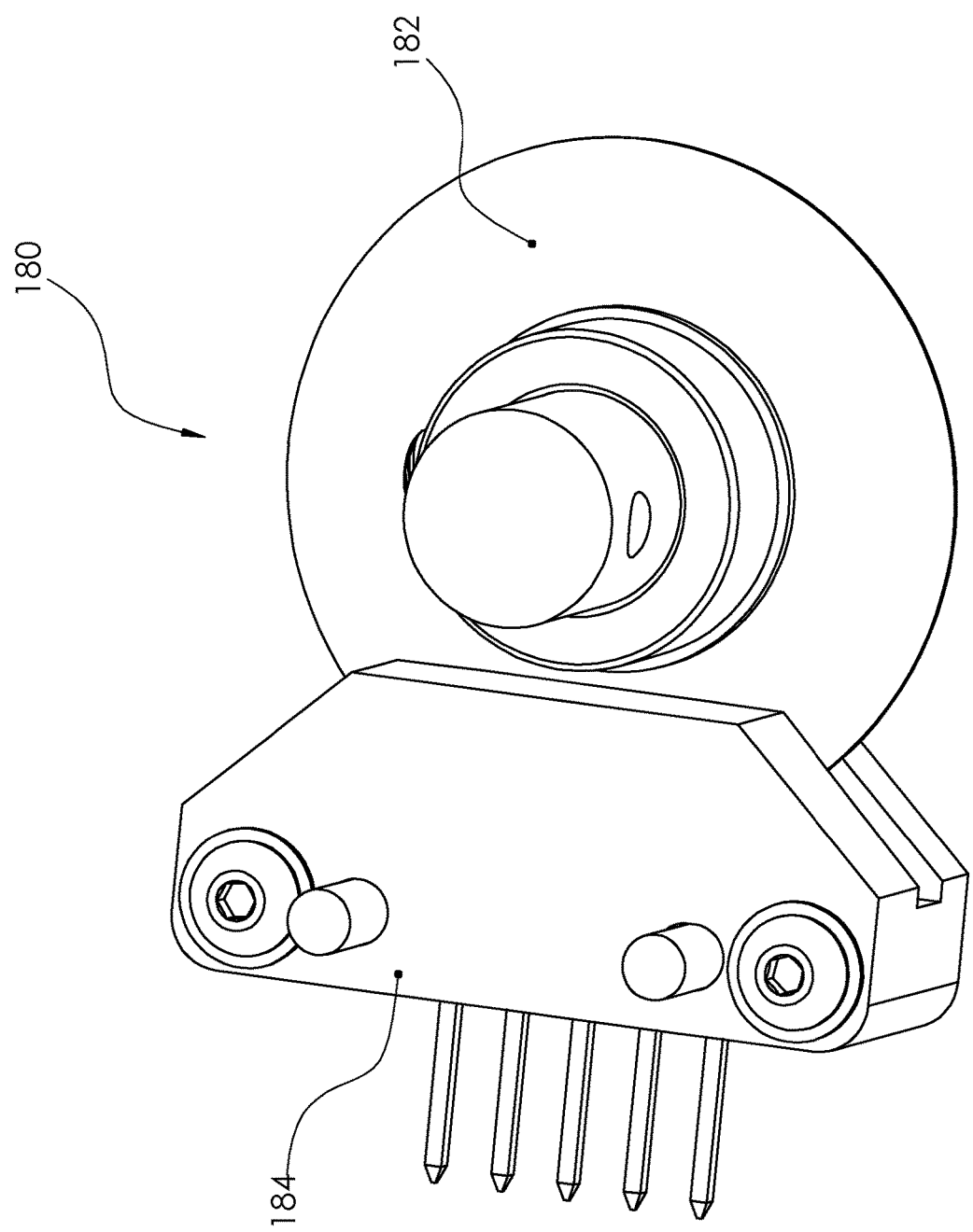
FIG. 12 is a top-down, side perspective view of the positioning article of FIG. 11.
Figure 13:
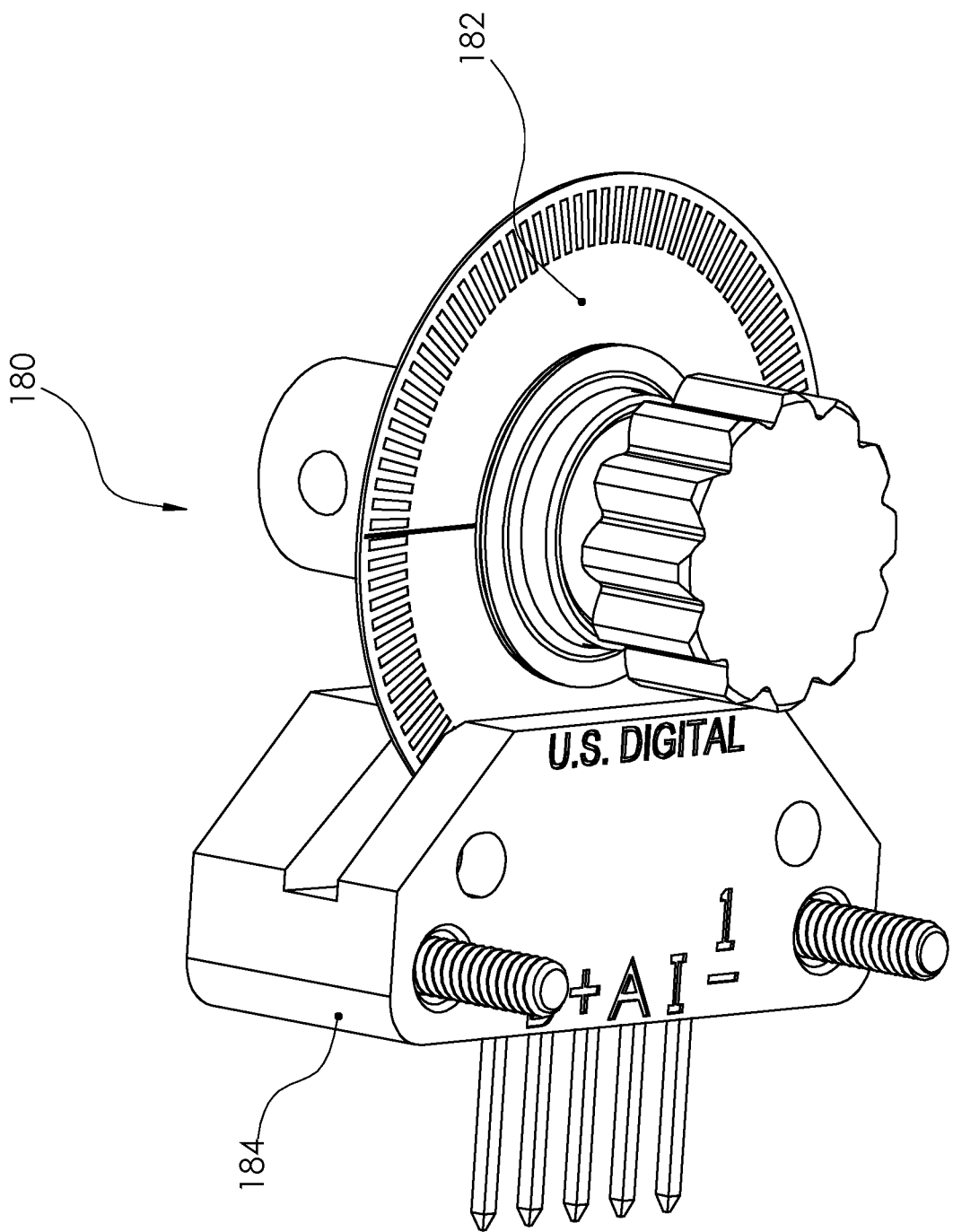
FIG. 13 is a bottom-up, side perspective view of the positioning article of FIG. 11.

Referring to Table II immediately hereinafter, and FIG. 3H, FIG. 3I and FIG. 3J, the relationship between each of the stator output channels (SOC-1 to SOC-24) 124, the adapter output channel top openings (ST-1 to ST-24) 128, the adapter output channel bottom openings (SB-1 to SB-24) 156, the one (1) adapter input channel (SIC) 152, the stator input channel top opening (STIO) 158 and the stator input channel bottom opening (SBIO) 160 are shown.

| Stator Channel | Associated Stator Top Opening | Associated Stator Bottom Opening |
| --- | --- | --- |
| SIC | SITO | SIBO |
| SOC-1 | ST-1 | SB-1 |
| SOC-2 | ST-2 | SB-2 |
| SOC-3 | ST-3 | SB-3 |
| SOC-4 | ST-4 | SB-4 |
| SOC-5 | ST-5 | SB-5 |
| SOC-6 | ST-6 | SB-6 |
| SOC-7 | ST-7 | SB-7 |
| SOC-8 | ST-8 | SB-8 |
| SOC-9 | ST-9 | SB-9 |
| SOC-10 | ST-10 | SB-10 |
| SOC-11 | ST-11 | SB-11 |
| SOC-12 | ST-12 | SB-12 |
| SOC-13 | ST-13 | SB-13 |
| SOC-14 | ST-14 | SB-14 |
| SOC-15 | ST-15 | SB-15 |
| SOC-16 | ST-16 | SB-16 |
| SOC-17 | ST-17 | SB-17 |
| SOC-18 | ST-18 | SB-18 |
| SOC-19 | ST-19 | SB-19 |
| SOC-20 | ST-20 | SB-20 |
| SOC-21 | ST-21 | SB-21 |
| SOC-22 | ST-22 | SB-22 |
| SOC-23 | ST-23 | SB-23 |
| SOC-24 | ST-24 | SB-24 |

Accordingly, a fluid introduced into the stator input channel top opening (SITO) 158 will flow into and through the stator input channel (SIC) 152 and out of the stator input channel bottom opening (SIBO 160). Additionally, a fluid introduced into one of the stator output channel bottom openings (SB-1 to SB-24) 156 will flow into and through the respective stator output channel (SOC-1 to SOC-24) 150 and out of the respective stator output channel top opening (ST-1 to ST-24) 154. For example, if a fluid is introduced into the first stator output channel bottom opening (SB-1) 156, the fluid will flow into and through the first stator output channel (SOC-1) 150 and out of the first stator output channel top opening (ST-1) 154. It should be appreciated that the stator output channel top openings 154 and the stator input channel top opening 158 are located in the stator top interface portion 146 and the stator output channel bottom openings 156 and the stator input channel bottom opening 160 are located in the stator bottom interface cavity 148. Additionally, the stator output channel bottom openings 156 are located at a distance X away from the stator input channel bottom opening 160 and are distributed circumferentially around the stator input channel bottom opening 160.

Rotor

Referring to FIG. 4A, FIG. 4B, FIG. 4C and FIG. 4D, the centering rotor 138 includes a rotor structure 162 having a rotor top 164 and a rotor bottom 166, wherein the rotor top 164 is substantially conical in shape (and/or triangular in shape as desired) and defines a rotor fluid directional channel 168 having a rotor fluid channel input opening (RITO) 170 and a rotor fluid channel output opening (ROTO) 172, wherein the rotor fluid channel input opening 170 is communicated with the rotor fluid channel output opening 172 via the rotor fluid directional channel 168. The rotor fluid channel input opening 170 is located in the center of the rotor top 164 to be located at the apex Y of the rotor top 164 and the rotor fluid directional channel 168 extends away from the rotor fluid channel input opening 170 towards the side of the rotor structure 162. It should be appreciated that the rotor fluid directional channel 168 includes a rotor fluid directional channel length Z such that the rotor fluid channel output opening (ROTO) 172 is located at a distance Z away from the rotor fluid channel input opening 170.

Referring to FIG. 5A, FIG. 5B, FIG. 5C, FIG. 5D, and FIG. 6 to FIG. 15, it should be appreciated that the adaptor 102 is securely associated with the centering stator 136 such that the adapter bottom 118 is sealingly compressed against the stator top 142, wherein the adapter output channel bottom openings 130 are aligned with the respective stator output channel top openings 154 and wherein the adapter input channel bottom opening 134 is aligned with the stator input channel top opening 158. This is shown in Table III immediately hereinbelow:

---

Adapter Bottom Opening AIBO is mated with Stator Top Opening SITO
Adapter Bottom Opening AB-1 is mated with Stator Top Opening ST-1
Adapter Bottom Opening AB-2 is mated with Stator Top Opening ST-2
Adapter Bottom Opening AB-3 is mated with Stator Top Opening ST-3
Adapter Bottom Opening AB-4 is mated with Stator Top Opening ST-4
Adapter Bottom Opening AB-5 is mated with Stator Top Opening ST-5
Adapter Bottom Opening AB-6 is mated with Stator Top Opening ST-6
Adapter Bottom Opening AB-7 is mated with Stator Top Opening ST-7
Adapter Bottom Opening AB-8 is mated with Stator Top Opening ST-8
Adapter Bottom Opening AB-9 is mated with Stator Top Opening ST-9
Adapter Bottom Opening AB-10 is mated with Stator Top Opening ST-10
Adapter Bottom Opening AB-11 is mated with Stator Top Opening ST-11
Adapter Bottom Opening AB-12 is mated with Stator Top Opening ST-12
Adapter Bottom Opening AB-13 is mated with Stator Top Opening ST-13
Adapter Bottom Opening AB-14 is mated with Stator Top Opening ST-14
Adapter Bottom Opening AB-15 is mated with Stator Top Opening ST-15
Adapter Bottom Opening AB-16 is mated with Stator Top Opening ST-16
Adapter Bottom Opening AB-17 is mated with Stator Top Opening ST-17
Adapter Bottom Opening AB-18 is mated with Stator Top Opening ST-18
Adapter Bottom Opening AB-19 is mated with Stator Top Opening ST-19
Adapter Bottom Opening AB-20 is mated with Stator Top Opening ST-20
Adapter Bottom Opening AB-21 is mated with Stator Top Opening ST-21
Adapter Bottom Opening AB-22 is mated with Stator Top Opening ST-22
Adapter Bottom Opening AB-23 is mated with Stator Top Opening ST-23
Adapter Bottom Opening AB-24 is mated with Stator Top Opening ST-24

---

Moreover, the centering rotor 138 is securely associated with the centering stator 136 such that the stator bottom 144 is sealingly associated with the rotor top 164, wherein the stator input channel bottom opening (SIBO) 160 is aligned with the rotor fluid channel input opening (RITO) 170 and wherein the rotor fluid channel output opening (ROTO) 172 is aligned with at least one of the stator output channel bottom openings (SB-1 to SB-24) 154.

This may be accomplished by securely associating the adaptor 102 with the centering stator 136 and securely associating the centering stator 136 with the centering rotor 138 as discussed hereinabove, wherein the adapter 102, stator 136 and rotor 138 may be securely and compressingly associated via any device and/or method suitable to the desired end purpose, such as for example, screws, bolts, adhesives, etc. Accordingly, it should be appreciated that the interface between the adaptor bottom and the stator top and/or the stator bottom and the rotor top may be accomplished via any method and/or device suitable to the desired end purpose, such as pressure (i.e. compression), adhesive, coatings to increase sealing ability and/or mechanical devices. Additionally, in other embodiments, it is contemplated that the adaptor 102 and the centering stator 136 may be combined into a single article as desired. It should be appreciated that the connection between the centering stator 136 and the adaptor 102 and the centering rotor 138 is such that fluid flowing between the adapter 102, the centering stator 136 and the centering rotor 138 will not leak from the defined fluid paths and/or openings. Moreover, it should be further appreciated that the centering rotor 138 is rotatably associated with the centering stator 136 such that the centering rotor 138 rotates about an Axis M to align the rotor fluid channel output opening (ROTO) 172 with a desired stator channel bottom opening (SB-1 to SB-24) 156.

The drive system 112 includes at least one rotor shaft 174 that is associated with the motor 110 such that when the motor 110 is operated, the rotor shaft 174 rotates about the Axis M, thereby causing the rotor 138 to rotate about the Axis M. The drive system further includes a plurality of resilient springs 176 which surround the rotor shaft 174 and which are associated with the rotor shaft 174 and/or the rotor bottom 166 via a plurality of bearings, wherein when the combination of the adapter 102, stator 136 and rotor 138 are compressingly associated with the drive system 112, the plurality of resilient springs 176 are compressed. The plurality of resilient springs 176 are movably associated with the rotor shaft 174 such that the plurality of resilient springs 176 do not move relative to the rotor shaft 174. It should be appreciated that, in one embodiment, at least one compression pressure sensor 178 may be provided and associated with the plurality of resilient springs 176 such that when the plurality of resilient springs 176 are compressed, the compression pressure sensor 178 senses the amount compression being experienced by the plurality of resilient springs 174 and thus, the combination of the adapter 102, stator 136 and rotor 138. This advantageously allows for the pressure being experienced by the combination of the adapter 102, stator 136 and rotor 138 to be monitored (periodically and/or continuously) and modified if desired.

Referring to FIGS. 16-24, it should be appreciated that in one or more embodiments, the rotor drive shaft 174 may be configured from multiple pieces that are connected together via screws, pressure, friction and/or dowel pins. Additionally, it should be appreciated that in one or more embodiments, it is important that the rotor drive shaft 174 be centered, and its movements be stable to ensure the precise alignment of the rotor fluid channel output opening (ROTO) 172 with the desired stator output channel bottom opening (SB-1 to SB-24) 154. In one embodiment, this may be accomplished via one or more rotor bearings 200 that act to center and precisely align the rotor drive shaft 174 while allowing the rotor drive shaft 174 to rotate about the Axis M. In one embodiment, the rotor bearing 200 may include a bearing outer housing 202, a bearing inner housing 204 and a plurality of ball bearings 206, wherein the rotor bearing 200 defines a ball bearing cavity 208 which contain the plurality of ball bearings 206. It should be appreciated that the bearing inner housing 204 is movably associated with the bearing outer housing 202 and the plurality of ball bearings 206 to allow the bearing inner housing 204 to rotate about the Axis M relative to the bearing outer housing 202. The rotor bearing 200 defines a rotor bearing inner cavity 210 having a rotor bearing inner cavity diameter $RBIC_D$ and the bearing outer housing 202 includes a rotor bearing outer diameter $BOH_D$. It should be appreciated that the rotor bearing inner cavity diameter $RBIC_D$ is preferably sized and/or shaped to snugly and securely contain at least a portion of the rotor drive shaft 174 such that the bearing inner housing 204 in not movable relative to the rotor drive shaft 174 when the rotor drive shaft 174 is securely located within the rotor bearing inner cavity 210.

Referring to the FIGURES, the top body housing 108 defines a top body housing cavity 212 for housing the components of the drive system 112, such as the rotor drive shaft 174 and the rotor bearing 200, wherein the top body housing cavity 212 includes a top body housing cavity diameter $HC_D$. It should be appreciated that the top body housing cavity diameter $HC_D$ is sized to snugly and securely contain the rotor bearing 200. Accordingly, the top body housing cavity diameter $HC_D$ and the rotor bearing outer diameter $BOH_D$ are similarly sized such that when the rotor bearing 200 is contained within the top body housing cavity 212, the outer surface of the bearing outer housing 202 is frictionally and nonmovably in compressed contact with the wall of the top body housing cavity 212. Moreover, it should be appreciated that at least a portion of the rotor drive shaft 174 includes a rotor drive shaft diameter RDSD which is similarly sized to the rotor bearing inner cavity diameter $RBIC_D$. Accordingly, when a portion of the rotor drive shaft 174 is contained within the rotor bearing inner cavity 212, the outer surface of the rotor drive shaft 174 is frictionally and nonmovably in compressed contact with the wall of the bearing inner housing 204. This advantageously allows the rotor drive shaft 174 to be centered within the top body housing 108, and its rotation stably controlled to ensure the precise alignment of the rotor fluid channel output opening (ROTO) 172 with the desired stator output channel bottom opening (SB-1 to SB-24) 154.

Figure 14:
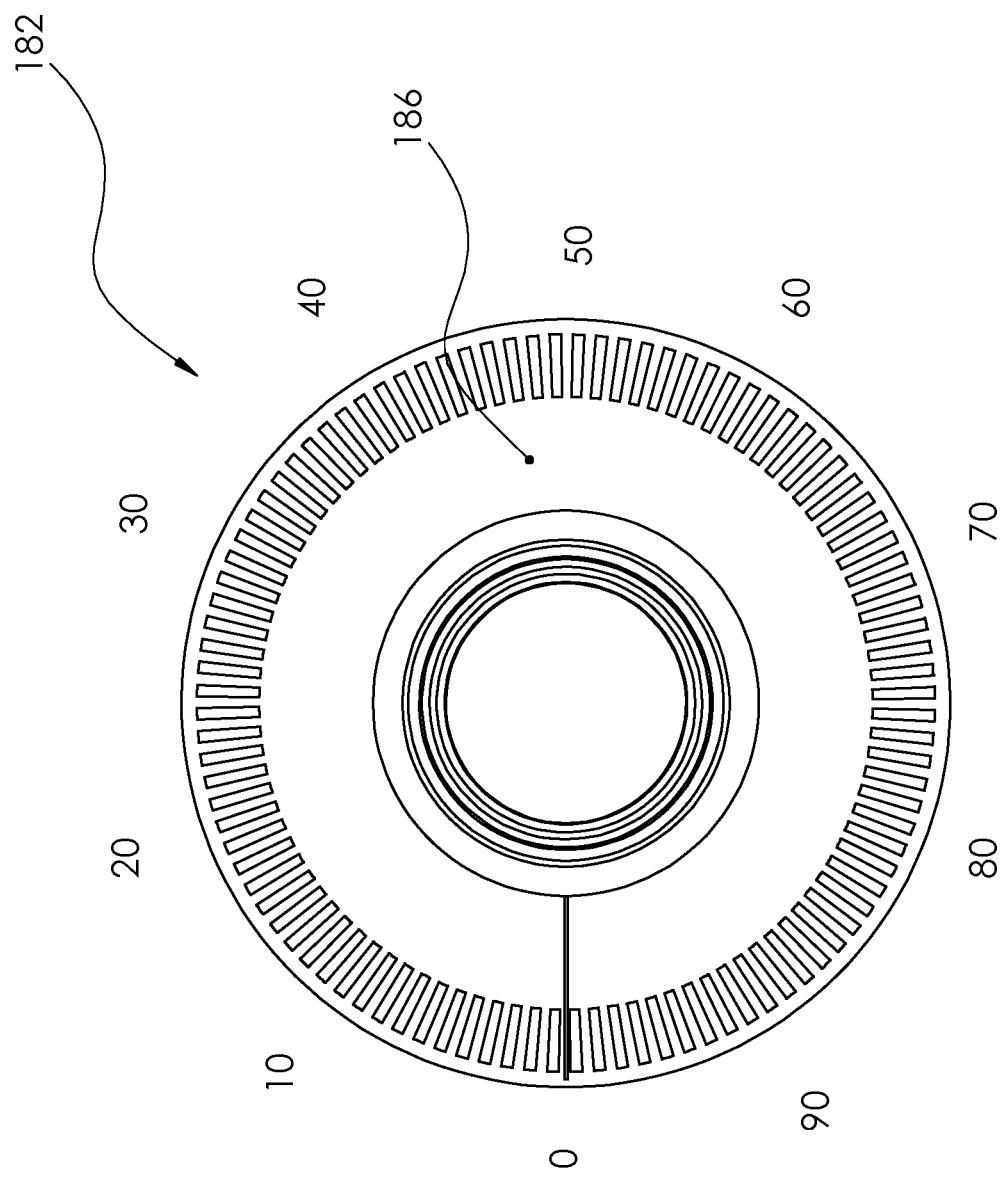
FIG. 14 is a top-down view of the encoding disc for use with the positioning article of FIG. 11, in accordance with one embodiment of the invention.
Figure 15:
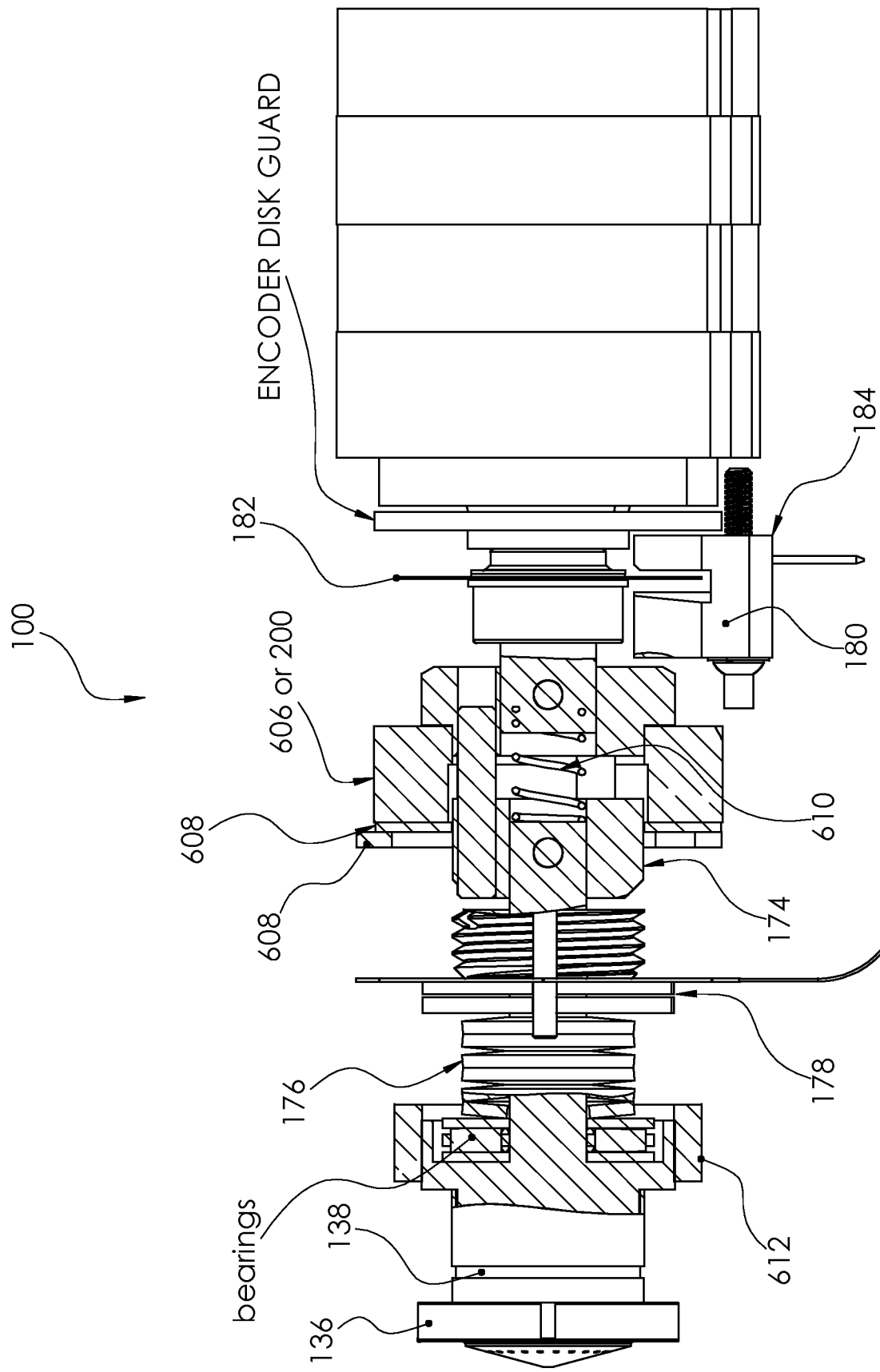
FIG. 15 is a side sectional view of a portion of the CERV of FIG. 1A, in accordance with one embodiment of the invention.
Figure 16:
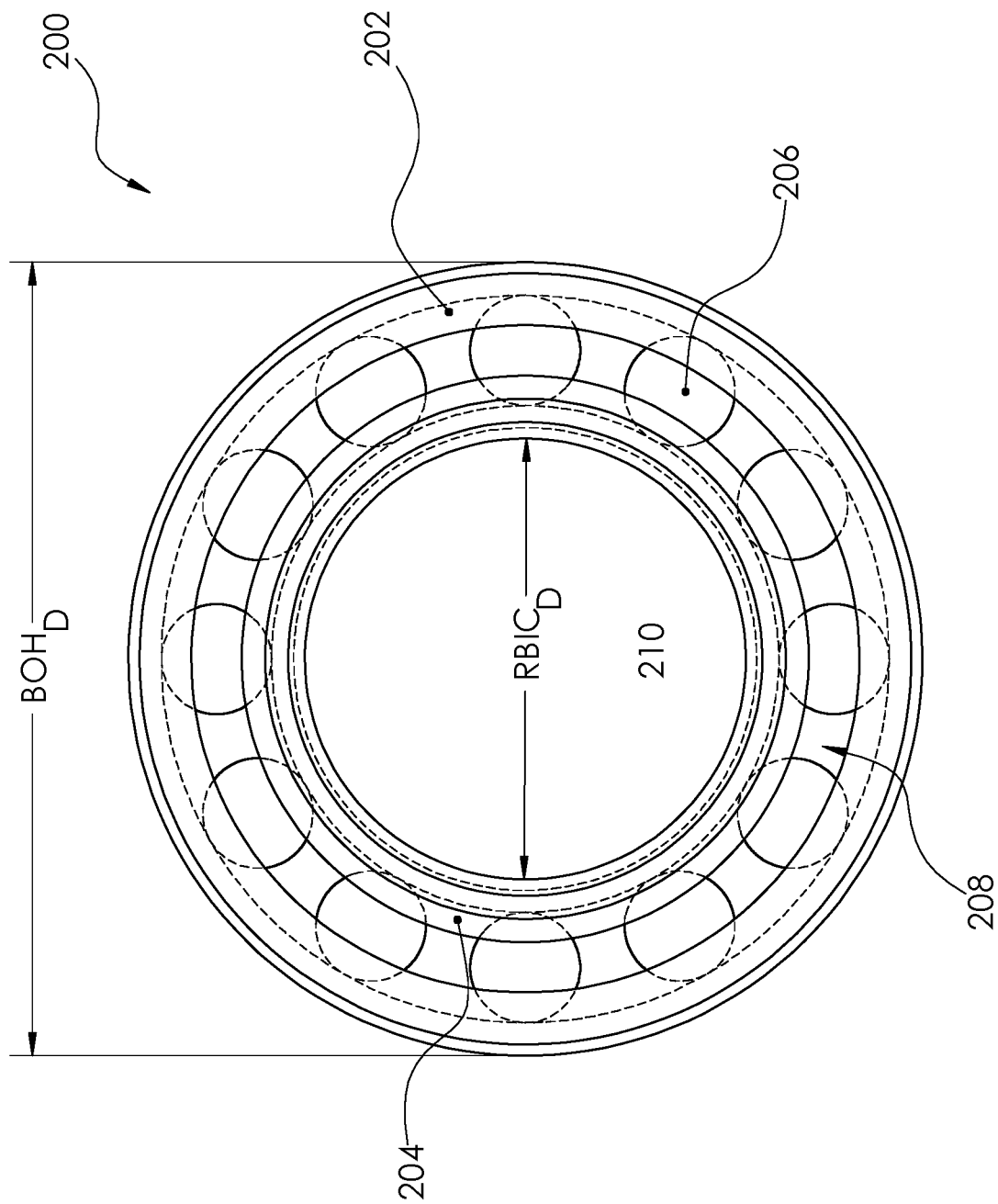
FIG. 16 is a top-down view of a rotor bearing for use with the CERV of FIG. 1A, in accordance with one embodiment of the invention.
Figure 17:
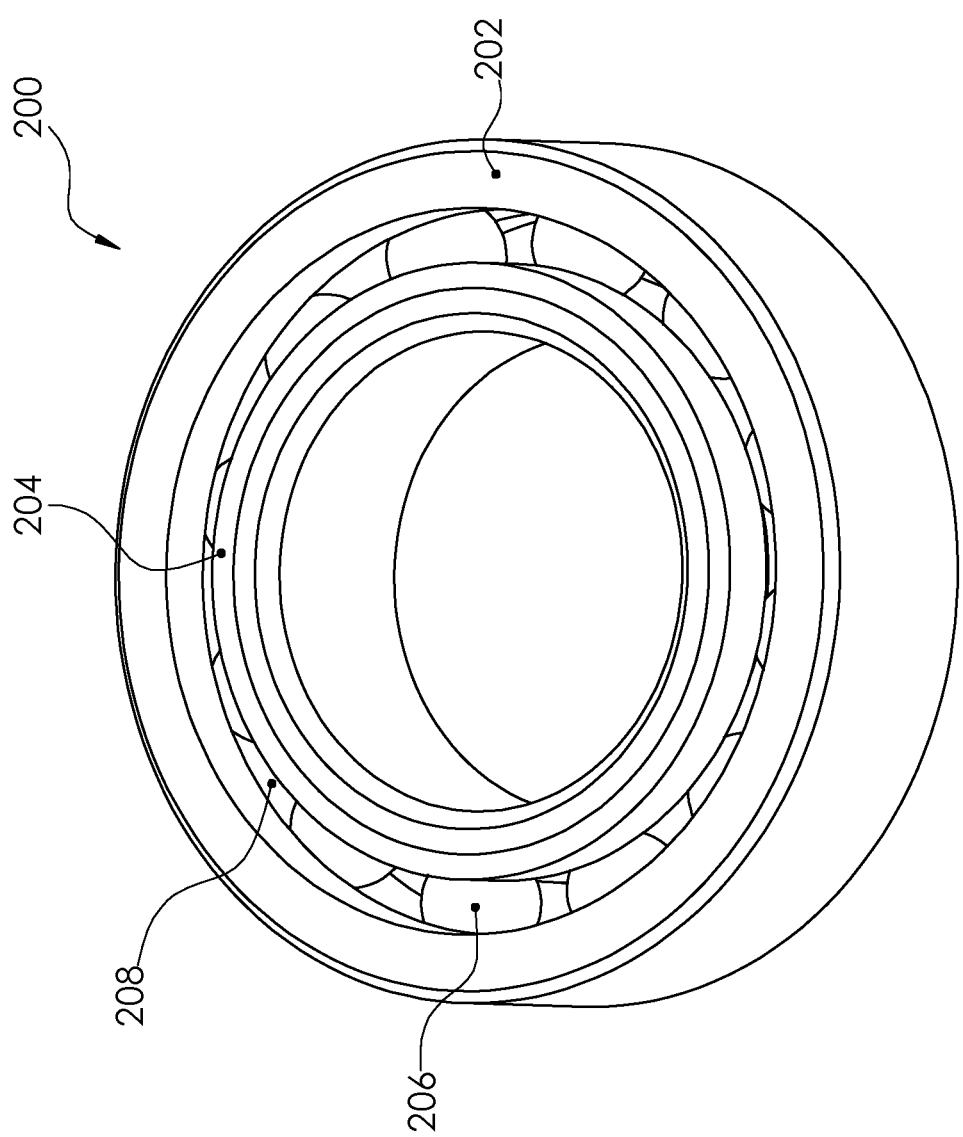
FIG. 17 is a top-down view of the rotor bearing of FIG. 16.
Figure 18:
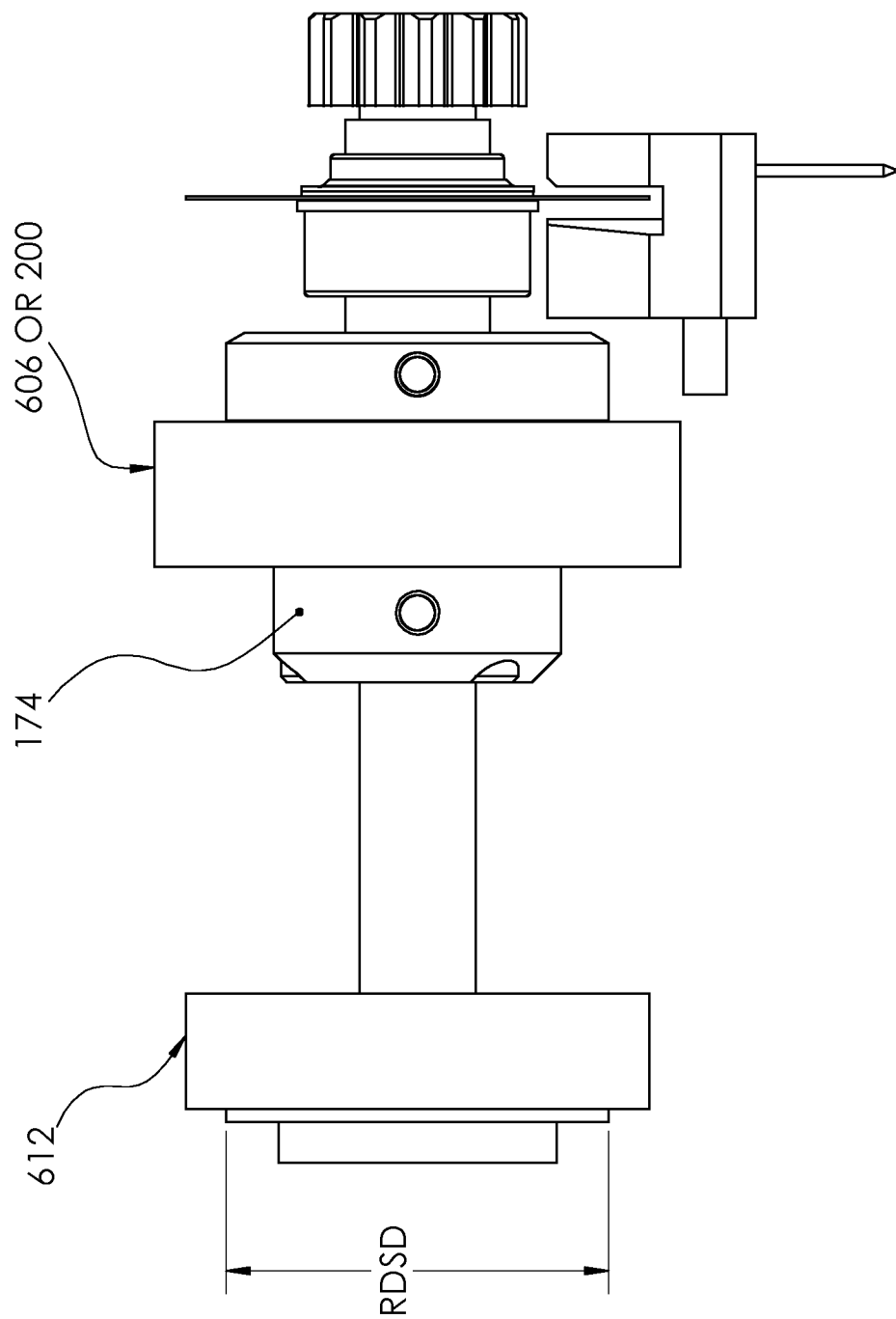
FIG. 18 is a side view of the rotor bearing of FIG. 16 associated with a rotor shaft for use with the CERV of FIG. 1A, in accordance with one embodiment of the invention.
Figure 19:
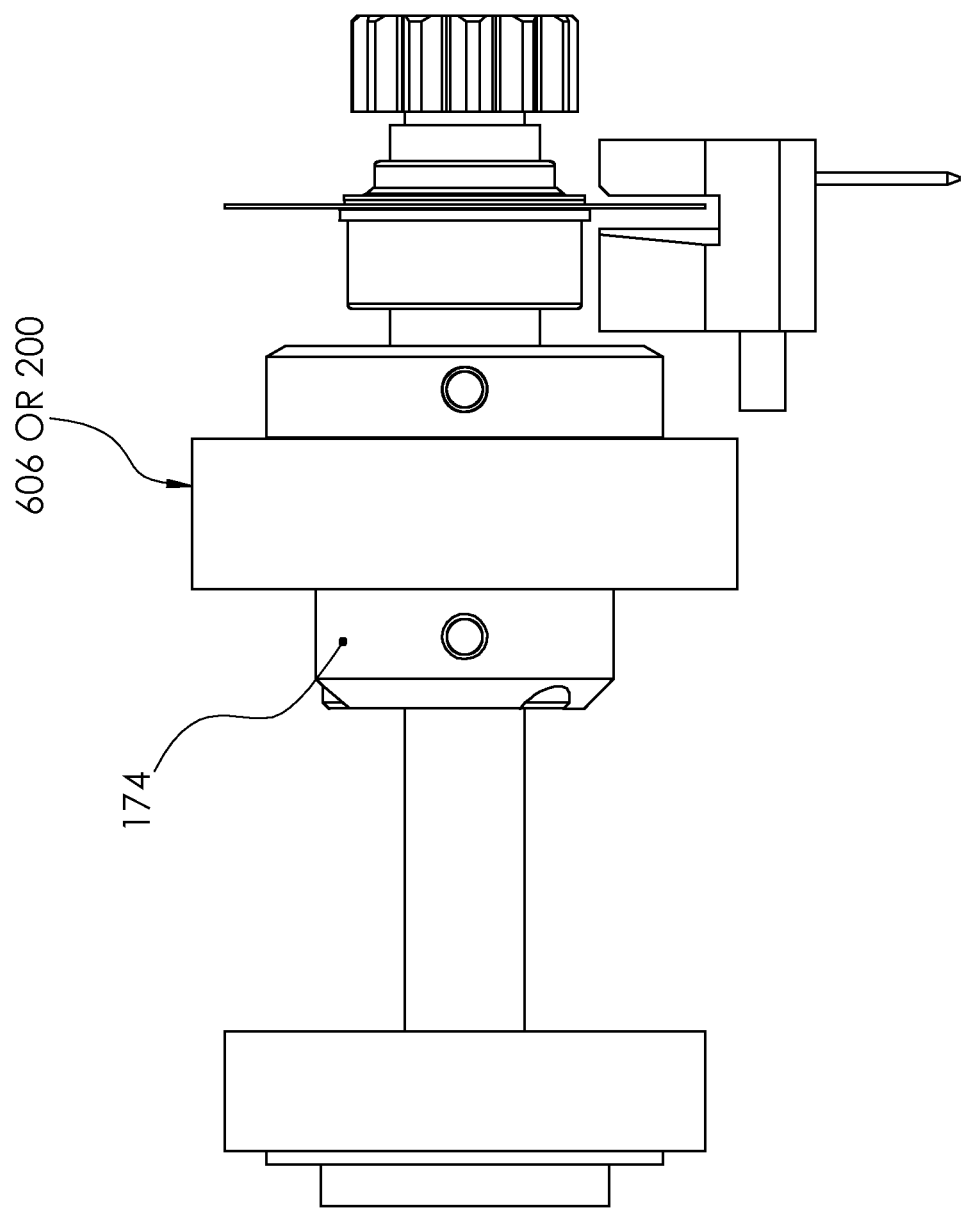
FIG. 19 is a side view of the rotor bearing of FIG. 16 associated with a rotor shaft for use with the CERV of FIG. 1A, in accordance with one embodiment of the invention.
Figure 20:
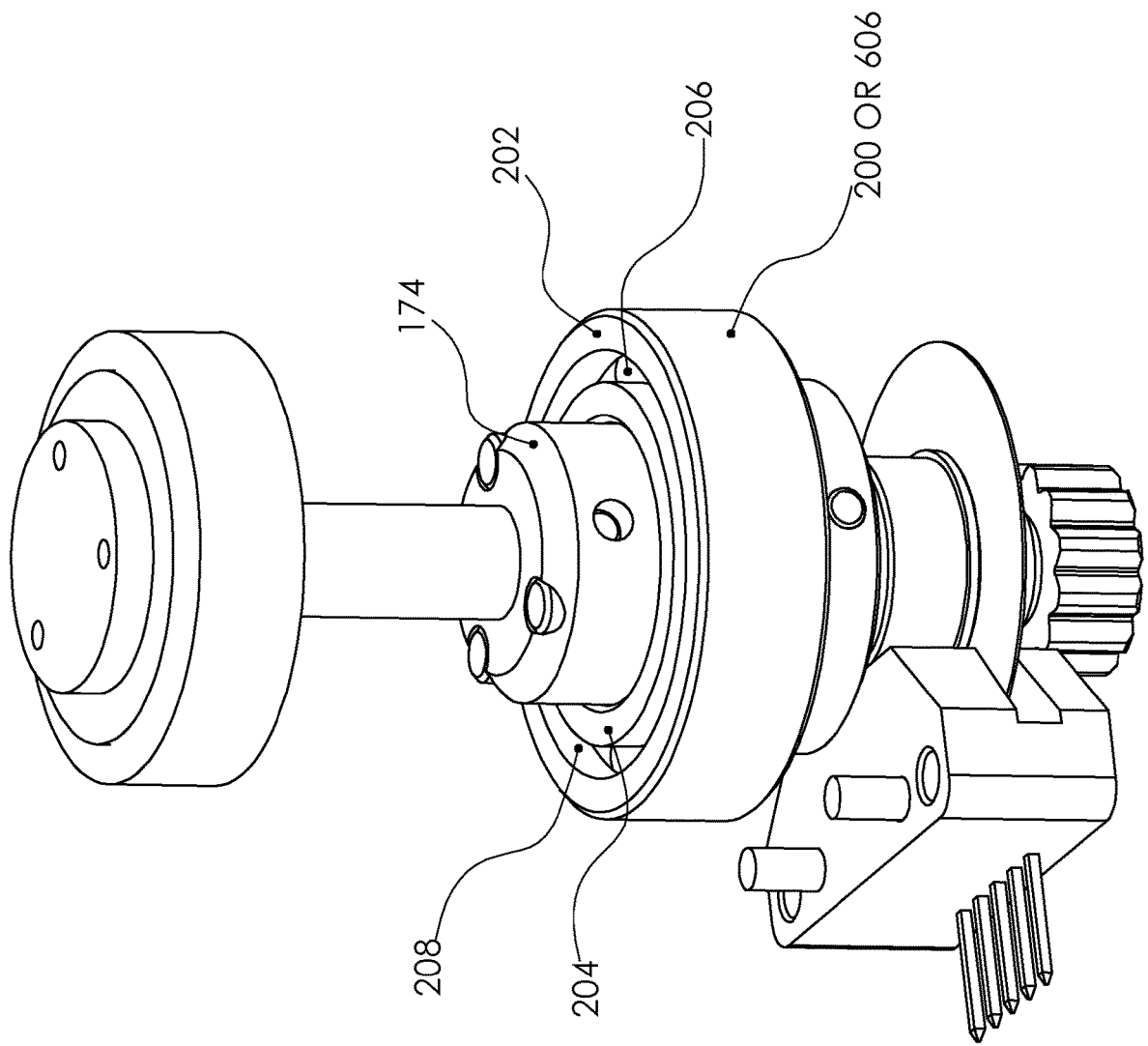
FIG. 20 is a top-down, side view of the rotor bearing of FIG. 16 associated with the rotor shaft of FIG. 19, in accordance with one embodiment of the invention.
Figure 21:
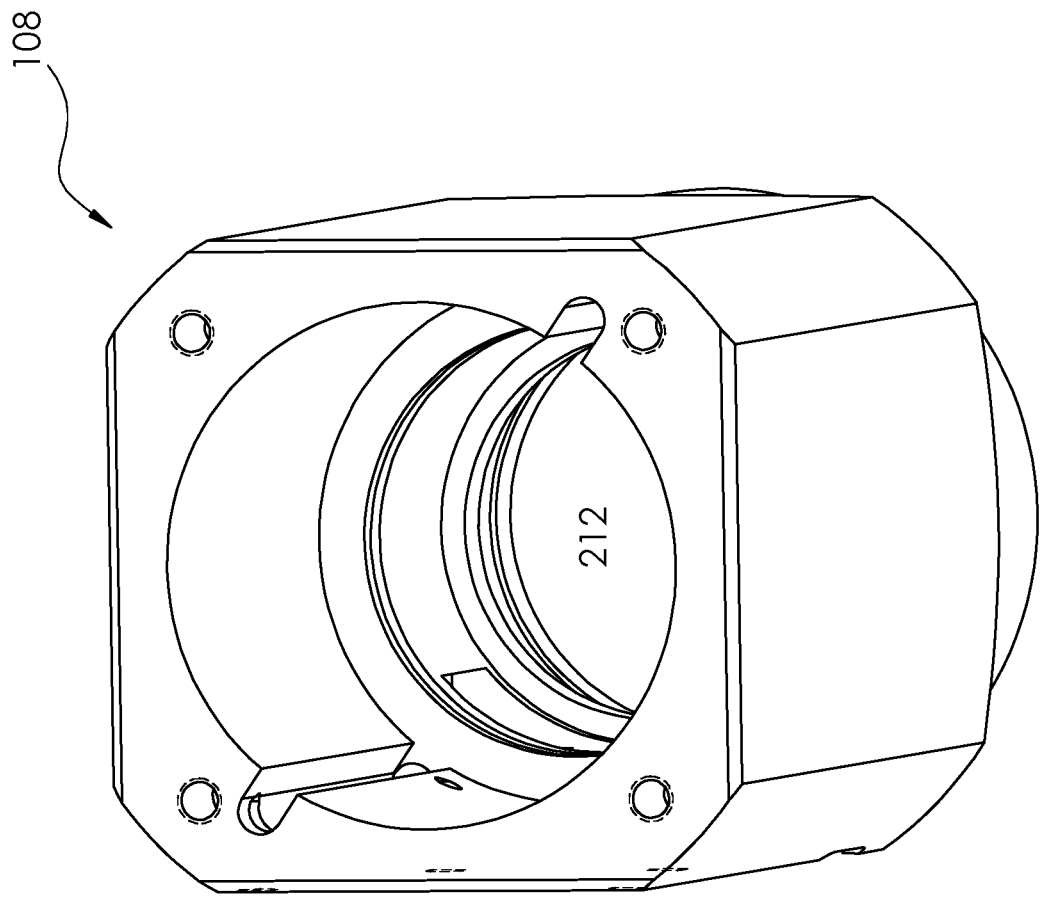
FIG. 21 is an top-down, side view of the top-body housing for use with the CERV of FIG. 1A, in accordance with one embodiment of the invention.
Figure 22:
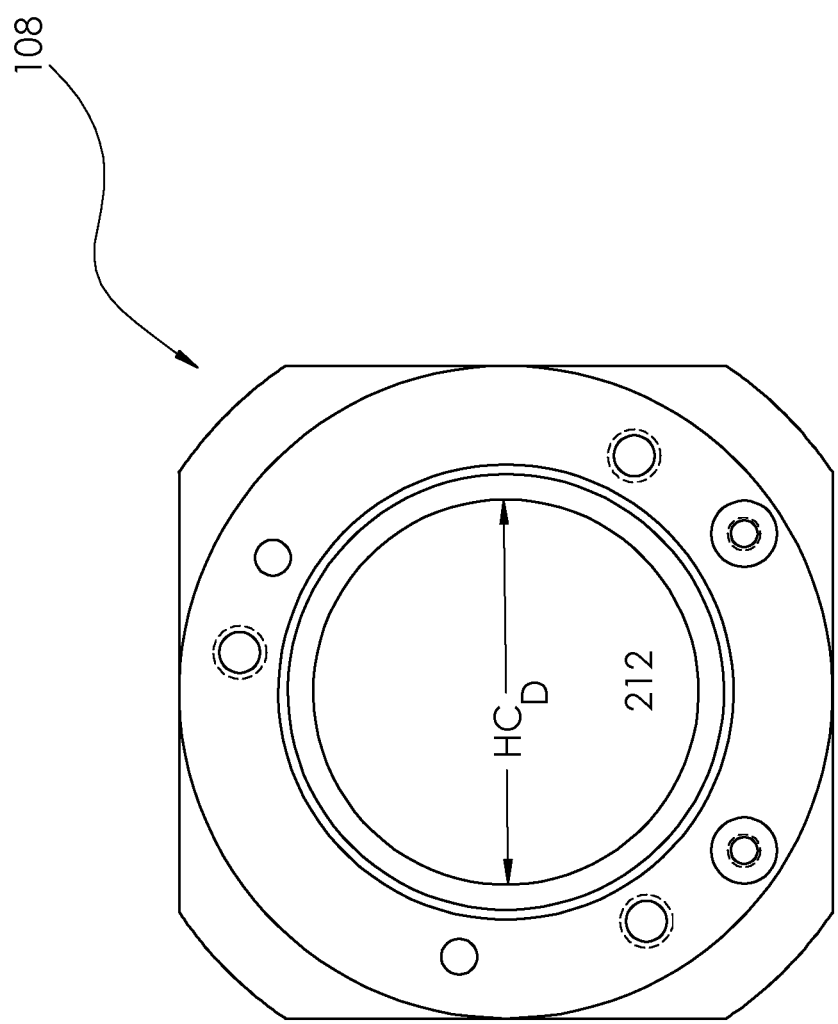
FIG. 22 is an top-down, side view of the top-body housing for use with the CERV of FIG. 1A, in accordance with one embodiment of the invention.
Figure 23:
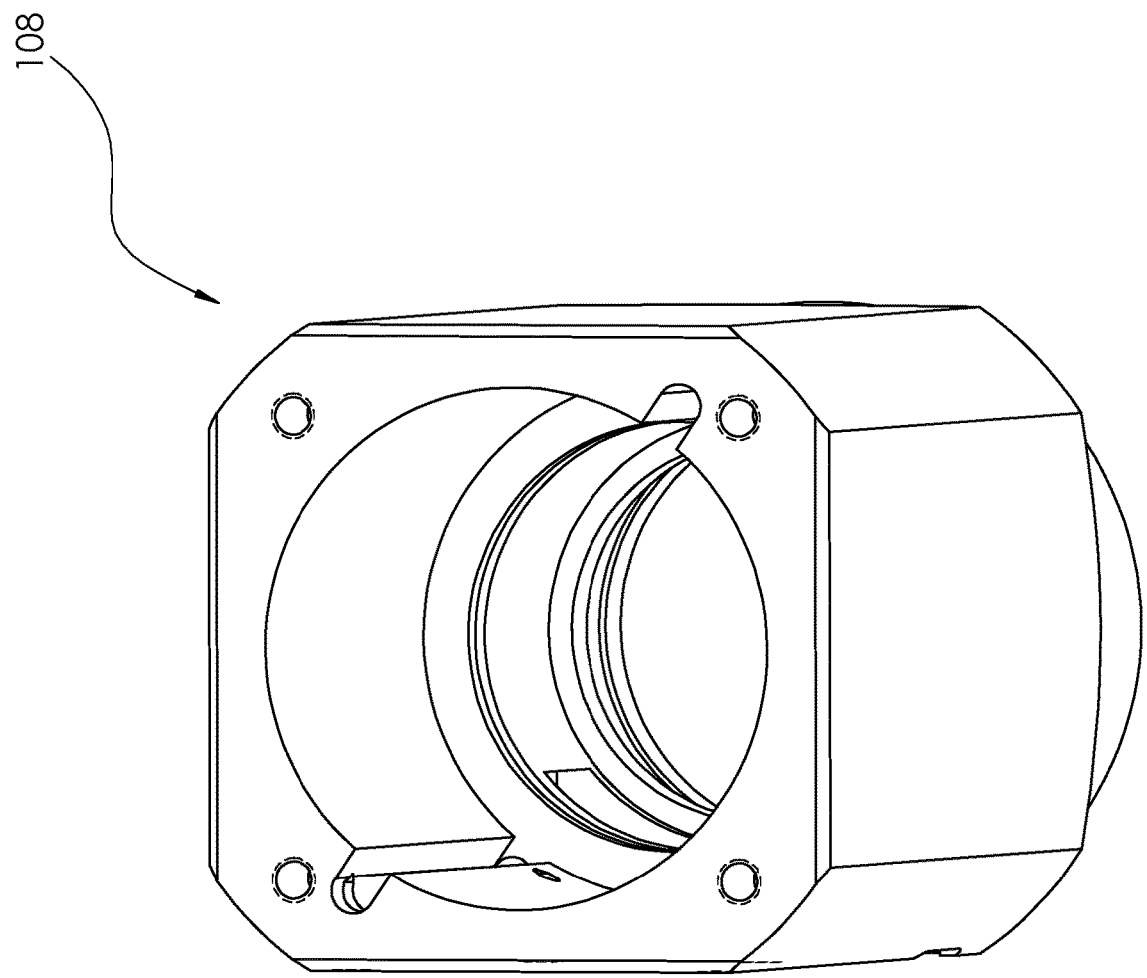
FIG. 23 is an bottom-up, side view of the top-body housing for use with the CERV of FIG. 1A, in accordance with one embodiment of the invention.
Figure 24:
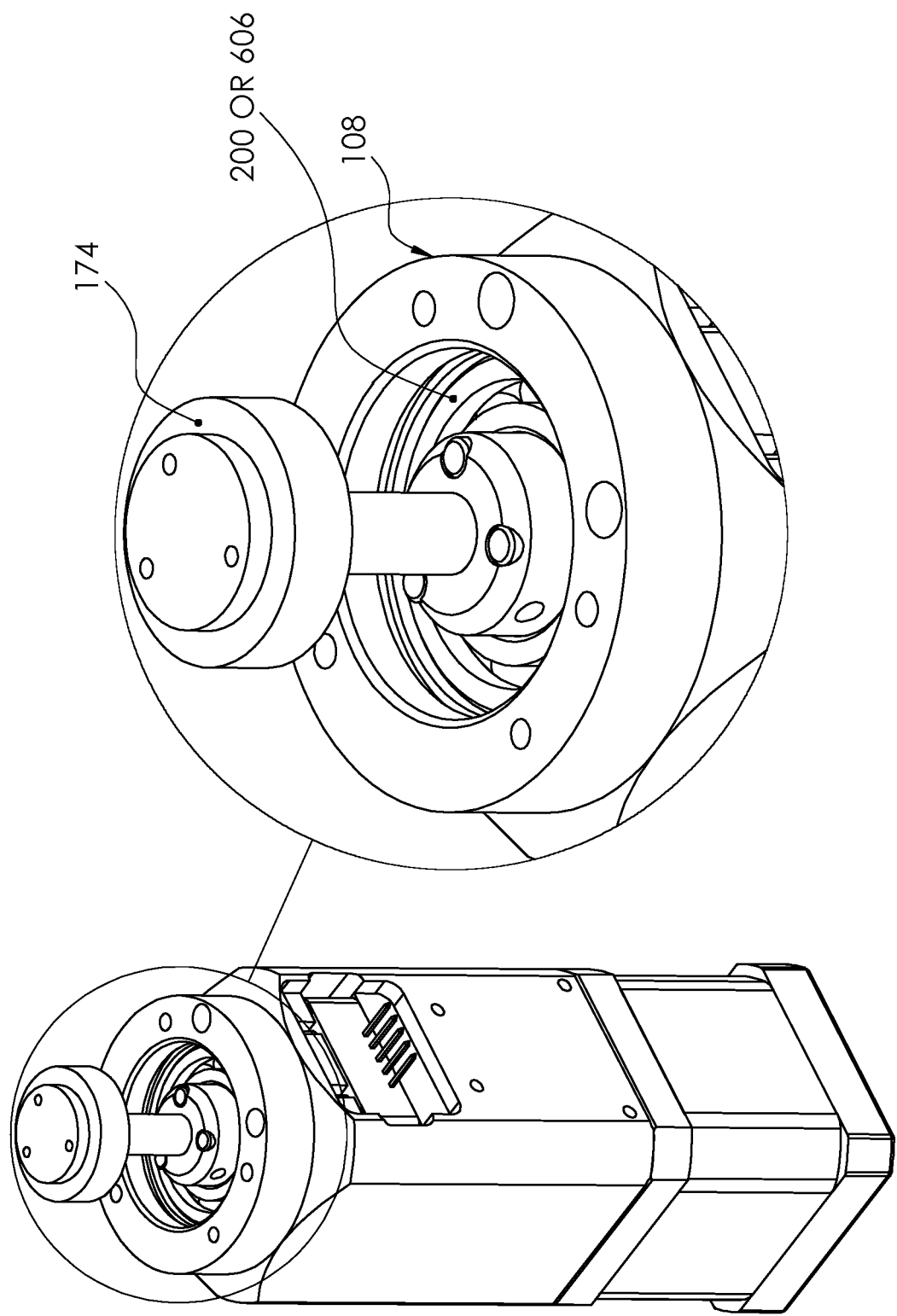
FIG. 24 is an top-down, side view of the top-body housing for use with the CERV of FIG. 1A, with the rotor bearing and rotor shaft contained therein, in accordance with one embodiment of the invention.
Figure 25:
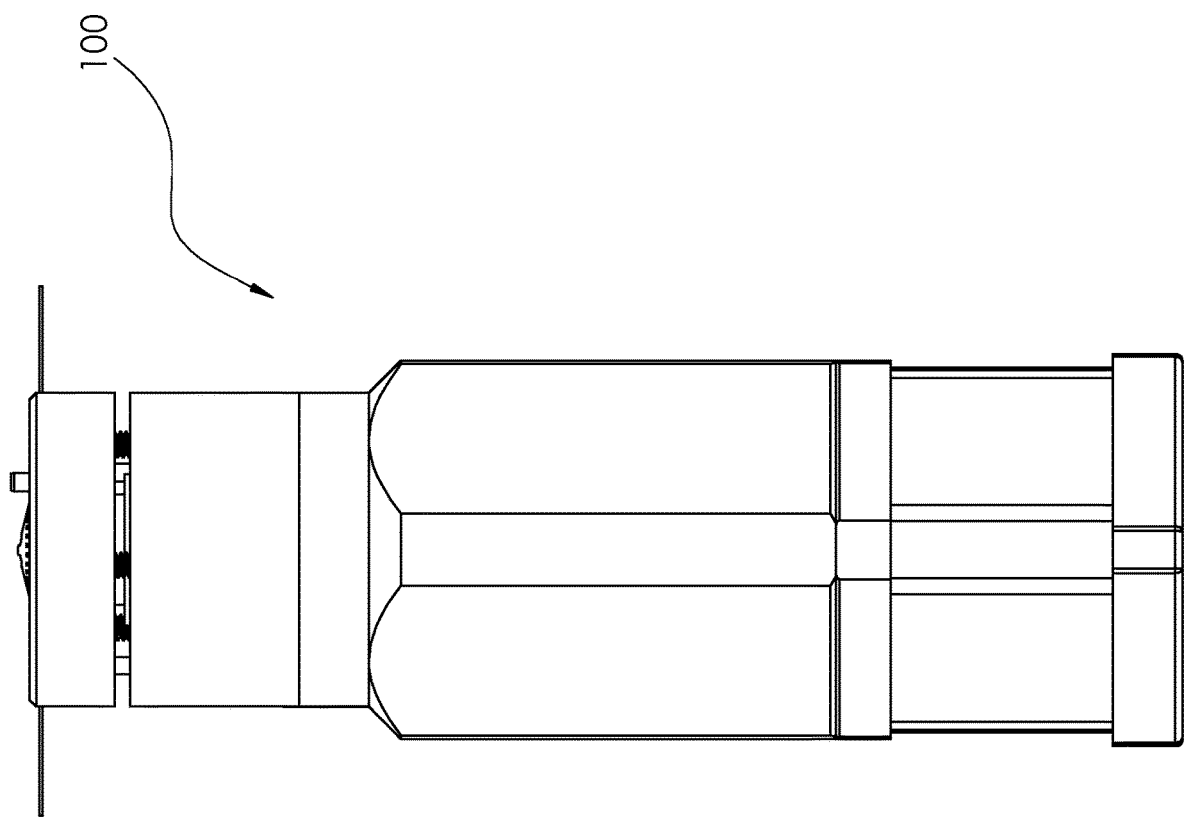
FIG. 25 is a side view of the CERV of FIG. 1, in accordance with another embodiment of the invention.
Figure 26:
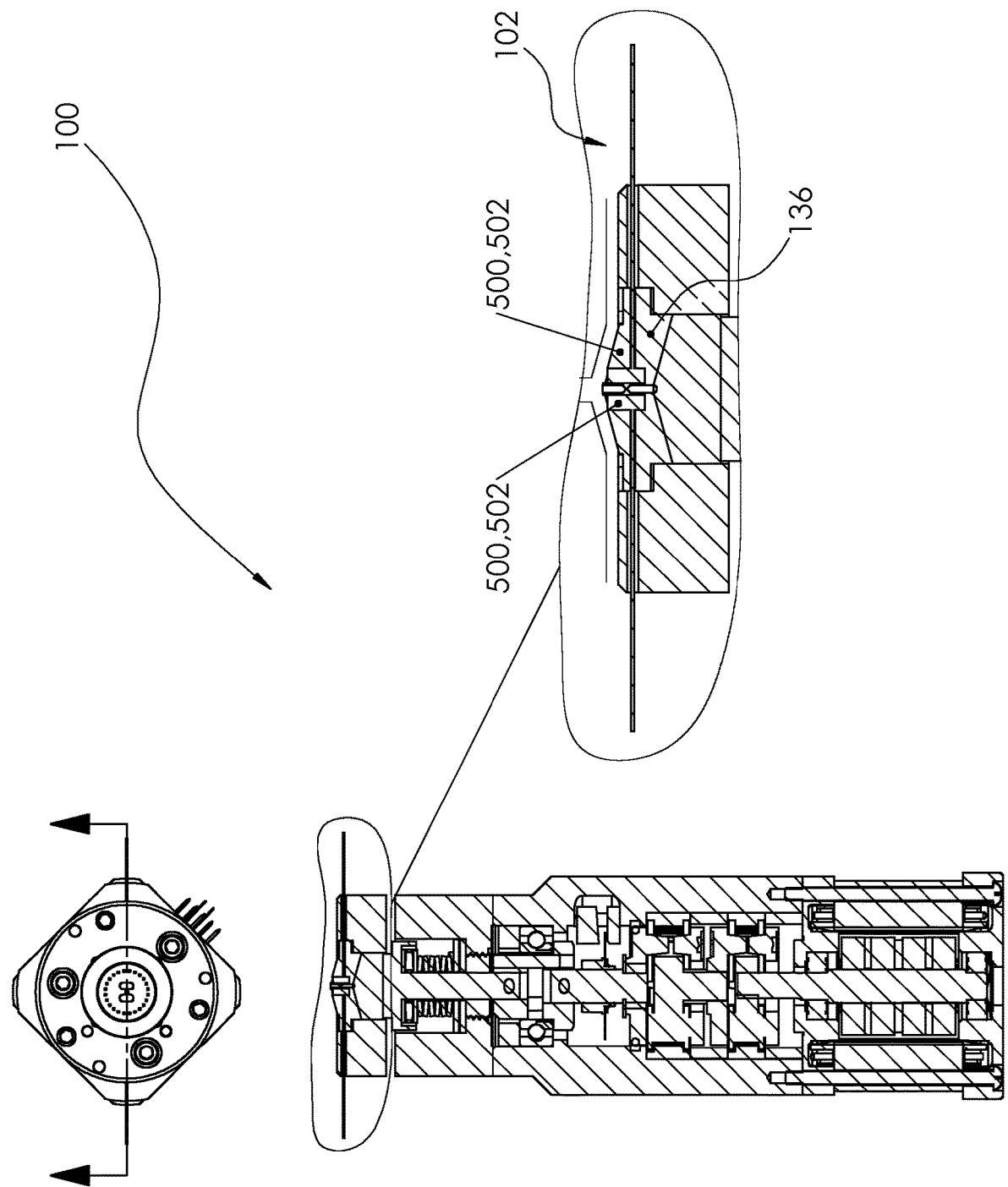
FIG. 26 is a sectional side view of the CERV of FIG. 25.
Figure 27:
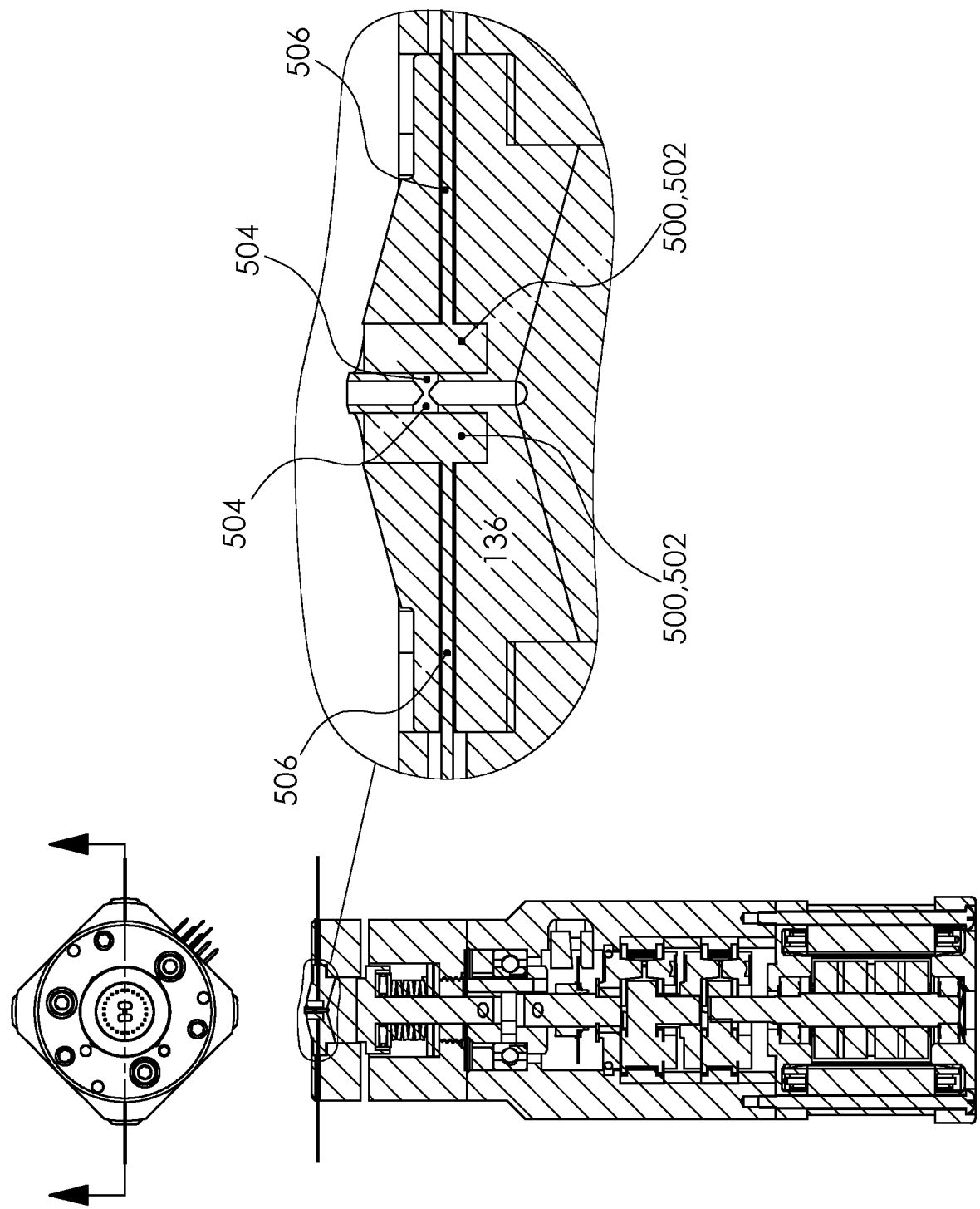
FIG. 27 is a sectional side view of the centering stator of the CERV of FIG. 25.
Figure 28:
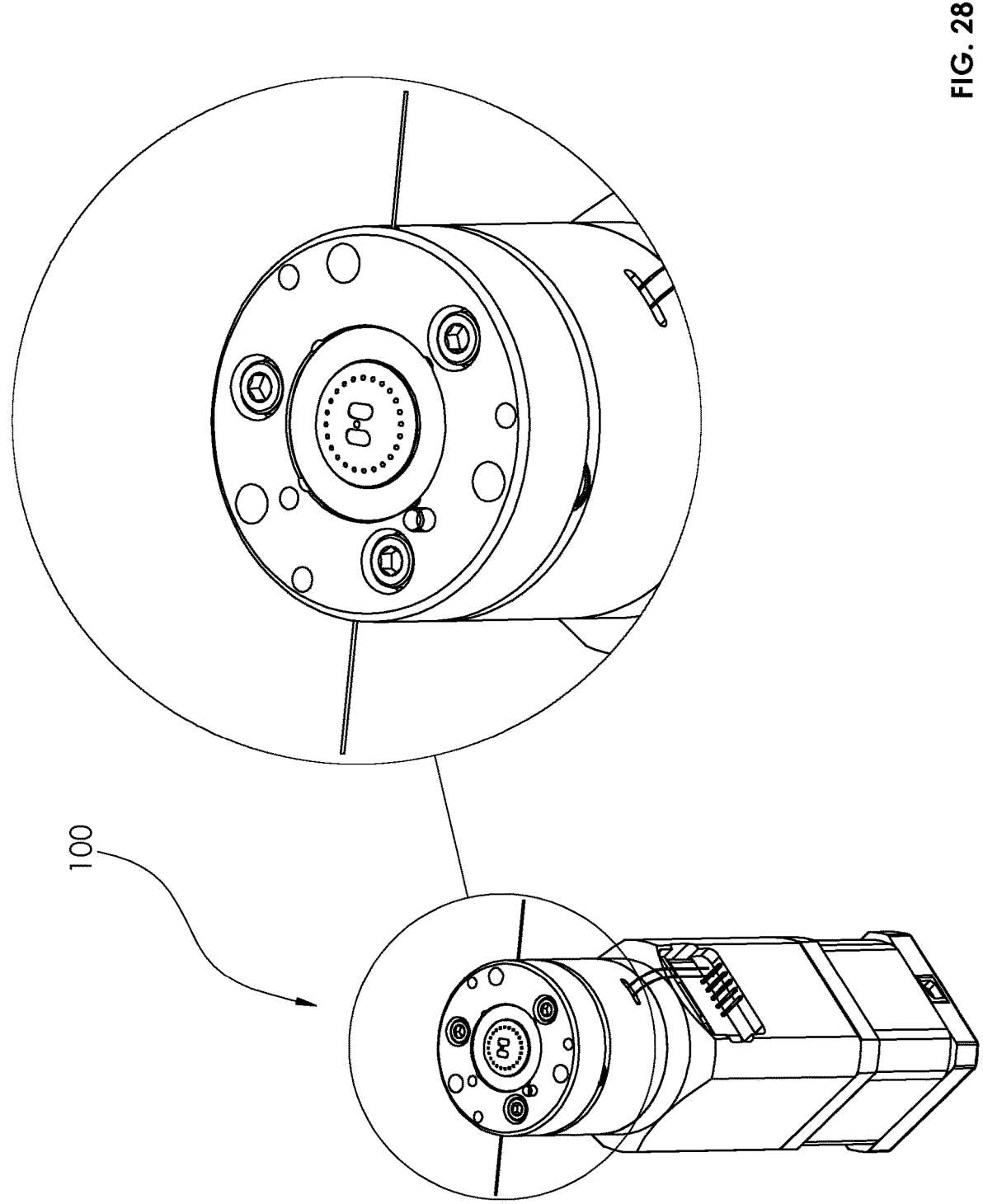
FIG. 28 is a sectional side perspective view of the CERV of FIG. 25.
Figure 29:
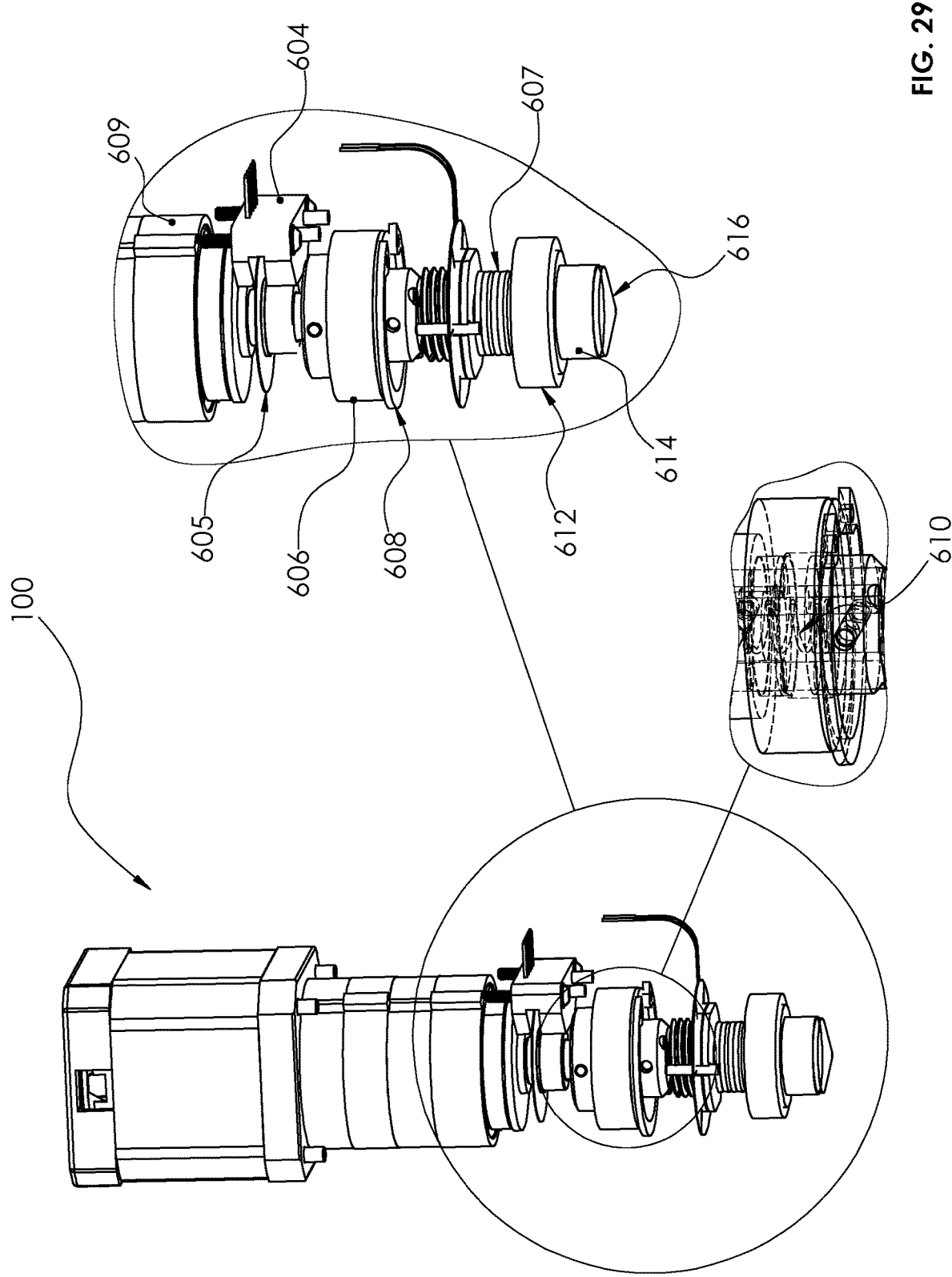
Figure 30:
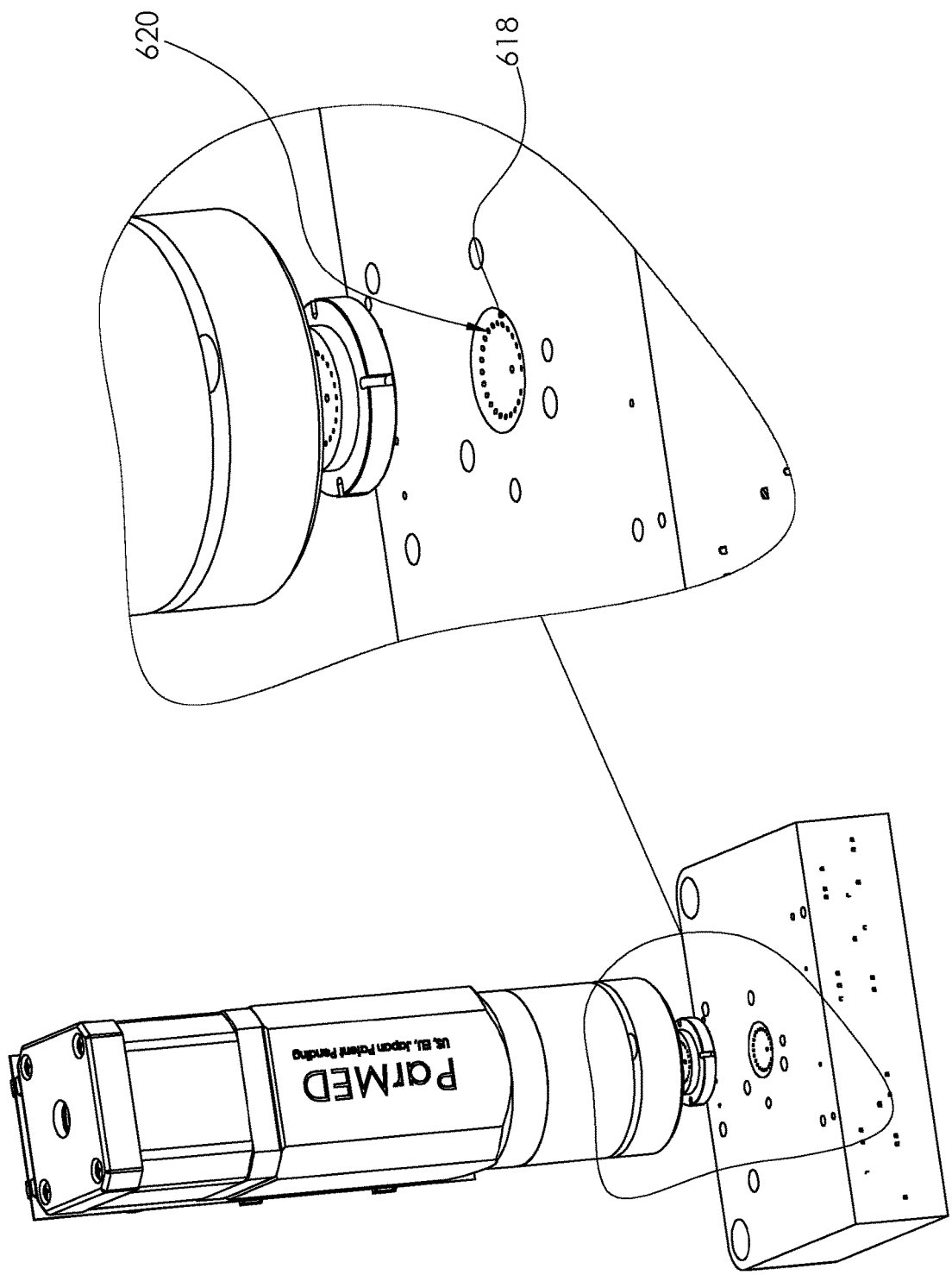
Figure 31:
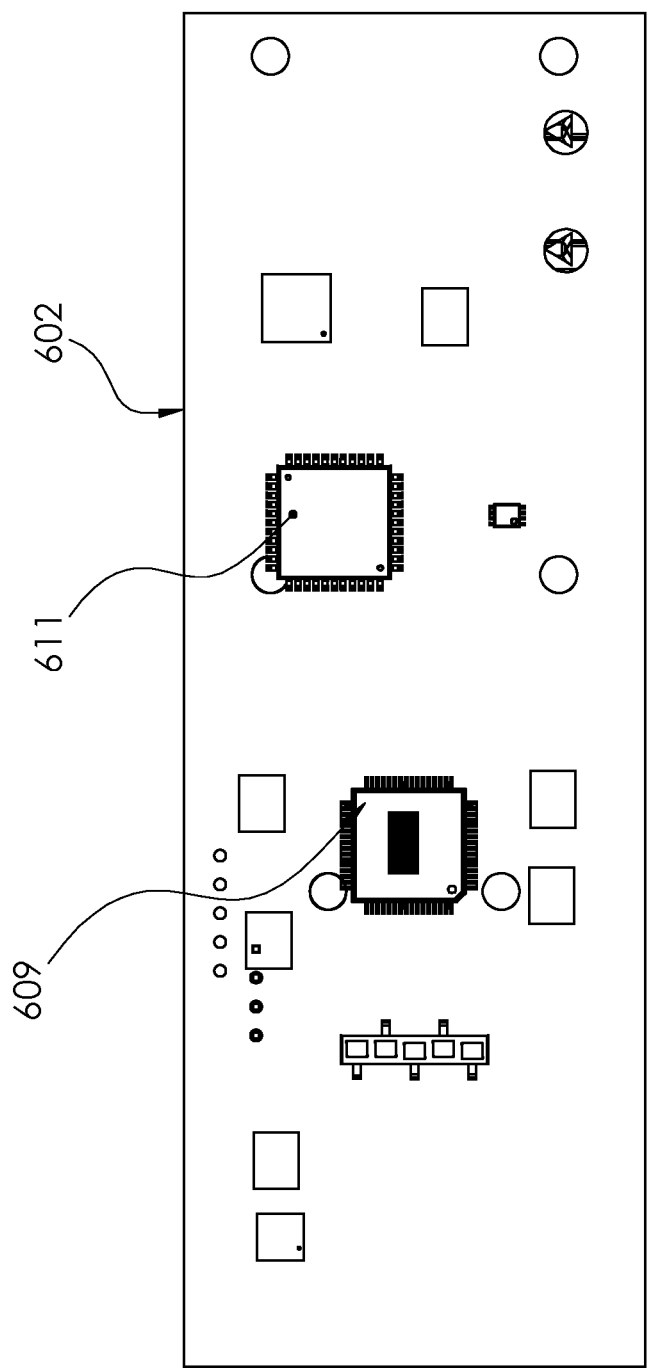
Figure 32:
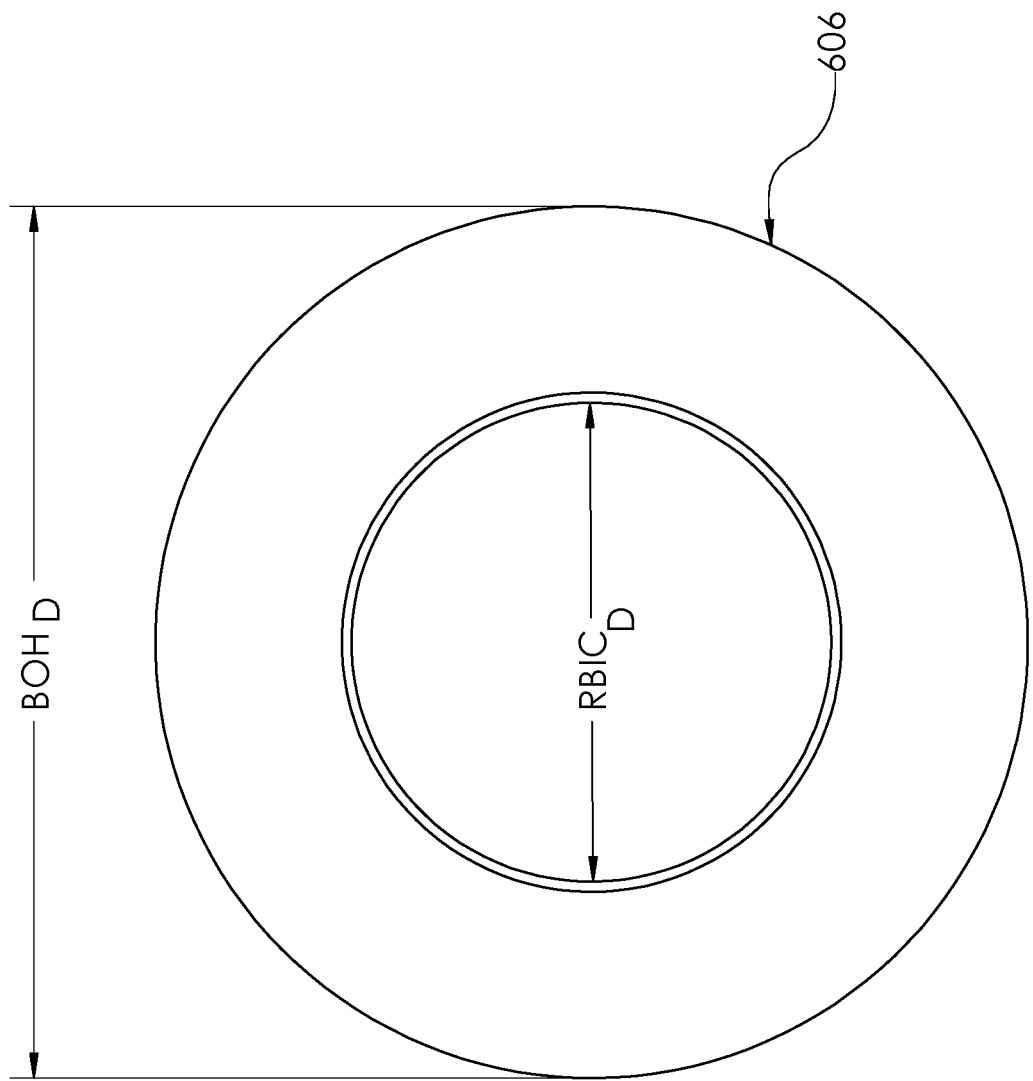
Figure 33:
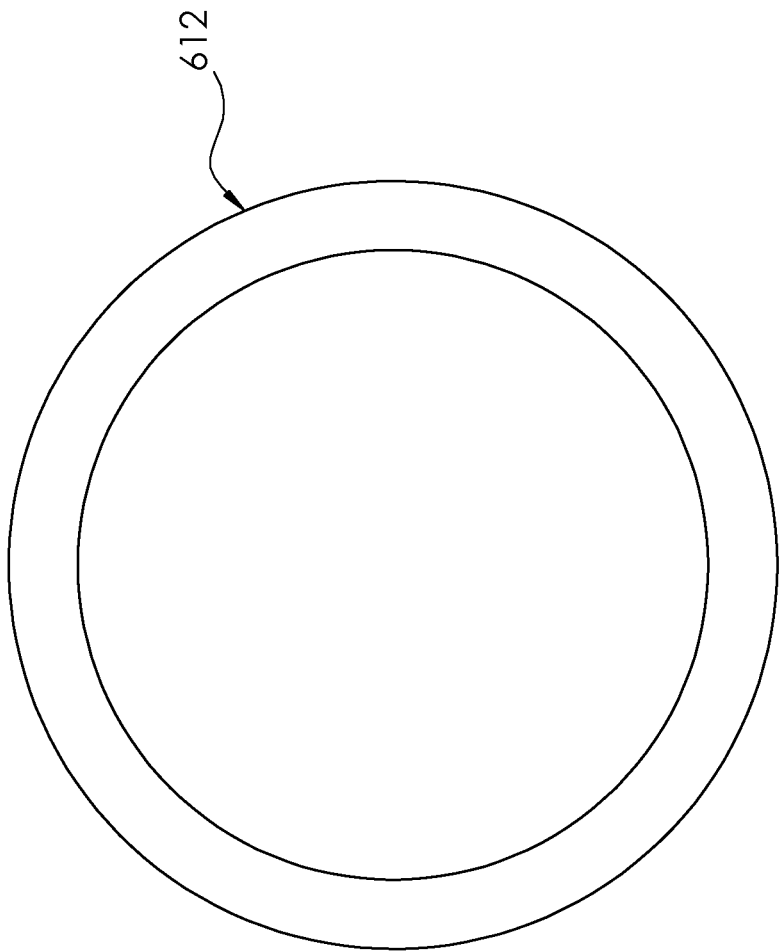

It should be appreciated that the drive system 112 further includes a positioning article 180 that is configured to control the motor 110 (and hence the rotation of the rotor shaft 174) such that location of the rotor fluid channel output opening (RTOO) 172 is precisely located as desired. The positioning article 180 includes a locator disc 182 and a disc reader 184, wherein the locator disc 182 is encoded to divide the rotation of the rotor shaft 174 into a predefined number of positions such that the 3600 circumference of the rotation of the rotor shaft 174 is divided into N number of discreet positions. Accordingly, the greater number of discreet positions N, the more exact rotation of the rotor shaft 174 can be controlled and the higher the resolution. Referring to FIG. 14, in this embodiment, the locator disc 182 is shown and includes one hundred (100) position marks 186. Thus, the locator disc 182 is configured to divide the 360° circumference of the rotation of the rotor shaft 174 into one hundred (100) discreet positions. Accordingly, each of the one hundred (100) discreet positions along the 360° circumference of the rotation of the rotor shaft 174 is defined by four (4) position marks 186. The locator disc 182 may be associated with the rotor shaft 174 such that when the first stator bottom opening (SB-1) is aligned with the rotor fluid channel output opening (RTOO) 172, the first four (4) position marks 186 are designated as markers for that position. The locator disc 182 is associated with the disc reader 184 to read the position marks 186 located on the locator disc 182 and position the rotor shaft 174, and thus the rotor fluid channel output opening (RTOO) 172, into the proper location as defined by the locator disc 182.

In accordance with the present invention, the CERV 100 may include one or more Sensing Articles (SA) 500 to sense pressure of a fluid flowing through at least one of the input channels (AIC, SIC) and the output channels (AOC, SOC). Referring to FIGS. 25-28, one embodiment of the SA 500 configured to be associated with the stator input channel (SIC) 152 of the centering stator 136 is shown, wherein the SA 500 includes at least one sensing element 502 located on at least one side of the stator input channel (SIC) 152 (in this embodiment, the SA 500 includes two (2) sensing elements 502). The center statoring 136 may include one or more sensing side ports 504 which communicate the stator input channel (SIC) 152 with the at least one sensing element 502. The at least one sensing element 502, measures the desired parameters of the fluid flowing through the stator input channel (SIC) 502, such as flow volume, pressure, flow velocity, etc. and communicates these parameters to a processing associated with the CERV 100 and/or a remote processing device. Accordingly, this advantageously allows the fluid flow through the stator input channel (SIC) 152 to be monitored on a periodic and/or continuous basis. It should be appreciated that the SA 500 may communicate the obtained data to the processing device via any device and/or method suitable to the desired end purpose, such as hard-wired communication and/or wireless communication. In the embodiments configured for hardwire communication, the centering stator 136 may include one or more wire ports 506 to allow for a communication/control/power wire to be connected to the sensing element 502. Moreover, it is contemplated that the sensing Article (SA) 500 may be associated with and configured to sense parameters in the input channels (AIC, SIC) and/or output channels (AOC, SOC) as desired. One such sensing article (SA) 500 that may be used is the TR Series pressure transducer made and/or sold by Merit Sensor. Additionally, although in one embodiment, the invention is described as using a TR series pressure transducer, it is contemplated that in other embodiments, any type of sensing device and sensing device configuration may be used, suitable to the desired end purpose, such as a non-contact media flow sensor and/or a contact media flow sensor.

Referring again to the FIGURES, the motor 110 and drive system 112 for operating the CERV 100 are shown. The drive system 112 securely associates the motor 110 to the rotor bottom 166 via the rotor shaft 174 and is configured to rotate the centering rotor 138 about the Axis M in a predefined and controlled manner such that the rotor fluid channel output opening 172 is locatable in a precise, repeatable and predetermined position relative to the stator output channel bottom openings (SB-1 to SB-24) 156. For example, in the embodiment disclosed herein, the CERV 100 includes twenty-four (24) adapter output channels (AO1-AO24) 124 and one (1) adapter input channel (AIC) 126 aligned with twenty-four (24) stator output channels (SOC-1 to SOC-24) 150 and one (1) stator input channel (SIC) 152, respectively. The motor 100 and/or drive system 112 is configured to control the rotor drive shaft 174 to precisely position the rotor 138 such that the rotor fluid channel output opening (ROTO) 172 is aligned with one of the stator output channel bottom openings (SB-1 to SB-24) 156, as desired. For example, the motor 100 and/or drive system 112 may be configured to rotatably control the centering rotor 138 into an initial position such that the rotor fluid channel output opening (ROTO) 172 is aligned with a selected stator output channel bottom opening 156 out of the twenty-four (24) stator output channel bottom openings (SB-1 to SB-24) 156 as desired, such as the first stator output channel bottom opening (SB-1) 156.

Accordingly, a fluid introduced into the adapter input channel top opening (AITO) 132 would flow through the adapter input channel (AIC) 126 and out of the adapter input channel bottom opening (AIBO) 134. The fluid would then flow into the stator input channel top opening (SITO) 158, through the stator input channel (SIC) 152 and out of the stator input channel bottom opening (SIBO) 160. The fluid would then flow into the rotor fluid channel input opening (RITO) 170, through the rotor fluid directional channel 168 and out of the rotor fluid channel output opening (ROTO) 172. The fluid would then flow into the first stator output channel bottom opening (SB-1), through the first stator output channel (SOC-1), out of the first stator output channel top opening (ST-1), into the first adapter output channel bottom opening (AB-1) 130, through the first adapter output channel (AOC-1) 124 and out of the first adapter output channel top opening (AT-1) 128 and into a manifold associated with the adapter 102 (not shown).

It should be appreciated that while the invention has been described with reference to an exemplary embodiment, it will be understood by those skilled in the art that various changes, omissions and/or additions may be made, and equivalents may be substituted for elements thereof without departing from the spirit and scope of the invention. Moreover, embodiments and/or elements of embodiments contemplated and/or disclosed herein may be combined as desired. In addition, many modifications may be made to adapt a particular situation or material to the teachings of the invention without departing from the scope thereof. Therefore, it is intended that the invention is not limited to the particular embodiment disclosed as the best mode contemplated for carrying out this invention, but that the invention will include all embodiments falling within the scope of the appended claims and/or information. Moreover, unless specifically stated any use of the terms first, second, etc. do not denote any order or importance, but rather the terms first, second, etc. are used to distinguish one element from another.

What is claimed is:

1. A Centering Electronic Rotary Valve (CERV), comprising:
    an adapter structure having an adapter top and an adapter bottom, wherein the adapter top includes a conical shaped adapter top interface portion and the adapter bottom defines a conical shaped adapter bottom interface cavity, wherein the adapter structure defines,
    an adapter input channel top opening communicated with an adapter input channel bottom opening via an adapter input channel, and
    a plurality of adapter output channel top openings communicated with a plurality of adapter output channel bottom openings via a plurality of adapter output channels;
    a stator structure having a stator top and a stator bottom, wherein the stator top includes a conical shaped stator top interface portion and wherein the stator bottom defines a conical shaped stator bottom interface cavity, wherein the stator structure defines,
    a stator input channel disposed along a centerline of the stator which communicates with a stator input channel top opening and a stator input channel bottom opening, and
    a plurality of stator output channel top openings defined in the conical shaped stator top interface portion communicated with a plurality of stator output channel bottom openings defined in the conical shaped stator bottom interface cavity via a plurality of stator output channels, each of the plurality of stator output channels being parallel to the stator input channel, and the plurality of stator output channels circumscribing the stator input channel;
    wherein the stator top interface portion is securely and sealingly associated with the adapter bottom interface cavity such that the adapter input channel bottom opening is adjacent to and aligned with the stator input channel top opening, and such that the plurality of adapter output channel bottom openings is adjacent to and aligned with the plurality of stator output channel top openings;
    a rotor structure having a rotor top and a rotor bottom, wherein the rotor top is arcuate and conical in shape and defines a rotor fluid directional channel which communicates with a rotor fluid channel input opening and a rotor fluid channel output opening, wherein the rotor top is movably and sealingly associated with the conical shaped stator bottom interface cavity, wherein the rotor fluid channel input opening is adjacent to and aligned with the stator input channel bottom opening, and the rotor fluid channel output opening is adjacent to and aligned with at least one of the plurality of stator output channel bottom openings;
    wherein the adapter input channel, the stator input channel, and the rotor fluid channel input opening are aligned with a centerline of the CERV;
    a motor, wherein the motor is associated with the rotor via a rotor shaft; and
    a drive system associated with the motor, wherein the drive system is configured to sense the position of the rotor shaft and operate the motor to cause the rotor shaft to rotate about an axis M and to locate the rotor at a defined discreet position.

2. The CERV of claim 1, further including a positioning article, wherein the positioning article includes an encoder disc and an encoder disc reader.

3. The CERV of claim 2, wherein the encoder disc includes a plurality of position marks, wherein the plurality of position marks correspond to a circumferential position of the rotor shaft.

4. The CERV of claim 3, wherein the plurality of position marks include 100 position marks.

5. The CERV of claim 1, wherein the drive system includes a plurality of resilient spring articles adjacent the rotor structure, wherein the plurality of resilient spring articles are configured to be compressed as the adapter structure, stator structure and rotor structure are securingly associated with the motor and drive system.

6. The CERV of claim 5, wherein the drive system further includes at least one pressure sensing article associated with the plurality of resilient spring articles to sense an amount of pressure being applied to the plurality of resilient spring articles.

7. The CERV of claim 1, wherein the at least one adaptor output channel top opening includes twenty-four adapter output channel top openings and wherein the at least one adapter output channel bottom opening includes twenty-four adapter output channel bottom openings.

8. The CERV of claim 7, wherein each of the separate twenty-four adapter output channel top openings is communicated with each of the separate respective twenty-four adapter output channel bottom openings via one of the at least one adapter output channel.

9. The CERV of claim 7, wherein the at least one stator output channel top opening includes twenty-four stator output channel top openings and wherein the at least one stator output channel bottom opening includes twenty-four stator output channel bottom openings.

10. The CERV of claim 9, wherein each of the separate twenty-four stator output channel top openings is communicated with each of the separate respective twenty-four stator output channel bottom openings via one of the at least one stator output channel.

11. A Centering Electronic Rotary Valve (CERV), comprising:
an adapter structure having an adapter top and an adapter bottom, wherein the adapter top includes a conical shaped adapter top interface portion and the adapter bottom defines a conical shaped adapter bottom interface cavity, wherein the adapter structure defines,
an adapter input channel top opening communicated with an adapter input channel bottom opening via an adapter input channel, and
a plurality of adapter output channel top openings communicated with a plurality of adapter output channel bottom openings via a plurality of adapter output channels;
a stator structure having a stator top and a stator bottom, wherein the stator top includes a conical shaped stator top interface portion and wherein the stator bottom defines a conical shaped stator bottom interface cavity, wherein the stator structure defines,
a stator input channel disposed along a centerline of the stator which communicates with a stator input channel top opening and a stator input channel bottom opening, and
a plurality of stator output channel top openings defined in the conical shaped stator top interface portion communicated with a plurality of stator output channel bottom openings defined in the conical shaped stator bottom interface cavity via a plurality of stator output channels, each of the plurality of stator output channels being parallel to the stator input channel, and the plurality of stator output channels circumscribing the stator input channel;
wherein the stator top interface portion is securely and sealingly associated with the adapter bottom interface cavity such that the adapter input channel bottom opening is adjacent to and aligned with the stator input channel top opening, and such that the plurality of adapter output channel bottom openings is adjacent to and aligned with the plurality of stator output channel top openings;
a rotor structure having a rotor top and a rotor bottom, wherein the rotor top is arcuate and conical in shape and defines a rotor fluid directional channel which communicates with a rotor fluid channel input opening and a rotor fluid channel output opening, wherein the rotor top is movably and sealingly associated with the conical shaped stator bottom interface cavity, wherein the rotor fluid channel input opening is adjacent to and aligned with the stator input channel bottom opening, and the rotor fluid channel output opening is adjacent to and aligned with at least one of the plurality of stator output channel bottom openings;
wherein the adapter input channel, the stator input channel, and the rotor fluid channel input opening are aligned with a centerline of the CERV;
wherein the CERV is configured to sense the position of the rotor and rotate the rotor about an axis M and to locate the rotor at a defined discreet position.

12. The CERV of claim 11, further comprising a motor and a drive system,
wherein the motor is associated with the rotor via a rotor shaft, and
wherein the drive system is associated with the motor and configured to sense the position of the rotor shaft and operate the motor to cause the rotor shaft to rotate about the axis M and to locate the rotor at the defined discreet position.

13. The CERV of claim 12, further including a positioning article associated with the drive system, wherein the positioning article includes an encoder disc and an encoder disc reader, wherein the encoder disc includes a plurality of position marks, wherein the plurality of position marks correspond to a circumferential position of the rotor shaft.

14. The CERV of claim 12, wherein the drive system includes a plurality of resilient spring articles adjacent the rotor structure, wherein the plurality of resilient spring articles are configured to be compressed as the adapter structure, stator structure and rotor structure are securingly associated with the motor and drive system.

15. The CERV of claim 14, wherein the drive system further includes at least one pressure sensing article associated with the plurality of resilient spring articles to sense an amount of pressure being applied to the plurality of resilient spring articles.

16. The CERV of claim 11, wherein:
the at least one adaptor output channel top opening includes twenty-four adapter output channel top openings and the at least one adapter output channel bottom opening includes twenty-four adapter output channel bottom openings, each of the separate twenty-four adapter output channel top openings is communicated with each of the separate respective twenty-four adapter output channel bottom openings via one of the at least one adapter output channel; and
the at least one stator output channel top opening includes twenty-four stator output channel top openings and the at least one stator output channel bottom opening includes twenty-four stator output channel bottom openings, each of the separate twenty-four stator output channel top openings is communicated with each of the separate respective twenty-four stator output channel bottom openings via one of the at least one stator output channel.

* * * * *